(12) United States Patent
Nash et al.

(10) Patent No.: US 8,393,870 B2
(45) Date of Patent: Mar. 12, 2013

(54) TURBINE BLADE AIRFOIL

(75) Inventors: Timothy Charles Nash, East Hartford, CT (US); Jason L. O'Hearn, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 408 days.

(21) Appl. No.: 12/877,701

(22) Filed: Sep. 8, 2010

(65) Prior Publication Data

US 2012/0057981 A1 Mar. 8, 2012

(51) Int. Cl.
*F01D 9/02* (2006.01)
(52) U.S. Cl. ............................... 416/223 R; 416/DIG. 2
(58) Field of Classification Search ............... 416/223 R, 416/242, 243, DIG. 2
See application file for complete search history.

(56) References Cited

U.S. PATENT DOCUMENTS

| | | | |
|---|---|---|---|
| 5,980,209 A | 11/1999 | Barry et al. |
| 6,358,012 B1 | 3/2002 | Staubach |
| 6,398,489 B1 | 6/2002 | Burdgick et al. |
| 6,450,770 B1 | 9/2002 | Wang et al. |
| 6,461,109 B1 | 10/2002 | Wedlake et al. |
| 6,461,110 B1 | 10/2002 | By et al. |
| 6,474,948 B1 | 11/2002 | Pirolla et al. |
| 6,503,054 B1 | 1/2003 | Bielek et al. |
| 6,503,059 B1 | 1/2003 | Frost et al. |
| 6,558,122 B1 | 5/2003 | Xu et al. |
| 6,579,066 B1 | 6/2003 | Saito et al. |
| 6,669,445 B2 | 12/2003 | Staubach et al. |
| 6,685,434 B1 | 2/2004 | Humanchuk et al. |
| 6,715,990 B1 | 4/2004 | Arness et al. |
| 6,722,852 B1 | 4/2004 | Wedlake et al. |
| 6,722,853 B1 | 4/2004 | Humanchuk et al. |
| 6,736,599 B1 | 5/2004 | Jacks et al. |
| 6,739,838 B1 | 5/2004 | Bielek et al. |
| 6,739,839 B1 | 5/2004 | Brown et al. |
| 6,769,878 B1 | 8/2004 | Parker et al. |
| 6,769,879 B1 | 8/2004 | Cleveland et al. |
| 6,779,977 B2 | 8/2004 | Lagrange et al. |
| 6,779,980 B1 | 8/2004 | Brittingham et al. |
| 6,808,368 B1 | 10/2004 | Tomberg et al. |
| 6,832,897 B2 | 12/2004 | Urban |
| 6,854,961 B2 | 2/2005 | Zhang et al. |
| 6,857,855 B1 | 2/2005 | Snook et al. |
| 6,866,477 B2 | 3/2005 | Arness et al. |
| 6,881,038 B1 | 4/2005 | Beddard et al. |
| 6,884,038 B2 | 4/2005 | Hyde et al. |
| 6,887,041 B2 | 5/2005 | Coke et al. |
| 7,722,329 B2 | 5/2010 | Clarke |

FOREIGN PATENT DOCUMENTS

| | | |
|---|---|---|
| CA | 2611112 A1 | 5/2008 |
| EP | 1707740 A1 | 10/2006 |
| EP | 1890007 A2 | 2/2008 |

OTHER PUBLICATIONS

The extended European Search Report in counterpart European Application No. 11179297 filed Jun. 14, 2011.

*Primary Examiner* — Dwayne J White
(74) *Attorney, Agent, or Firm* — Kinney & Lange, P.A.

(57) ABSTRACT

An airfoil comprises an external surface formed in substantial conformance with a plurality of cross sections. Each of the cross sections has an axial chord and an offset at a corresponding fractional span as set forth in Table 2. Each of the cross sections is described by a set of Cartesian coordinates defined at the corresponding fractional span as set forth in Table 4.

20 Claims, 7 Drawing Sheets

TURBINE BLADE AIRFOIL

CROSS-REFERENCE TO RELATED APPLICATION

This application is related to co-pending application TURBINE VANE AIRFOIL by Jason L. O'Hearn et al., application Ser. No. 12/877,703, filed on even date herewith.

BACKGROUND

The present invention relates generally to rotary engines, and specifically to rotor and stator airfoils for gas turbine engines and other turbomachinery. In particular, the invention relates to airfoil geometry for blades and vanes subject to high velocity working fluid flow, including transonic flow applications.

Gas turbine engines include a variety of rotary-type internal combustion engines and combustion turbines, with applications in industrial power generation, aviation and transportation. The core of the gas turbine engine typically comprises a compressor, a combustor and a turbine, which are arranged in flow series with an upstream inlet and downstream exhaust. Incoming air is compressed in the compressor and mixed with fuel in the combustor, then ignited to generate hot combustion gas. The turbine generates rotational energy from the hot combustion gas, and cooler, expanded combustion products are exhausted downstream.

The compressor and turbine sections are usually arranged into one or more differentially rotating spools. The spools are further divided into stages, or alternating rows of blades and vanes. The blades and vanes generally have airfoil-shaped cross sections, which are designed to accelerate, turn and compress the working fluid flow, and to generate lift that is converted to rotational energy in the turbine.

In industrial gas turbines, power is delivered via an output shaft coupled to an electrical generator or other load, typically utilizing an external gearbox. Other configurations include turbofan, turboprop, turbojet and turboshaft engines for fixed-wing aircraft and helicopters, and specialized turbine engines for marine and land-based transportation, including naval vessels, trains and armored vehicles.

In turboprop and turboshaft engines the turbine drives a propeller or rotor, typically using a reduction gearbox to control blade speed. Turbojets generate thrust primarily from the exhaust, while turbofans drive a fan to accelerate flow around the engine core. Commercial turbofans are typically ducted, but unducted designs are also known. Some turbofans also utilize a geared drive to provide greater fan speed control, for example to reduce noise and increase engine efficiency, or to increase or decrease specific thrust.

Aviation turbines generally utilize two and three-spool configurations, with a corresponding number of coaxially rotating turbine and compressor sections. In two-spool designs the high pressure turbine drives a high pressure compressor, forming the high pressure spool or high spool. The low spool drives the fan, or a shaft for the rotor or propeller, and may include one or more low pressure compressor stages. Aviation turbines also power auxiliary devices including electrical generators, hydraulic pumps and elements of the environmental control system, for example using bleed air from the compressor or via an accessory gearbox.

In high-bypass turbofans, most of the thrust is generated by the fan. Variable-area nozzle surfaces can be deployed to regulate the bypass pressure and improve fan performance, particularly during takeoff and landing. Low-bypass turbofans provide greater specific thrust but are louder and less fuel efficient, and are more common on military jets and other high-performance aircraft. High-bypass turbofans utilize variable-area nozzle systems to regulate exhaust speed and specific thrust. Afterburner assemblies are typically used on military jets for short-term thrust augmentation.

In general, gas turbine engine performance is constrained by the need for higher compression ratios and combustion temperatures, which increase efficiency and output, versus the cost of increased wear and tear on engine components, including blade and vane airfoils. These tradeoffs are particularly relevant in the turbine stages downstream of the combustor, where gas path temperatures are elevated, and in other turbine and compressor sections subject to high velocity, high pressure working fluid flow, including transonic flow along at least part of the airfoil surface.

Unfortunately, these environments require complex nonlinear analysis and modeling techniques, making practical results difficult to accurately predict. High temperature, high pressure and transonic fluid flows also present a combination of engineering and design challenges, emphasizing the need for stress-resistant airfoil geometries that reduce shock-related losses and increase lift and turning efficiency, while improving engine performance and reducing long-term maintenance costs.

SUMMARY

This invention concerns an airfoil for a turbine. The airfoil has an external surface formed in substantial conformance with a plurality of cross sections, and each of the cross sections has an axial chord and an offset at a corresponding fractional span. The axial chords, offsets and fractional spans are provided in Table 1.

Each of the cross sections is described by a set of Cartesian coordinates defined at the corresponding fractional span, as provided in Table 3. For each cross section, the Cartesian coordinates, chord length, fractional span and offset are scalable based on the root chord length, span height, and root pitch of the airfoil.

DETAILED DESCRIPTION

Figure 1:
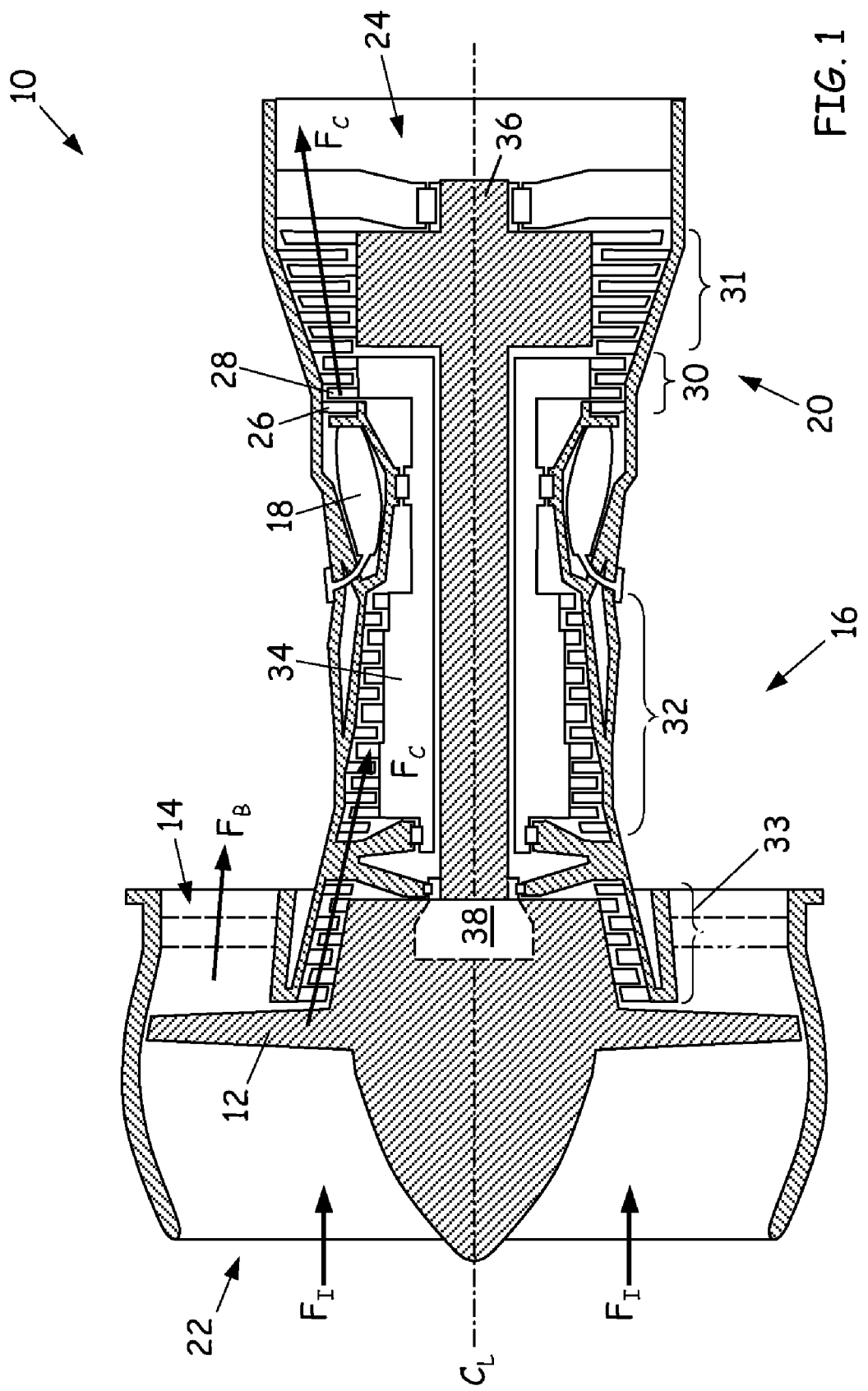
FIG. 1 is a cross-sectional view of a gas turbine engine.

FIG. 1 is a cross-sectional view of gas turbine engine 10. In this particular embodiment, gas turbine engine 10 comprises a turbofan engine with fan 12 positioned upstream of bypass duct 14. Bypass duct 14 is oriented about a turbine core comprising compressor section 16, combustor 18 and turbine section 20, which are arranged in flow series with upstream inlet 22 and downstream outlet 24.

Turbine section 20 comprises high pressure (HP) turbine 30 and low pressure (LP) turbine 31. Compressor section 16 comprises high pressure compressor 32 and low pressure compressor 33. High pressure turbine 30 is coupled to high pressure compressor 32 via HP shaft 34, forming the high pressure spool or high spool. Low pressure turbine 31 is coupled to low pressure compressor 33 and fan 12 via LP shaft 36, forming the low pressure spool or low spool. Shafts 34 and 36 are mounted coaxially about turbine axis (centerline) $C_L$, and rotate at different speeds.

Compressor and turbine sections 16 and 20 are subdivided into a number of stages formed by alternating rows of vane and blade airfoils. As shown in FIG. 1, for example, high pressure turbine 30 includes a first stage vane ring with a plurality of stationary vanes 26 and a first stage rotor with a plurality of rotating blades 28, each having airfoil geometries selected for high lift, low loss turbine operation, with improved efficiency and increased engine performance. Alternatively, vanes 26 and blades 28 are deployed either individually or in combination, and are located in any of the turbine stages, or in a compressor stage.

Fan 12 comprises a number of fan blades arranged around a disk or other rotating member. Fan 12 is coupled to LP turbine 31 via LP shaft 36, which drives fan 12 to provide thrust by accelerating flow through bypass duct 14. Depending on embodiment, fan 12 can be configured for high-bypass operation in a commercial or regional jet, or for low-bypass operation in a high-performance aircraft such as a military jet fighter. Fan 12 may also be coupled to geared fan drive mechanism 38, providing additional fan speed control.

In operation of gas turbine engine 10, incoming airflow $F_1$ enters inlet 22 and divides into bypass and core flows $F_B$ and $F_C$, downstream of fan 12. Bypass flow $F_B$ propagates through bypass duct 14, and core flow $F_c$ is directed into compressor section 16.

High and low pressure compressors 32 and 33 compress core flow $F_c$ for combustor 18. Compressed air is mixed with fuel in combustor 18, and ignited to produce hot combustion gas. The combustion gas exits combustor 18 and enters high pressure turbine 30, encountering turbine vanes 26 and blades 28.

Vanes 26 turn and accelerate the flow, and blades 28 generate lift to rotate HP shaft 34 and drive high pressure compressor 32. Partially expanded combustion gas enters low pressure turbine 31, driving low pressure compressor 33 and fan 12 via LP shaft 36. Spent combustion gas exits turbine engine 10 at outlet or exhaust nozzle 24.

Depending on configuration, low pressure compressor 32 may also be omitted, or may function as an intermediate pressure (IP) compressor. Alternatively, gas turbine engine 10 utilizes a three-spool design with separate low, intermediate and high pressure spools. In further embodiments, gas turbine engine 10 comprises an unducted turbofan, turboprop or turboshaft engine, or an industrial gas turbine, and the spool configuration varies accordingly.

The thermodynamic efficiency of any turbine engine depends on the pressure ratio, defined as the ratio of the pressure measured at inlet 22 and aft of high pressure compressor 32. In general, higher overall pressure ratios offer increased efficiency and improved engine performance, including greater specific thrust. High overall pressure ratios also raise the peak gas path temperature, core pressure and flow rate, increasing thermal and mechanical stress on engine components including vanes 26 and blades 28.

Overall engine performance thus depends upon the ability of turbine vanes 26 and blades 28 to operate efficiently when subject to thermal and mechanical stresses. High efficiency, low loss and stress resistant airfoil designs also reduce operating and maintenance requirements, improving engine reliability and increasing service life.

Figure 2:
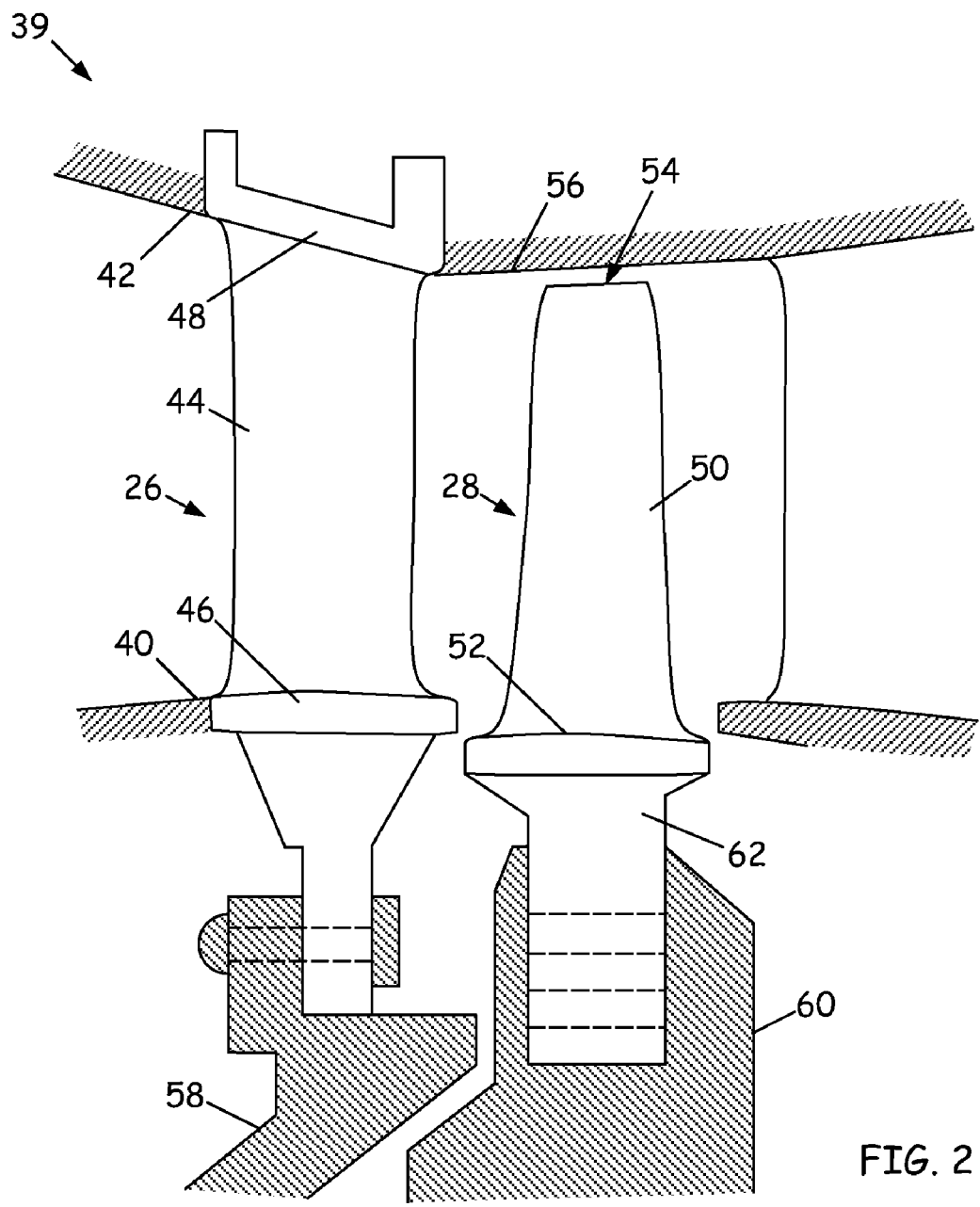
FIG. 2 is a side view of a turbine assembly for the gas turbine engine.

FIG. 2 is a side view of turbine assembly 39 with stator vane 26 and rotor blade 28. In this particular embodiment vane 26 and blade 28 are located downstream of the combustor, for example in the first stage of a high pressure turbine assembly as shown in FIG. 1.

Turbine assembly 39 forms an annular flowpath for combustion gas, bounded at inner diameter (ID) ring 40 and outer diameter (OD) ring 42. Vane 26 extends radially along airfoil 44, from inner platform 46 at inner ring 40 to outer platform or shroud 48 at outer ring 42. Blade 28 extends radially along airfoil 50, from platform 52 at the inner flow margin to airfoil tip 54 at the outer flow margin, opposite platform 52 and facing turbine casing 56.

Vane 26 is attached to a static turbine component such as casing 56 or turbine support 58, or both. Vane 26 turns and accelerates the working fluid as it flows through turbine assembly 39. Based on the particular geometry of airfoil 44, turbine vane 26 also guides flow along the surfaces of platform 46 and shroud 48.

Rotor blade 28 is mounted to a rotating component such as turbine disk 60, for example using a fir tree, dovetail or other blade attachment 62 capable of retaining blade 28 when subject to centripetal forces at high rotational speed. Turbine blade 28 generates lift based on the geometry of airfoil 56, and shapes flow along the inner flowpath at platform 52.

Blade 28 operates with rotational clearance between airfoil 50 at tip 54 and the outer flow boundary at turbine casing 56. Depending on embodiment, airfoil tip 54 may accommodate an abradable seal arrangement or other seal structure to reduce losses. Additional sealing structures are typically provided between turbine support 58 and rotor disk 60, and at other locations in the turbine assembly.

Figure 3A:
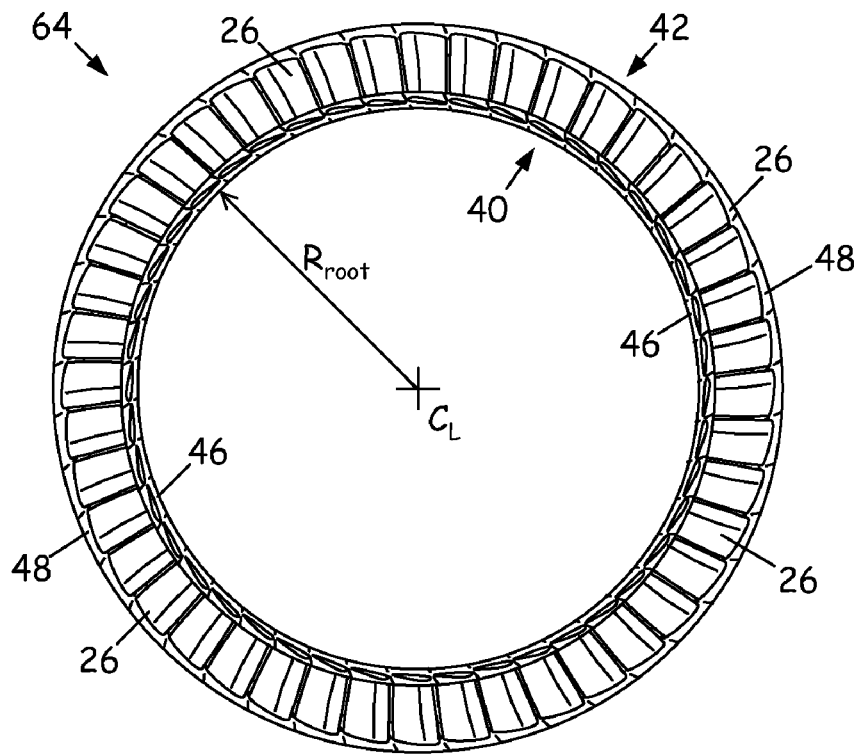
FIG. 3A is an axial view of a vane ring for a turbine.

FIG. 3A is a schematic view of turbine vane ring 64, taken in a downstream axial direction along turbine axis $C_L$ of FIG. 1. Turbine vane ring 64 comprises a plurality of vanes 26, which are arranged circumferentially about axis $C_L$ to form inner ring 40 at platform 46, with outer ring 42 at shroud 48. In one particular embodiment, vane ring 64 consists of forty-four turbine vanes 26, but the number varies according to engine size and configuration.

Turbine vanes 26 extend from ID ring 40 at platform 46 to OD ring 42 at shroud 48. Inner turbine ring 40 is oriented about the engine axis at radial distance $R_{root}$ from axis $C_L$ to the root section of vanes 26. Outer turbine ring 42 located at radial distance $R_{root}$ plus the span height, where the span height is measured from the root section to the tip section.

In one embodiment, individual turbine vanes 26 are attached to static turbine support structures to form inner and outer flow rings 40 and 42 at platform 46 and shroud 48, respectively. Alternatively, a number of vanes 26 are assembled or manufactured together, for example in vane pairs, triplets or other groupings. In further embodiments, vane ring 64 is formed in axially split vane ring sections, or as a complete annular structure that is attached to the rest of the turbine assembly as a unit.

When exposed to high gas path temperatures, turbine vanes 26 are configured for interior impingement cooling, exterior film cooling, or a combination thereof. In these embodiments, cooling fluid is supplied via couplings to internal cooling passages in platform 46, shroud 48, or both.

Figure 3B:
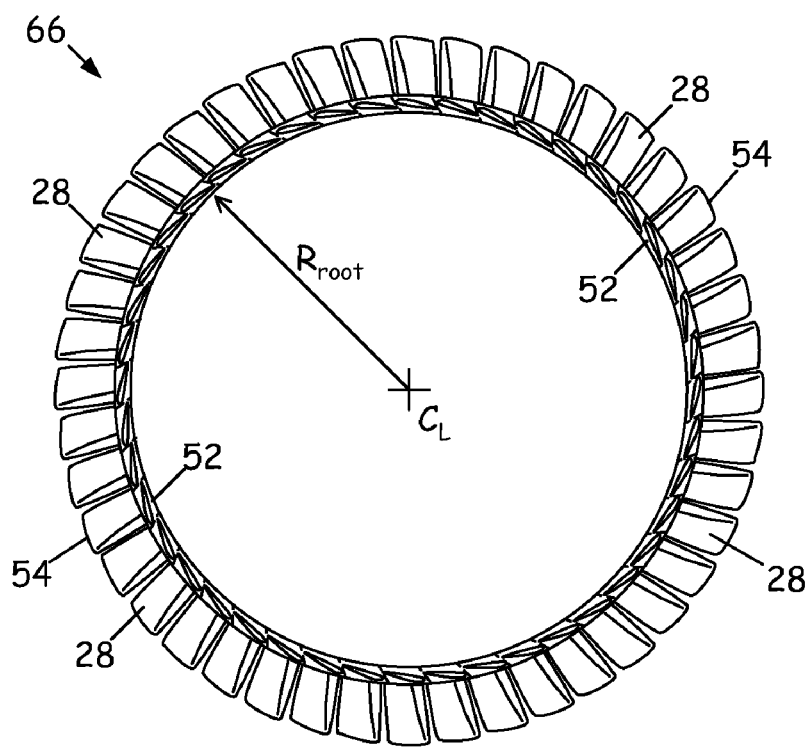
FIG. 3B is an axial view of a rotor stage for a turbine.

FIG. 3B is a schematic view of turbine rotor stage 66, taken in a downstream axial direction along turbine axis $C_L$. Turbine rotor stage 66 comprises a plurality of blades 28, which are arranged circumferentially about axis $C_L$ with platforms 52 forming the ID flowpath. In one particular embodiment, rotor stage 66 consists of forty-four turbine blades 28, but the number varies according to engine size and configuration.

Turbine blades 28 extend radially from platform 52 to airfoil tip 54. Root radius $R_{root}$ is measured from axis $C_L$ to the root section of airfoil 50, but the vane and blade platforms do not necessarily align and root radius $R_{root}$ typically varies between the vane ring and rotor stages.

In one embodiment, turbine blades 28 are individually attached to a rotor disk, hub, shaft or other rotational component with platforms 46 forming the inner flow boundary. Alternatively, blades 28 are attached in pairs or other blade groupings, or formed as a unit with the rotor disk or hub. In cooled embodiments, the blade attachments accommodate fluid couplings to internal flow passages for impingement or film cooling, or a combination thereof.

Figure 4A:
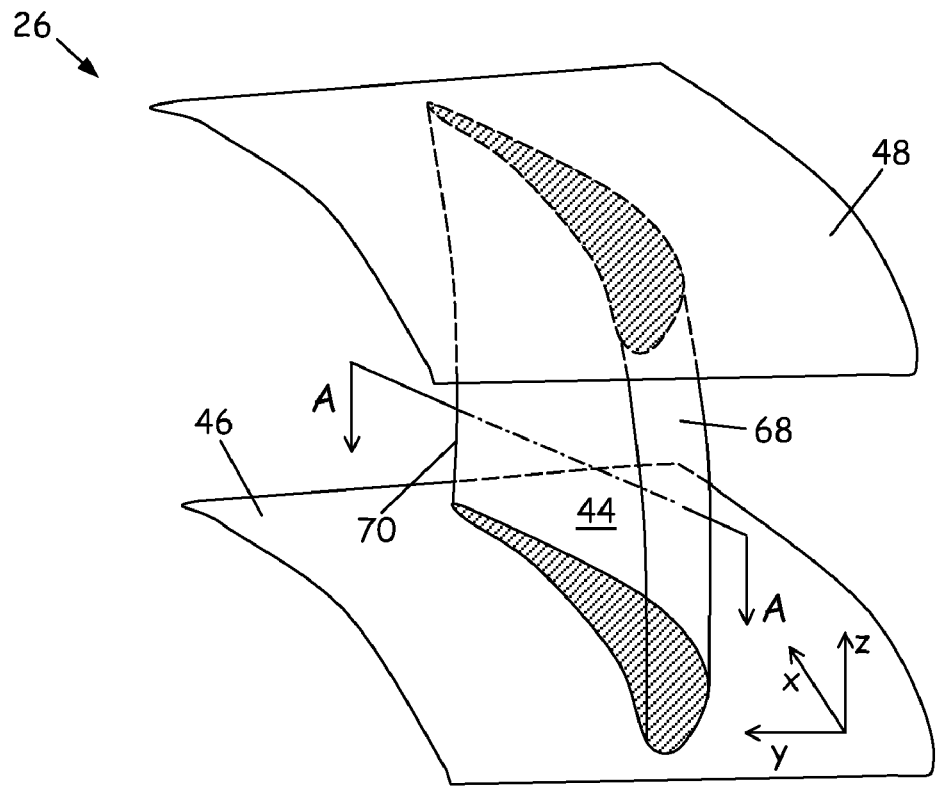
FIG. 4A is a perspective view of a stator vane for the vane ring.

FIG. 4A is a perspective view of turbine vane 26 with airfoil 44. Airfoil 44 extends radially from platform 46 to shroud 48, and axially from leading edge 68 to trailing edge 70. In this particular embodiment, shroud 48 is attached to airfoil 44 at the tip section, and coupled to a static turbine structure. Alternatively, turbine vane 26 is unshrouded, and mounted in cantilever fashion with airfoil portion 44 oriented either inward or outward. In these embodiments, the tip section of airfoil 44 is generally positioned in rotational clearance with respect to a disk, drum, hub or other rotating flow boundary.

Figure 4B:
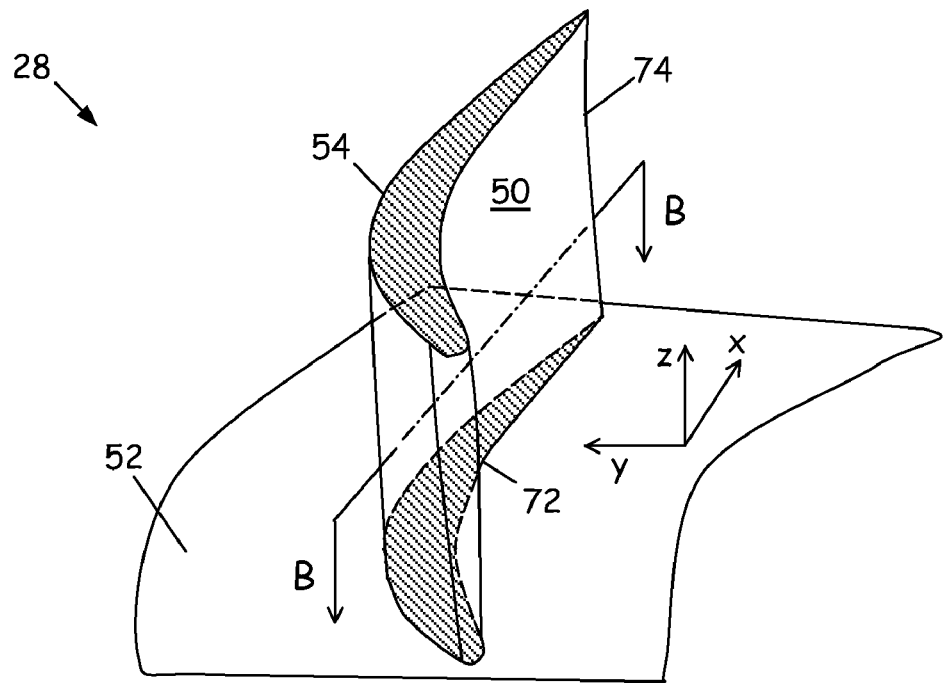
FIG. 4B is a perspective view of a rotor blade for the rotor stage.

FIG. 4B is a perspective view of turbine rotor blade 28 with airfoil 50. Airfoil 50 extends radially from platform 52 to tip 54, and axially from leading edge 72 to trailing edge 74. In this particular embodiment, airfoil 50 is unshrouded, with tip 54 positioned in rotational clearance with respect to a turbine casing or other flow boundary. Alternatively, an outer platform or shroud is coupled to airfoil 50 at tip 54.

Turbine vanes 26 and blades 28 are formed of a high strength, heat resistant material such as a nickel-based or cobalt-based superalloy, or of a high temperature, stress resistant ceramic or composite material. One or more thermal barrier coatings, abrasion-resistant coatings or other protective coatings are typically applied to selected surfaces, for example the leading or trailing edge, the tip or root section of the airfoil, or the platform or shroud. In cooled embodiments, internal fluid passages and external cooling apertures provide for a combination of impingement and film cooling.

Airfoil, blade and vane geometries are described in terms of Cartesian coordinates defined along x, y and z axes. As shown in FIGS. 4A and 4B, the x axis is defined in a substantially downstream axial direction, the y axis is defined in a substantially circumferential or rotational direction, and the z axis is defined in a substantially radial direction. The coordinates are discussed below with respect to the particular blade, vane and airfoil configurations FIGS. 6A, 6B and 7.

Figure 5:
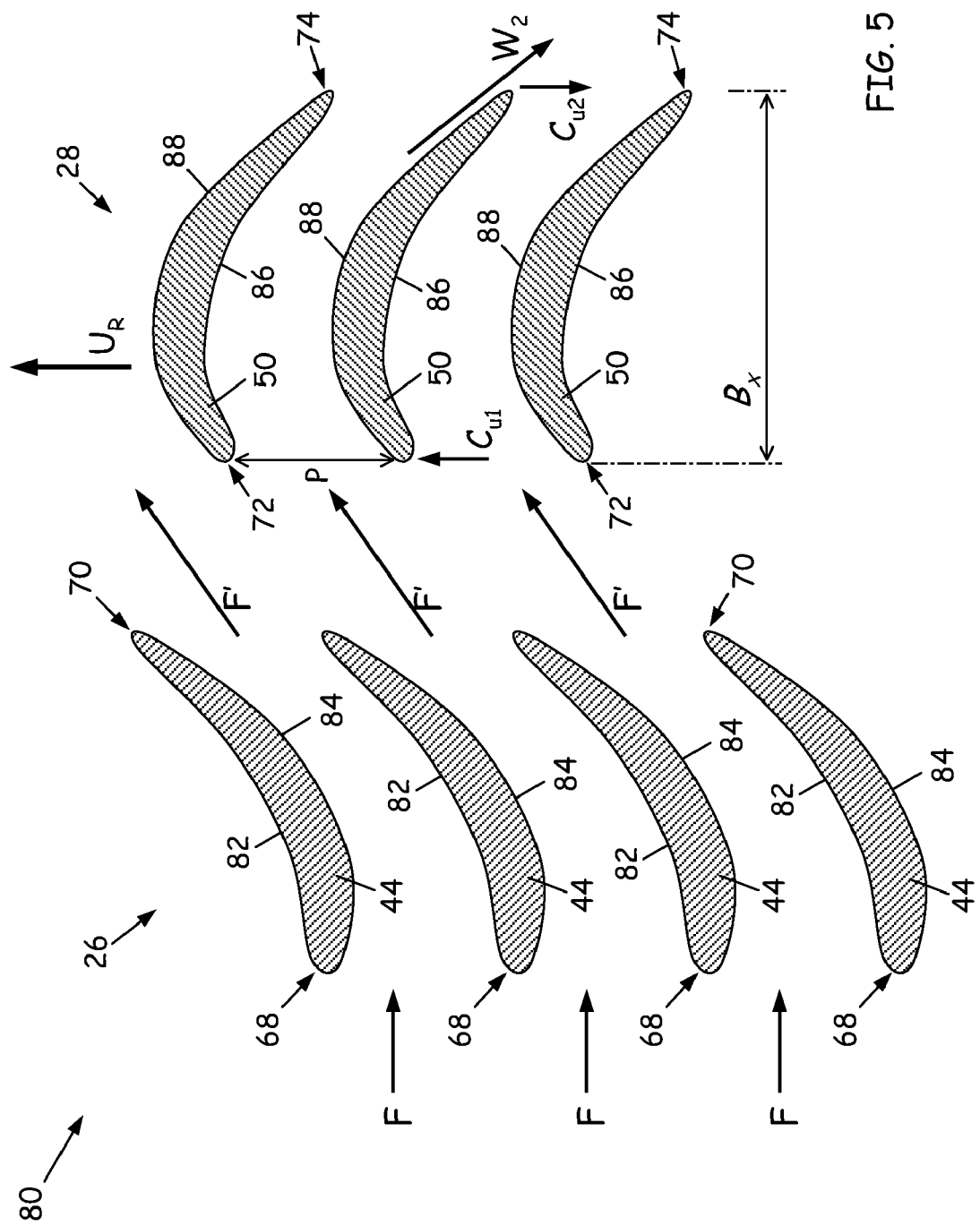
FIG. 5 is a schematic view of a turbine stage, showing the gas flowpath.

FIG. 5 is a schematic view of turbine stage 80, illustrating flow geometry. Stator vanes 26 and rotor blades 28 are shown with airfoils 44 and 50 in cross section, taken along line A-A of FIG. 4A and line B-B of FIG. 4B, respectively.

Turbine stage 80 is a first, second or higher-order stage of a turbine apparatus, for example in a high, low or intermediate pressure turbine or compressor spool. Turbine stage 80 utilizes either of airfoils 44 and airfoils 50 independently, or both airfoils 44 and airfoils 50 together.

Turbine vanes 26 comprise airfoils 44 with concave high pressure surfaces 82 (top side in FIG. 5) and convex low pressure (suction) surfaces 84 (bottom). High and low pressure surfaces 82 and 84 extend downstream from leading edge 68 to trailing edge 70, defining turbine vane airfoils 44 therebetween.

Turbine blades 28 comprise airfoils 50 with high pressure surfaces 86 (bottom side in FIG. 5) and low pressure (suction) surfaces 88 (top). High and low pressure surfaces 86 and 88 extend from leading edge 72 to trailing edge 74, defining turbine blade airfoils 50 therebetween. Pitch P is determined between adjacent blade or vane airfoils at a particular radial height or fractional span, for example at vane leading edge 68 or blade leading edge 72.

Turbine vanes 26 and blades 28 are shown in a stacked or "unwrapped" view to illustrate the flow of working fluid. Vane and blade airfoils 44 and 50 each provide for low loss, high lift turbine operation with efficient turning and acceleration of the working fluid flow, including regions of transonic flow along the airfoil surfaces.

In turbine operation, flow F is incident in a substantially axial direction onto leading edge 68 of vanes 26, with blades 28 rotating past trailing edge 70. Vane airfoils 44 turn and accelerate the working fluid along pressure and suction surfaces 82 and 84, generating flow F' onto leading edge 72 of blades 28. Note that the flow velocity and angle of incidence depend on rotational speed $U_R$, which varies along the span of each blade airfoil 50.

The Zweifel lift coefficient (or Zweifel number) is a dimensionless ratio between the actual and ideal load on blade airfoils 50, and is given by:

$$\text{Zweifel Number} = \frac{1}{g} \frac{\dot{m}\Delta Cu}{\frac{1}{2}\rho W_2^2 B_x h}. \quad [1]$$

In this expression, g is the local gravitational constant or acceleration due to gravity, approximately 32.2 feet per second squared (ft/s$^2$) or 9.81 m/s$^2$. The mass flow rate ($\dot{m}$) is given either in pounds-mass/second (lbm/s) or kilograms/second (kg/s), and fluid density ρ is expressed in lbm-s$^2$/ft$^4$ or kg/m$^3$.

Speeds are typically given in feet/second (ft/s) or meters/second (m/s), where the axial cord length ($B_x$) and span height (h) are measured in feet (ft) or meters (m), respectively. The relative exit velocity is $W_2$, and the change in tangential velocity across the blade is $\Delta C_u$:

$$\Delta Cu = C_{u1} - C_{u2}. \quad [2]$$

The Zweifel number depends upon the detailed geometry of airfoils 50 and the adjacent surfaces of turbine blades 28, including the blade platform. Low loss blades have Zweifel number greater than one, for example in the range of 1.10 and above, imparting greater rotational energy to the turbine and reducing the number of individual blades 28 required for each turbine stage. Suitable blade designs also minimize weight penalties and reduce the need for cooling fluid flow, provide stress resistance and dynamic stability at high temperatures and rotational speeds, and limit shock wave losses in transonic flow.

Engine performance also depends on upstream flow conditioning, and turbine vanes 26 are subject to related design considerations. In particular, suitable vane airfoils 44 and adjacent platform and shroud surfaces are shaped to generate efficient turning and acceleration while minimizing pressure and shock losses. Turbine vanes 26 also emphasize designs with lower weight and reduced cooling fluid needs, while providing efficient, reliable performance across a range of different turbine operating conditions.

Figure 6B:
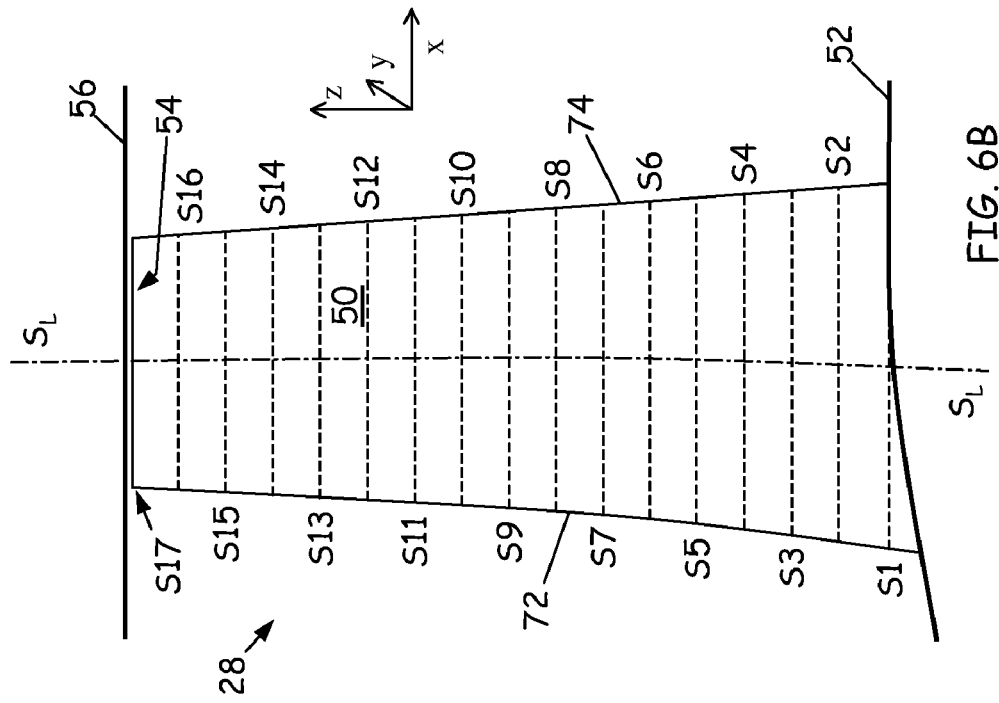
FIG. 6B is a stacking section view of a blade airfoil.
Figure 6A:
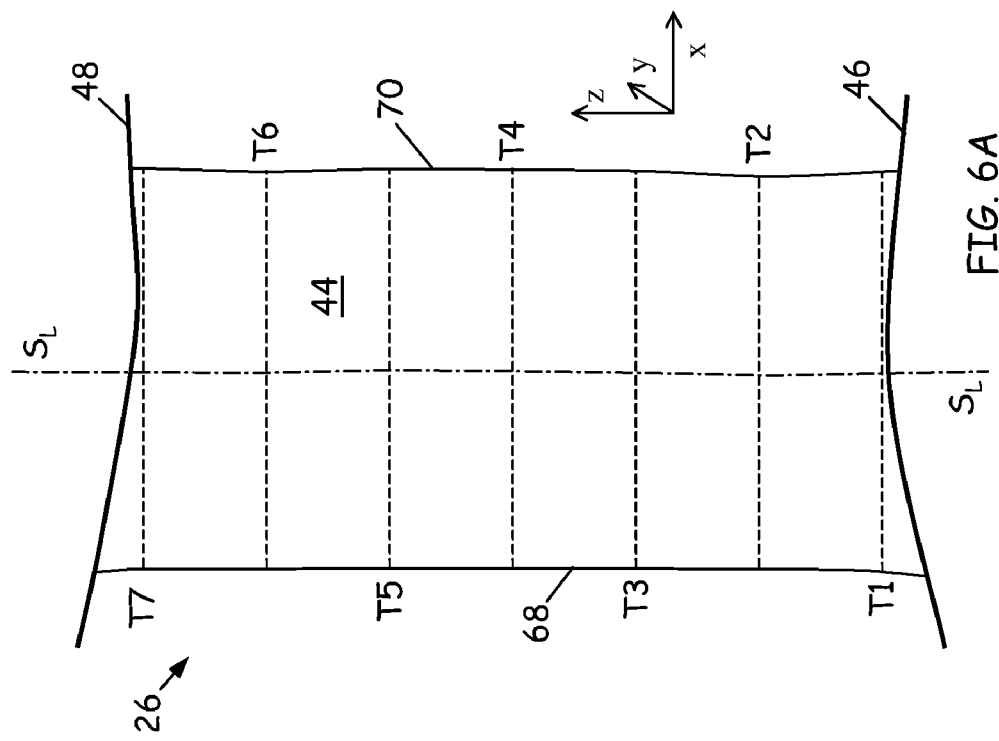
FIG. 6A is a stacking section view of a vane airfoil.

FIG. 6A is a stacking section view of turbine vane 26. Vane sections T1-T7 are distributed at one sixth intervals along the span of airfoil 44, from minimum span proximate platform 46

(root or ID section T1) to full span proximate shroud 48 (tip or OD section T7, at height h).

Platform 46 is attached to vane airfoil 44 at root section T1, forming part of the inner diameter (ID) flowpath corresponding to inner vane ring 40 as shown in FIG. 3A. Shroud 48 is attached at tip section 7, forming part of the outer diameter (OD) flowpath corresponding to outer ring 42. The inner flow ring is thus formed at approximately the root height or root radius ($R_{root}$), and the outer flow ring is formed at approximately the root radius plus the span height ($R_{root}$+h).

FIG. 6B is a sectional view of turbine rotor blade 28. Blade sections S1-S17 are distributed at one sixteenth intervals along the span of airfoil 50, from minimum span proximate platform 52 (ID or root section S1) to maximum span proximate tip 54 (OD or tip section S17). Platform 52 is attached to blade airfoil 50 at root section S1, forming part of the inner flowpath. Airfoil tip 54 is positioned in rotational clearance with respect casing 56, along the outer flowpath.

Blade and vane sections T1-T7 and S1-S17 extend along the axial chords of airfoils 44 and 50, with normalized chord lengths and two-dimensional offsets (or displacements) given in Tables 1 and 2, respectively. The corresponding fractional spans (S) are normalized to full span height h:

$$S = \frac{Z - Z_{root}}{h}, \quad [3]$$

where Z is the z coordinate (or height) of the given sectional line and $Z_{root}$ is the z coordinate of the ID or root airfoil section, for example root vane section T1 or root blade section S1. Full span height h is defined between the root and the tip:

$$h = Z_{tip} - Z_{root}, \quad [4]$$

where $Z_{tip}$ is the z coordinate of the OD or tip section, for example outer (tip) vane section T7 or outer blade section S17.

Chord lengths $B_X$ are measured along the axial direction and normalized according to root chord length $B_{Xroot}$, as defined for the innermost (root) section:

$$\frac{B_X}{B_{Xroot}} = \frac{X_{max} - X_{min}}{X_{max}(Z_{root}) - X_{min}(Z_{root})}. \quad [5]$$

Stacking lines $S_L$ extend through the center of gravity of sections T1-T7 and S1-S17, respectively. Two-dimensional stacking offsets ΔX and ΔY are determined by the position of the leading edge ($X_{LE}$) relative to the blade root, and normalized by the root axial chord length:

$$\frac{\Delta X}{B_{Xroot}} = \frac{X_{LE} - X_{LE}(Z_{root})}{X_{max}(Z_{root}) - X_{min}(Z_{root})}. \quad [6]$$

The y-axis is directed in a generally circumferential direction, and y offsets ΔY are normalized by root pitch $\tau_{root}$ (that is, the tangential blade arc at the root). Note that the root pitch depends on the number of airfoils (N):

$$\frac{\Delta Y}{\tau_{root}} = \frac{Y_{LE} - Y_{LE}(Z_{root})}{2\pi Z_{root}/N}. \quad [7]$$

Figure 7:
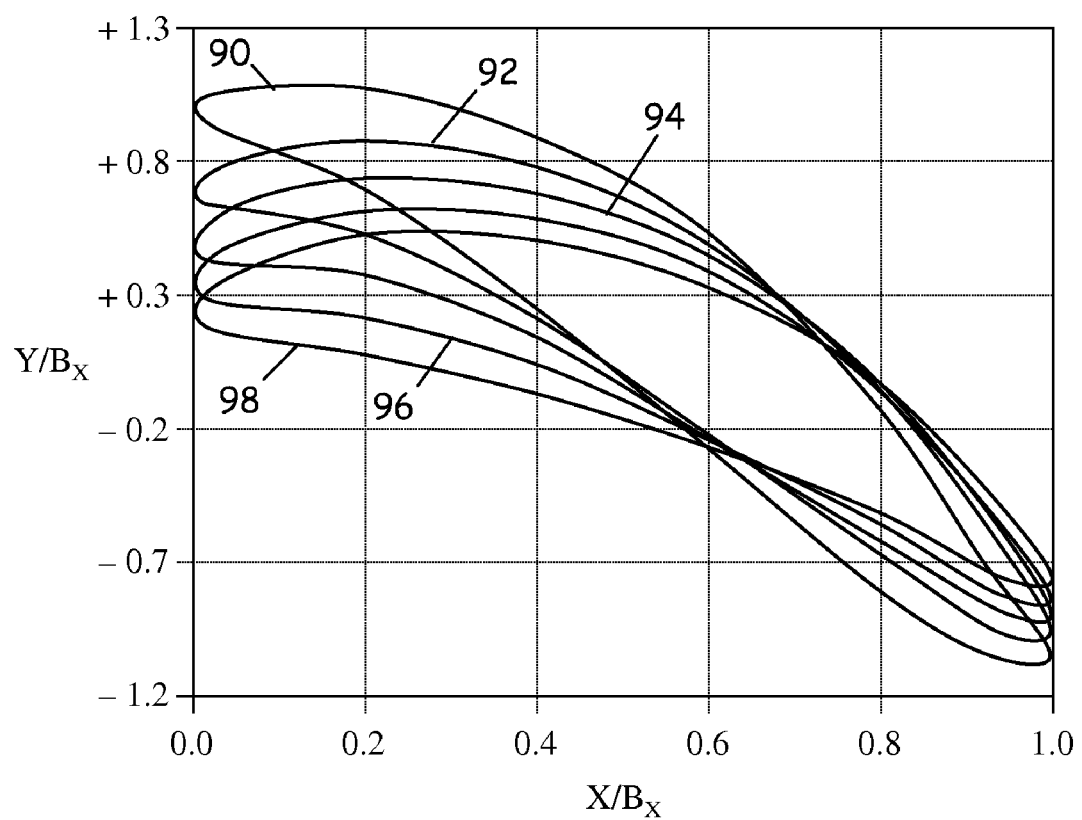
FIG. 7 is cross sectional view of representative airfoil sections.

FIG. 7 is a cross sectional view of representative airfoil sections 90, 92, 94, 96 and 98, for example any of sections T1-T7 of vane airfoil 44 (FIG. 6A), or sections S1-S17 of blade airfoil 50 (FIG. 6B). Both the x and y dimensions are normalized by axial chord length $B_X$, as defined for each individual airfoil section. Sections 90, 92, 94, 96 and 98 thus extend from a leading edge region with normalized x coordinate $X/B_X$ approaching zero, to a trailing edge region with normalized x coordinate $X/B_X$ approaching one.

Normalized y coordinates $Y/B_X$ are also given in terms of the axial chord, but the y coordinates are not limited to the leading and trailing edge and vary over a different range. In the representative airfoil sections of FIG. 7, for example, normalized y coordinates $Y/B_X$ range from of about −1.2 to about +1.3. Alternatively, normalized y coordinates $Y/B_X$ vary across a range of about ±1.0 or less, or about ±2.5 or more.

Airfoil sections are defined by sets of normalized Cartesian coordinate pairs $X/B_X$ and $Y/B_X$, which are provided for vane and blade airfoils in Tables 3 and 4, respectively. The Cartesian coordinates define points on a cold, uncoated, stationary airfoil surface, in a plane of constant z. Additional elements such as cooling holes, protective coatings, fillets and seal structures may also be formed onto the specified airfoil surface, or onto an adjacent platform or shroud surface, but these elements are not necessarily described by the normalized coordinates.

Each airfoil section is normalized to its own axial chord length $B_X$. The z coordinate is determined by the corresponding fractional span S, from Tables 1 and 2. For each section the x and y coordinates start at the leading edge, traverse the convex surface clockwise to the trailing edge, and continue across the concave surface back to the leading edge. Three dimensional airfoil surfaces are formed by joining adjacent points in Tables 3 and 4 in a smooth manner along the corresponding z plane, and joining adjacent sections along the span.

In general, the blade and vane airfoils described here have a combination of axial sweep and tangential lean. Depending on embodiment, the lean and sweep angles sometimes vary by up to ±5°±10°, ±25°, or more. In addition, the airfoils are sometimes rotated with respect to a radial axis or a normal to the platform or shroud surface, for example by up to ±5°, ±10° or ±25°, or more.

Airfoil surfaces are scaled to a particular size or absolute dimension by fixing the fractional span and normalized axial chord to corresponding physical dimensions of the turbine system, along with the normalized displacements and the normalized Cartesian coordinates. In particular, the root axial chord ($B_{Xroot}$) determines the absolute chord length ($B_X$) from the normalized axial chords ($B_X/B_{Xroot}$), and the chord length determines the absolute airfoil coordinates (X and Y) from the normalized coordinates ($X/B_X$ and $Y/B_X$, respectively). The chord length also determines the absolute x offsets (ΔX) from the corresponding normalized values (ΔX/$B_X$), and the root pitch ($\tau_{root}$) determines the absolute y offsets (ΔY) from the normalized y values (ΔY/$\tau_{root}$).

Normalized axial chords and offsets are given for blades and vanes in Tables 1 and 2, respectively, with normalized Cartesian coordinates in Tables 3 and 4. To obtain absolute x coordinates, the Cartesian coordinates and offsets are both scaled to the root axial chord:

$$X_{(abs)} = \left(\frac{X}{B_X}\right)\left(\frac{B_X}{B_{Xroot}}\right)B_{Xroot} + \left(\frac{\Delta X}{B_{Xroot}}\right)B_{Xroot}. \quad [8]$$

For y coordinates, the displacements are scaled by the root pitch:

$$Y_{(abs)} = \left(\frac{Y}{B_X}\right)\left(\frac{B_X}{B_{Xroot}}\right)B_{Xroot} + \left(\frac{\Delta Y}{\tau_{root}}\right)\tau_{root}. \quad [9]$$

The z position (height) is given by scaling the fractional span to the span height:

$$Z=hS+Z_{root}. \quad [10]$$

This fixes the spacing between successive cross sections, and determines the relative height (Z) of each set of airfoil coordinates (X,Y), as defined along the exterior surface of the vane or blade. The absolute radial height is based on the height of the root section:

$$R_{(abs)}=hS+R_{root}, \quad [11]$$

where the root radius ($R_{root}$) is measured from the turbine axis.

The root radius and span height vary among different blade and vane airfoils, as do the root axial chord and pitch. In one set of embodiments, root chord length $B_{Xroot}$ varies from about three eighths inch to about two inches, for example about 0.375 inches (9.5 mm), about 0.5 inches (12.7 mm), about 0.75 inches (19.1 mm), about 1.0 inches (25.4 mm), about 1.5 inches (38.1 mm) or about 2.0 inches (50.8 mm), or within ranges therebetween. Root pitch $\tau_{root}$ varies from about one half inch to about two and one half inches, for example about 0.5 inches (12.7 mm), about 1.0 inches (25.4 mm), about 1.5 inches (38.1 mm), about 2.0 inches (50.8 m) or about 2.5 inches (63.5 mm), or within ranges therebetween. Span height h varies from about one half inch to about three inches, for example about 0.5 inches (12.7 mm), about 1.0 inches (25.4 mm), about 1.5 inches (38.1 mm), about 2.0 inches (50.8 m), about 2.5 inches (63.5 mm) or about 3.0 inches (76.2 mm), or within ranges therebetween. Root radius $R_{root}$ varies from about three to about twelve inches, for example about 3.0 inches (76 mm), about 4.0 inches (102 mm), about 6.0 inches (152 mm), about 8.0 inches (203 mm) or about 12.0 inches (305 mm), or within ranges therebetween.

In one turbine vane embodiment, root chord $B_{Xroot}$ is about 0.98±0.05 inches (24.9±1.3 mm), root pitch $\tau_{root}$ is about 1.34±0.05 inches (34.0±1.3 mm), span height h is about 1.38±0.05 inches (35.1±1.3 mm), and root radius $R_{root}$ is about 6.80±0.10 inches (172.7±2.5 mm). In one turbine blade embodiment, root chord $B_{Xroot}$ is about 0.74±0.05 inches (18.8±1.3 mm), root pitch $\tau_{root}$ is about 0.96±0.05 inches (24.4±1.3 mm), span height h is about 1.56±0.05 inches (39.6±1.3 mm), and root radius $R_{root}$ is about 6.70±0.10 inches (170.2±2.5 mm).

Novel aspects of the blade, vane and airfoil surfaces described herein are achieved by substantial conformance to specified geometries. Substantial conformance generally includes or may include a manufacturing tolerance of about ±0.050 inches (±1.27 mm), in order to account for variations in molding, cutting, shaping, surface finishing and other manufacturing processes, and to accommodate variability in coating thicknesses. This tolerance is absolute, and applies to each of the specified airfoil, blade and vane surfaces, regardless of size.

In particular, the manufacturing tolerance is applicable to blade, vane and airfoil surfaces having a particular size and shape, as determined by selecting particular scaling parameters (e.g., $B_{Xroot}$, $\tau_{root}$, h and $R_{root}$) from within a specified range, and to non-dimensional (normalized) blade, vane and airfoil surfaces, which are scalable to different sizes and shapes within that range. In these embodiments, substantial conformance is based on sets of points representing a three-dimensional surface with particular physical dimensions, for example in inches or millimeters, as determined by selecting particular values of the scaling parameters. A substantially conforming airfoil, blade or vane structure has surfaces that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these embodiments, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Inner (ID) and outer (OD) flowpath coordinates for turbine vane platforms and shrouds are provided in Table 5, with corresponding ID coordinates for turbine blade platforms are given in Table 6. For the turbine vanes of Table 5, the ID (platform) and OD (shroud) surfaces are rotationally symmetric about the turbine axis, with the curves of rotation defined according to the platform and shroud coordinates set forth in Table 5. For the turbine blades of Table 6, ID (platform) coordinates are given in three dimensions.

For both blades and vanes, the specified surfaces represent cold, uncoated and stationary inner and outer flowpath surfaces, without cooling holes, protective coatings, fillets, seals and other structures that may be added during the manufacturing process. The manufacturing tolerance is about ±0.050 inches (±1.27 mm), with substantial conformance to the specified geometry as described above for the corresponding airfoil surfaces of Tables 1-4.

The inner and outer flowpaths for turbine vanes are given in terms axial (x) coordinates $X_{ID}$ and $X_{OD}$ at corresponding fractional spans S, with rotational coordinate y defined to be zero. That is:

$$S_{ID} = \frac{Z_{ID} - Z_{root}}{h} \quad [12]$$

and $$S_{OD} = \frac{Z_{OD} - Z_{root}}{h}, \quad [13]$$

where z coordinates $Z_{ID}$ and $Z_{OD}$ define the platform and shroud surfaces, respectfully. The x coordinates are normalized by the root chord, and defined with respect to the leading edge at the root, $X_{LE}(Z_{root})$. Thus $$\frac{X_{ID}}{B_{Xroot}} = \frac{X - X_{LE}(Z_{root})}{X_{max}(Z_{root}) - X_{min}(Z_{root})} \quad [14]$$

and

-continued $$\frac{X_{OD}}{B_{Xroot}} = \frac{X - X_{LE}(Z_{root})}{X_{max}(Z_{root}) - X_{min}(Z_{root})}. \quad [15]$$

The coordinates in Table 5 extend axially along a smooth curve starting in front of the leading edge and ending behind the trailing edge. The surfaces are generated by rotating the curves about the turbine axis to form an annular, axially symmetric flow duct. Thus the inner boundary is described by a curve of rotation defined along or in accordance with platform coordinates $X_{ID}$ and $Z_{ID}$, and the outer boundary is described by a curve of rotation along or in accordance with shroud coordinates $X_{OD}$ and $Z_{OD}$.

The inner and outer vane rings are scaled to absolute dimensions using the corresponding normalization constants. Thus:

$$X_{ID(abs)} = \frac{X_{ID}}{B_{Xroot}} B_{Xroot}, \quad [16]$$

where there is no offset because the surface is already defined in terms of the root leading edge. The Z position is $$Z_{ID} = hS_{ID} + Z_{root}, \quad [17]$$

and the absolute radius of rotation for each point on the curve is $$R_{ID(abs)} = hS_{ID} + R_{root}. \quad [18]$$

The outer flowpath is defined by substituting for $Z_{ID}$ and $S_{ID}$:

$$Z_{OD} = hS_{OD} + Z_{root}; \quad [19]$$

$$R_{OD(abs)} = hS_{OD} + R_{root}. \quad [20]$$

The ID flowpath (S≈0) is thus formed by rotation of the platform curve about the turbine axis at approximately the root radius, and the OD flowpath (S≈1) is formed by rotation of the shroud curve at approximately the root radius plus the span height.

For turbine blades, the inner diameter flow surface is defined in substantial accordance with three-dimensional platform coordinates $X_P$, $Y_P$ and $Z_P$, as set forth in Table 6. The x coordinates are scaled by the root chord and measured from the root leading edge:

$$\frac{X_P}{B_{Xroot}} = \frac{X - X_{LE}(Z_{root})}{X_{max}(Z_{root}) - X_{min}(Z_{root})}. \quad [21]$$

The y coordinates are scaled by the root pitch:

$$\frac{Y_P}{\tau_{root}} = \frac{Y - Y_{LE}(Z_{root})}{2\pi Z_{root}/N}, \quad [22]$$

and the z coordinate or height is determined from the corresponding fractional span on the platform surface (Sp):

$$S_P = \frac{Z_P - Z_{root}}{h}. \quad [23]$$

Absolute x and z coordinates are determined similarly for both vane and blade platforms:

$$X_{P(abs)} = \frac{X_P}{B_{Xroot}} B_{Xroot}; \quad [24]$$

$$Z_P = hS_P + Z_{root}. \quad [25]$$

The absolute radial height is $$R_{P(abs)} = hS_P + R_{root}, \quad [26]$$

and the absolute y coordinate is determined from root pitch $\tau_{root}$:

$$Y_{P(abs)} = \left(\frac{Y_P}{\tau_{root}}\right) \tau_{root}. \quad [27]$$

Again, there is no offset term because the platform and shroud surfaces are already measured from the leading edge of the root section, where the offset is defined to be zero.

In general, the platform and shroud surfaces are curved in order to provide converging or diverging flow. Thus the fractional span values vary slightly about S=0 along the ID curve, and about S=1 along the OD curve. In some axial positions, the flow rings extend above or below the root (ID) and tip (OD) blade sections, corresponding to fractional span values that are less than zero or greater than one, respectively.

TABLE 1

Normalized Axial Chord and Offset (Vane Airfoils)
Tolerance: ±0.05" (±1.27 mm)

| Vane Section | Fractional Span (S) | Axial Chord $B_X/B_{Xroot}$ | X offset $\Delta X/B_{Xroot}$ | Y offset $\Delta Y/\tau_{root}$ |
|---|---|---|---|---|
| T1 | 0.0000 | 1.0000 | 0.00000 | 0.00000 |
| T2 | 0.1667 | 0.9732 | 0.03970 | −0.01068 |
| T3 | 0.3333 | 0.9838 | 0.03970 | −0.01074 |
| T4 | 0.5000 | 0.9894 | 0.03970 | −0.01085 |
| T5 | 0.6667 | 0.9899 | 0.03970 | −0.01090 |
| T6 | 0.8333 | 0.9855 | 0.03970 | −0.01089 |
| T7 | 1.0000 | 1.0130 | 0.03972 | −0.01085 |

TABLE 2

Normalized Axial Chord and Offset (Blade Airfoils)
Tolerance: ±0.05" (±1.27 mm)

| Blade Section | Fractional Span (S) | Axial Chord $B_X/B_{Xroot}$ | X offset $\Delta X/B_{Xroot}$ | Y offset $\Delta Y/\tau_{root}$ |
|---|---|---|---|---|
| S1 | 0.0000 | 1.0000 | 0.0000 | 0.0000 |
| S2 | 0.0625 | 0.9721 | 0.0397 | −0.0107 |
| S3 | 0.1250 | 0.9458 | 0.0397 | −0.0107 |
| S4 | 0.1875 | 0.9209 | 0.0397 | −0.0108 |
| S5 | 0.2500 | 0.8976 | 0.0397 | −0.0109 |
| S6 | 0.3125 | 0.8758 | 0.0397 | −0.0109 |
| S7 | 0.3750 | 0.8554 | 0.0397 | −0.0108 |
| S8 | 0.4375 | 0.8361 | 0.0000 | 0.0000 |
| S9 | 0.5000 | 0.8178 | 0.0397 | −0.0107 |
| S10 | 0.5625 | 0.8007 | 0.0397 | −0.0107 |
| S11 | 0.6250 | 0.7841 | 0.0397 | −0.0108 |
| S12 | 0.6875 | 0.7676 | 0.0397 | −0.0109 |
| S13 | 0.7500 | 0.7511 | 0.0397 | −0.0109 |
| S14 | 0.8125 | 0.7343 | 0.0397 | −0.0108 |
| S15 | 0.8750 | 0.7173 | 0.0000 | 0.0000 |
| S16 | 0.9375 | 0.7005 | 0.0397 | −0.0107 |
| S17 | 1.0000 | 0.6838 | 0.0397 | −0.0107 |

TABLE 3

Normalized Coordinates (Vane Airfoils)
Tolerance: ±0.05" (±1.27 mm)

| Section T1 | | Section T2 | | Section T3 | | Section T4 | |
|---|---|---|---|---|---|---|---|
| $X/B_X$ | $Y/B_X$ | $X/B_X$ | $Y/B_X$ | $X/B_X$ | $Y/B_X$ | $X/B_X$ | $Y/B_X$ |
| 0.0000 | −0.2735 | 0.0000 | −0.2959 | 0.0000 | −0.2928 | 0.0000 | −0.2913 |
| 0.0001 | −0.2669 | 0.0000 | −0.2942 | 0.0000 | −0.2910 | 0.0000 | −0.2895 |
| 0.0003 | −0.2587 | 0.0000 | −0.2925 | 0.0000 | −0.2892 | 0.0000 | −0.2877 |
| 0.0008 | −0.2472 | 0.0001 | −0.2890 | 0.0001 | −0.2857 | 0.0001 | −0.2841 |
| 0.0021 | −0.2325 | 0.0002 | −0.2855 | 0.0002 | −0.2821 | 0.0003 | −0.2805 |
| 0.0043 | −0.2146 | 0.0005 | −0.2803 | 0.0005 | −0.2768 | 0.0006 | −0.2751 |
| 0.0080 | −0.1936 | 0.0010 | −0.2734 | 0.0011 | −0.2697 | 0.0011 | −0.2679 |
| 0.0138 | −0.1697 | 0.0019 | −0.2647 | 0.0021 | −0.2608 | 0.0022 | −0.2590 |
| 0.0226 | −0.1432 | 0.0036 | −0.2527 | 0.0040 | −0.2485 | 0.0042 | −0.2465 |
| 0.0350 | −0.1145 | 0.0067 | −0.2373 | 0.0074 | −0.2328 | 0.0077 | −0.2307 |
| 0.0511 | −0.0841 | 0.0117 | −0.2188 | 0.0129 | −0.2140 | 0.0135 | −0.2117 |
| 0.0718 | −0.0525 | 0.0192 | −0.1975 | 0.0213 | −0.1924 | 0.0223 | −0.1900 |
| 0.0971 | −0.0202 | 0.0302 | −0.1739 | 0.0335 | −0.1686 | 0.0350 | −0.1662 |
| 0.1266 | 0.0106 | 0.0455 | −0.1485 | 0.0502 | −0.1434 | 0.0524 | −0.1410 |
| 0.1610 | 0.0411 | 0.0658 | −0.1224 | 0.0725 | −0.1179 | 0.0757 | −0.1158 |
| 0.1968 | 0.0724 | 0.0916 | −0.0966 | 0.1006 | −0.0931 | 0.1048 | −0.0917 |
| 0.2326 | 0.1038 | 0.1219 | −0.0705 | 0.1325 | −0.0674 | 0.1377 | −0.0665 |
| 0.2696 | 0.1363 | 0.1556 | −0.0431 | 0.1668 | −0.0390 | 0.1723 | −0.0376 |
| 0.3063 | 0.1692 | 0.1905 | −0.0143 | 0.2019 | −0.0088 | 0.2073 | −0.0065 |
| 0.3425 | 0.2025 | 0.2274 | 0.0176 | 0.2388 | 0.0248 | 0.2439 | 0.0282 |
| 0.3784 | 0.2362 | 0.2648 | 0.0514 | 0.2761 | 0.0606 | 0.2809 | 0.0651 |
| 0.4141 | 0.2701 | 0.3015 | 0.0859 | 0.3126 | 0.0972 | 0.3169 | 0.1030 |
| 0.4499 | 0.3039 | 0.3388 | 0.1225 | 0.3494 | 0.1359 | 0.3532 | 0.1430 |
| 0.4861 | 0.3373 | 0.3753 | 0.1597 | 0.3855 | 0.1754 | 0.3887 | 0.1838 |
| 0.5227 | 0.3702 | 0.4112 | 0.1976 | 0.4207 | 0.2156 | 0.4234 | 0.2253 |
| 0.5594 | 0.4031 | 0.4463 | 0.2362 | 0.4552 | 0.2564 | 0.4572 | 0.2674 |
| 0.5952 | 0.4368 | 0.4808 | 0.2754 | 0.4889 | 0.2979 | 0.4903 | 0.3101 |
| 0.6305 | 0.4712 | 0.5145 | 0.3152 | 0.5219 | 0.3399 | 0.5228 | 0.3534 |
| 0.6656 | 0.5058 | 0.5476 | 0.3556 | 0.5542 | 0.3825 | 0.5545 | 0.3971 |
| 0.6999 | 0.5411 | 0.5799 | 0.3965 | 0.5858 | 0.4257 | 0.5855 | 0.4414 |
| 0.7331 | 0.5775 | 0.6115 | 0.4380 | 0.6166 | 0.4694 | 0.6158 | 0.4862 |
| 0.7638 | 0.6138 | 0.6424 | 0.4801 | 0.6467 | 0.5135 | 0.6454 | 0.5314 |
| 0.7929 | 0.6515 | 0.6725 | 0.5227 | 0.6761 | 0.5582 | 0.6744 | 0.5770 |
| 0.8194 | 0.6890 | 0.7019 | 0.5658 | 0.7048 | 0.6033 | 0.7027 | 0.6230 |
| 0.8427 | 0.7248 | 0.7305 | 0.6095 | 0.7327 | 0.6489 | 0.7303 | 0.6695 |
| 0.8643 | 0.7596 | 0.7582 | 0.6537 | 0.7598 | 0.6950 | 0.7573 | 0.7164 |
| 0.8835 | 0.7921 | 0.7842 | 0.6969 | 0.7853 | 0.7399 | 0.7826 | 0.7621 |
| 0.8991 | 0.8229 | 0.8094 | 0.7406 | 0.8100 | 0.7853 | 0.8073 | 0.8081 |
| 0.9116 | 0.8514 | 0.8329 | 0.7833 | 0.8331 | 0.8295 | 0.8305 | 0.8530 |
| 0.9225 | 0.8771 | 0.8539 | 0.8233 | 0.8538 | 0.8710 | 0.8513 | 0.8949 |
| 0.9315 | 0.9000 | 0.8735 | 0.8621 | 0.8732 | 0.9111 | 0.8709 | 0.9355 |
| 0.9389 | 0.9200 | 0.8907 | 0.8982 | 0.8903 | 0.9483 | 0.8883 | 0.9731 |
| 0.9455 | 0.9369 | 0.9042 | 0.9322 | 0.9037 | 0.9833 | 0.9019 | 1.0084 |
| 0.9509 | 0.9506 | 0.9153 | 0.9633 | 0.9148 | 1.0152 | 0.9133 | 1.0407 |
| 0.9563 | 0.9608 | 0.9251 | 0.9912 | 0.9246 | 1.0439 | 0.9234 | 1.0696 |
| 0.9617 | 0.9671 | 0.9333 | 1.0160 | 0.9328 | 1.0693 | 0.9319 | 1.0952 |
| 0.9672 | 0.9708 | 0.9400 | 1.0376 | 0.9396 | 1.0915 | 0.9389 | 1.1176 |
| 0.9719 | 0.9726 | 0.9460 | 1.0557 | 0.9458 | 1.1101 | 0.9453 | 1.1364 |
| 0.9752 | 0.9732 | 0.9510 | 1.0706 | 0.9508 | 1.1253 | 0.9505 | 1.1516 |
| 0.9786 | 0.9733 | 0.9559 | 1.0818 | 0.9556 | 1.1369 | 0.9554 | 1.1634 |
| 0.9802 | 0.9732 | 0.9611 | 1.0889 | 0.9607 | 1.1444 | 0.9604 | 1.1711 |
| 0.9819 | 0.9729 | 0.9667 | 1.0930 | 0.9662 | 1.1488 | 0.9660 | 1.1756 |
| 0.9840 | 0.9722 | 0.9717 | 1.0947 | 0.9713 | 1.1507 | 0.9711 | 1.1776 |
| 0.9861 | 0.9713 | 0.9753 | 1.0952 | 0.9749 | 1.1513 | 0.9748 | 1.1782 |
| 0.9901 | 0.9689 | 0.9789 | 1.0951 | 0.9786 | 1.1513 | 0.9785 | 1.1781 |
| 0.9935 | 0.9656 | 0.9807 | 1.0949 | 0.9805 | 1.1511 | 0.9804 | 1.1779 |
| 0.9974 | 0.9599 | 0.9824 | 1.0944 | 0.9823 | 1.1507 | 0.9822 | 1.1775 |
| 1.0000 | 0.9512 | 0.9847 | 1.0937 | 0.9846 | 1.1499 | 0.9846 | 1.1767 |
| 1.0000 | 0.9399 | 0.9869 | 1.0926 | 0.9868 | 1.1488 | 0.9868 | 1.1757 |
| 0.9978 | 0.9242 | 0.9909 | 1.0899 | 0.9910 | 1.1461 | 0.9910 | 1.1729 |
| 0.9942 | 0.9044 | 0.9944 | 1.0865 | 0.9945 | 1.1426 | 0.9946 | 1.1694 |
| 0.9892 | 0.8802 | 0.9982 | 1.0804 | 0.9983 | 1.1364 | 0.9984 | 1.1632 |
| 0.9831 | 0.8517 | 1.0000 | 1.0714 | 1.0000 | 1.1272 | 1.0000 | 1.1539 |
| 0.9762 | 0.8188 | 0.9989 | 1.0596 | 0.9987 | 1.1152 | 0.9985 | 1.1419 |
| 0.9689 | 0.7813 | 0.9960 | 1.0434 | 0.9959 | 1.0987 | 0.9957 | 1.1252 |
| 0.9629 | 0.7391 | 0.9922 | 1.0229 | 0.9923 | 1.0779 | 0.9922 | 1.1042 |
| 0.9569 | 0.6924 | 0.9865 | 0.9980 | 0.9868 | 1.0524 | 0.9867 | 1.0785 |
| 0.9499 | 0.6413 | 0.9797 | 0.9685 | 0.9804 | 1.0223 | 0.9804 | 1.0482 |
| 0.9421 | 0.5857 | 0.9718 | 0.9345 | 0.9727 | 0.9877 | 0.9727 | 1.0133 |
| 0.9337 | 0.5280 | 0.9630 | 0.8960 | 0.9642 | 0.9484 | 0.9644 | 0.9737 |
| 0.9241 | 0.4659 | 0.9548 | 0.8526 | 0.9564 | 0.9042 | 0.9567 | 0.9291 |
| 0.9134 | 0.4017 | 0.9466 | 0.8044 | 0.9486 | 0.8551 | 0.9489 | 0.8796 |
| 0.9016 | 0.3377 | 0.9370 | 0.7518 | 0.9395 | 0.8015 | 0.9400 | 0.8256 |

TABLE 3-continued

Normalized Coordinates (Vane Airfoils)
Tolerance: ±0.05" (±1.27 mm)

| X/$B_X$ | Y/$B_X$ | X/$B_X$ | Y/$B_X$ | X/$B_X$ | Y/$B_X$ | X/$B_X$ | Y/$B_X$ |
|---|---|---|---|---|---|---|---|
| 0.8882 | 0.2718 | 0.9264 | 0.6946 | 0.9293 | 0.7432 | 0.9299 | 0.7669 |
| 0.8732 | 0.2062 | 0.9148 | 0.6353 | 0.9182 | 0.6827 | 0.9190 | 0.7059 |
| 0.8563 | 0.1410 | 0.9019 | 0.5714 | 0.9057 | 0.6177 | 0.9067 | 0.6403 |
| 0.8372 | 0.0765 | 0.8877 | 0.5055 | 0.8920 | 0.5505 | 0.8932 | 0.5725 |
| 0.8157 | 0.0127 | 0.8729 | 0.4397 | 0.8776 | 0.4834 | 0.8790 | 0.5049 |
| 0.7916 | −0.0501 | 0.8566 | 0.3719 | 0.8619 | 0.4142 | 0.8634 | 0.4352 |
| 0.7646 | −0.1118 | 0.8394 | 0.3043 | 0.8451 | 0.3453 | 0.8469 | 0.3656 |
| 0.7348 | −0.1721 | 0.8210 | 0.2369 | 0.8274 | 0.2766 | 0.8293 | 0.2963 |
| 0.7020 | −0.2309 | 0.8015 | 0.1699 | 0.8084 | 0.2082 | 0.8105 | 0.2274 |
| 0.6663 | −0.2880 | 0.7806 | 0.1034 | 0.7880 | 0.1402 | 0.7905 | 0.1588 |
| 0.6275 | −0.3430 | 0.7581 | 0.0373 | 0.7662 | 0.0727 | 0.7689 | 0.0906 |
| 0.5851 | −0.3952 | 0.7339 | −0.0281 | 0.7426 | 0.0058 | 0.7457 | 0.0230 |
| 0.5384 | −0.4437 | 0.7077 | −0.0928 | 0.7171 | −0.0604 | 0.7205 | −0.0439 |
| 0.4868 | −0.4868 | 0.6792 | −0.1564 | 0.6893 | −0.1257 | 0.6931 | −0.1099 |
| 0.4314 | −0.5209 | 0.6480 | −0.2189 | 0.6589 | −0.1898 | 0.6632 | −0.1748 |
| 0.3708 | −0.5444 | 0.6139 | −0.2797 | 0.6256 | −0.2524 | 0.6303 | −0.2383 |
| 0.3091 | −0.5560 | 0.5763 | −0.3385 | 0.5888 | −0.3131 | 0.5941 | −0.2999 |
| 0.2508 | −0.5558 | 0.5347 | −0.3945 | 0.5480 | −0.3712 | 0.5538 | −0.3590 |
| 0.1962 | −0.5429 | 0.4884 | −0.4467 | 0.5024 | −0.4255 | 0.5087 | −0.4144 |
| 0.1493 | −0.5216 | 0.4383 | −0.4918 | 0.4529 | −0.4729 | 0.4595 | −0.4629 |
| 0.1096 | −0.4962 | 0.3822 | −0.5292 | 0.3971 | −0.5127 | 0.4039 | −0.5039 |
| 0.0769 | −0.4688 | 0.3221 | −0.5541 | 0.3368 | −0.5401 | 0.3437 | −0.5325 |
| 0.0511 | −0.4407 | 0.2624 | −0.5632 | 0.2765 | −0.5516 | 0.2832 | −0.5453 |
| 0.0320 | −0.4130 | 0.2047 | −0.5565 | 0.2176 | −0.5474 | 0.2237 | −0.5424 |
| 0.0187 | −0.3870 | 0.1546 | −0.5378 | 0.1658 | −0.5309 | 0.1712 | −0.5271 |
| 0.0107 | −0.3637 | 0.1130 | −0.5123 | 0.1220 | −0.5074 | 0.1264 | −0.5046 |
| 0.0063 | −0.3440 | 0.0791 | −0.4838 | 0.0860 | −0.4805 | 0.0893 | −0.4787 |
| 0.0038 | −0.3285 | 0.0529 | −0.4542 | 0.0577 | −0.4520 | 0.0600 | −0.4507 |
| 0.0024 | −0.3173 | 0.0338 | −0.4250 | 0.0369 | −0.4232 | 0.0385 | −0.4221 |
| 0.0016 | −0.3084 | 0.0205 | −0.3979 | 0.0224 | −0.3961 | 0.0234 | −0.3951 |
| 0.0010 | −0.3017 | 0.0117 | −0.3739 | 0.0129 | −0.3719 | 0.0135 | −0.3709 |
| 0.0007 | −0.2972 | 0.0063 | −0.3536 | 0.0070 | −0.3514 | 0.0073 | −0.3503 |
| 0.0005 | −0.2927 | 0.0033 | −0.3376 | 0.0036 | −0.3352 | 0.0038 | −0.3340 |
| 0.0004 | −0.2905 | 0.0017 | −0.3261 | 0.0019 | −0.3235 | 0.0020 | −0.3222 |
| 0.0003 | −0.2882 | 0.0008 | −0.3169 | 0.0009 | −0.3141 | 0.0010 | −0.3127 |
| 0.0002 | −0.2866 | 0.0003 | −0.3099 | 0.0004 | −0.3070 | 0.0004 | −0.3056 |
| 0.0002 | −0.2850 | 0.0001 | −0.3052 | 0.0002 | −0.3023 | 0.0002 | −0.3008 |
| 0.0001 | −0.2817 | 0.0000 | −0.3006 | 0.0000 | −0.2975 | 0.0000 | −0.2961 |
| 0.0000 | −0.2784 | 0.0000 | −0.2983 | 0.0000 | −0.2952 | 0.0000 | −0.2937 |

| Section T5 | | Section T6 | | Section T7 | |
|---|---|---|---|---|---|
| X/$B_X$ | Y/$B_X$ | X/$B_X$ | Y/$B_X$ | X/$B_X$ | Y/$B_X$ |
| 0.0000 | −0.2913 | 0.0000 | −0.2925 | 0.0000 | −0.2845 |
| 0.0000 | −0.2895 | 0.0000 | −0.2907 | 0.0000 | −0.2828 |
| 0.0000 | −0.2877 | 0.0000 | −0.2890 | 0.0000 | −0.2810 |
| 0.0001 | −0.2841 | 0.0001 | −0.2854 | 0.0001 | −0.2775 |
| 0.0002 | −0.2805 | 0.0002 | −0.2819 | 0.0002 | −0.2740 |
| 0.0005 | −0.2751 | 0.0005 | −0.2766 | 0.0005 | −0.2687 |
| 0.0011 | −0.2679 | 0.0011 | −0.2695 | 0.0010 | −0.2618 |
| 0.0022 | −0.2590 | 0.0021 | −0.2607 | 0.0020 | −0.2530 |
| 0.0042 | −0.2465 | 0.0040 | −0.2484 | 0.0039 | −0.2409 |
| 0.0077 | −0.2307 | 0.0074 | −0.2328 | 0.0072 | −0.2255 |
| 0.0135 | −0.2118 | 0.0129 | −0.2140 | 0.0125 | −0.2069 |
| 0.0222 | −0.1901 | 0.0213 | −0.1925 | 0.0206 | −0.1857 |
| 0.0349 | −0.1663 | 0.0335 | −0.1688 | 0.0324 | −0.1622 |
| 0.0524 | −0.1412 | 0.0502 | −0.1437 | 0.0487 | −0.1372 |
| 0.0756 | −0.1160 | 0.0725 | −0.1184 | 0.0703 | −0.1118 |
| 0.1048 | −0.0920 | 0.1008 | −0.0942 | 0.0980 | −0.0876 |
| 0.1379 | −0.0673 | 0.1335 | −0.0697 | 0.1300 | −0.0630 |
| 0.1725 | −0.0385 | 0.1677 | −0.0414 | 0.1632 | −0.0344 |
| 0.2071 | −0.0070 | 0.2016 | −0.0101 | 0.1960 | −0.0028 |
| 0.2432 | 0.0281 | 0.2368 | 0.0249 | 0.2301 | 0.0325 |
| 0.2796 | 0.0656 | 0.2723 | 0.0622 | 0.2645 | 0.0699 |
| 0.3149 | 0.1039 | 0.3068 | 0.1004 | 0.2982 | 0.1080 |
| 0.3506 | 0.1444 | 0.3417 | 0.1406 | 0.3322 | 0.1481 |
| 0.3854 | 0.1857 | 0.3758 | 0.1815 | 0.3657 | 0.1887 |
| 0.4195 | 0.2276 | 0.4092 | 0.2230 | 0.3986 | 0.2297 |
| 0.4528 | 0.2701 | 0.4419 | 0.2650 | 0.4309 | 0.2712 |
| 0.4854 | 0.3131 | 0.4741 | 0.3074 | 0.4629 | 0.3129 |
| 0.5173 | 0.3566 | 0.5057 | 0.3503 | 0.4944 | 0.3550 |
| 0.5486 | 0.4005 | 0.5368 | 0.3935 | 0.5255 | 0.3974 |
| 0.5793 | 0.4450 | 0.5673 | 0.4371 | 0.5563 | 0.4401 |
| 0.6094 | 0.4898 | 0.5974 | 0.4811 | 0.5867 | 0.4830 |
| 0.6388 | 0.5350 | 0.6270 | 0.5254 | 0.6167 | 0.5262 |
| 0.6677 | 0.5806 | 0.6561 | 0.5700 | 0.6464 | 0.5696 |

TABLE 3-continued

Normalized Coordinates (Vane Airfoils)
Tolerance: ±0.05" (±1.27 mm)

| | | | | | |
|---|---|---|---|---|---|
| 0.6960 | 0.6266 | 0.6847 | 0.6149 | 0.6757 | 0.6133 |
| 0.7238 | 0.6729 | 0.7129 | 0.6601 | 0.7047 | 0.6571 |
| 0.7509 | 0.7196 | 0.7406 | 0.7055 | 0.7333 | 0.7013 |
| 0.7765 | 0.7650 | 0.7669 | 0.7498 | 0.7606 | 0.7442 |
| 0.8016 | 0.8108 | 0.7927 | 0.7943 | 0.7871 | 0.7876 |
| 0.8252 | 0.8553 | 0.8172 | 0.8375 | 0.8114 | 0.8302 |
| 0.8466 | 0.8969 | 0.8396 | 0.8779 | 0.8329 | 0.8704 |
| 0.8667 | 0.9371 | 0.8607 | 0.9170 | 0.8516 | 0.9100 |
| 0.8847 | 0.9744 | 0.8796 | 0.9531 | 0.8659 | 0.9477 |
| 0.8990 | 1.0093 | 0.8949 | 0.9871 | 0.8780 | 0.9825 |
| 0.9110 | 1.0414 | 0.9078 | 1.0183 | 0.8878 | 1.0143 |
| 0.9217 | 1.0700 | 0.9192 | 1.0462 | 0.8957 | 1.0430 |
| 0.9307 | 1.0955 | 0.9290 | 1.0710 | 0.9024 | 1.0685 |
| 0.9381 | 1.1176 | 0.9371 | 1.0926 | 0.9084 | 1.0905 |
| 0.9449 | 1.1363 | 0.9443 | 1.1107 | 0.9152 | 1.1085 |
| 0.9504 | 1.1514 | 0.9502 | 1.1255 | 0.9233 | 1.1221 |
| 0.9554 | 1.1631 | 0.9555 | 1.1369 | 0.9314 | 1.1313 |
| 0.9606 | 1.1707 | 0.9609 | 1.1441 | 0.9383 | 1.1368 |
| 0.9662 | 1.1751 | 0.9666 | 1.1483 | 0.9445 | 1.1401 |
| 0.9713 | 1.1770 | 0.9717 | 1.1500 | 0.9496 | 1.1418 |
| 0.9750 | 1.1775 | 0.9754 | 1.1504 | 0.9531 | 1.1425 |
| 0.9787 | 1.1775 | 0.9790 | 1.1502 | 0.9566 | 1.1428 |
| 0.9805 | 1.1772 | 0.9809 | 1.1499 | 0.9584 | 1.1428 |
| 0.9824 | 1.1768 | 0.9827 | 1.1495 | 0.9601 | 1.1426 |
| 0.9847 | 1.1760 | 0.9850 | 1.1487 | 0.9624 | 1.1423 |
| 0.9870 | 1.1749 | 0.9872 | 1.1476 | 0.9647 | 1.1418 |
| 0.9912 | 1.1722 | 0.9914 | 1.1448 | 0.9692 | 1.1403 |
| 0.9947 | 1.1686 | 0.9949 | 1.1414 | 0.9734 | 1.1382 |
| 0.9984 | 1.1624 | 0.9986 | 1.1352 | 0.9793 | 1.1340 |
| 1.0000 | 1.1532 | 1.0000 | 1.1262 | 0.9858 | 1.1272 |
| 0.9984 | 1.1412 | 0.9982 | 1.1143 | 0.9919 | 1.1173 |
| 0.9956 | 1.1245 | 0.9952 | 1.0978 | 0.9976 | 1.1019 |
| 0.9920 | 1.1036 | 0.9914 | 1.0771 | 1.0000 | 1.0811 |
| 0.9864 | 1.0780 | 0.9855 | 1.0519 | 0.9963 | 1.0558 |
| 0.9799 | 1.0478 | 0.9788 | 1.0221 | 0.9878 | 1.0267 |
| 0.9722 | 1.0129 | 0.9708 | 0.9877 | 0.9768 | 0.9936 |
| 0.9637 | 0.9734 | 0.9620 | 0.9487 | 0.9643 | 0.9560 |
| 0.9558 | 0.9289 | 0.9536 | 0.9048 | 0.9507 | 0.9139 |
| 0.9479 | 0.8796 | 0.9453 | 0.8561 | 0.9367 | 0.8671 |
| 0.9388 | 0.8256 | 0.9358 | 0.8028 | 0.9239 | 0.8151 |
| 0.9286 | 0.7671 | 0.9250 | 0.7450 | 0.9105 | 0.7584 |
| 0.9174 | 0.7062 | 0.9135 | 0.6849 | 0.8967 | 0.6994 |
| 0.9049 | 0.6408 | 0.9005 | 0.6203 | 0.8818 | 0.6360 |
| 0.8913 | 0.5732 | 0.8865 | 0.5535 | 0.8663 | 0.5702 |
| 0.8770 | 0.5057 | 0.8717 | 0.4869 | 0.8504 | 0.5046 |
| 0.8613 | 0.4361 | 0.8556 | 0.4182 | 0.8336 | 0.4368 |
| 0.8447 | 0.3667 | 0.8386 | 0.3497 | 0.8162 | 0.3692 |
| 0.8271 | 0.2976 | 0.8206 | 0.2814 | 0.7980 | 0.3017 |
| 0.8082 | 0.2288 | 0.8014 | 0.2135 | 0.7791 | 0.2344 |
| 0.7881 | 0.1603 | 0.7810 | 0.1459 | 0.7590 | 0.1675 |
| 0.7666 | 0.0923 | 0.7591 | 0.0788 | 0.7376 | 0.1010 |
| 0.7434 | 0.0248 | 0.7357 | 0.0122 | 0.7147 | 0.0350 |
| 0.7182 | −0.0420 | 0.7104 | −0.0537 | 0.6901 | −0.0303 |
| 0.6910 | −0.1079 | 0.6830 | −0.1187 | 0.6635 | −0.0950 |
| 0.6613 | −0.1728 | 0.6532 | −0.1827 | 0.6347 | −0.1586 |
| 0.6286 | −0.2362 | 0.6205 | −0.2452 | 0.6032 | −0.2209 |
| 0.5926 | −0.2978 | 0.5845 | −0.3059 | 0.5686 | −0.2816 |
| 0.5526 | −0.3568 | 0.5445 | −0.3641 | 0.5301 | −0.3399 |
| 0.5077 | −0.4123 | 0.4997 | −0.4186 | 0.4872 | −0.3950 |
| 0.4588 | −0.4609 | 0.4510 | −0.4664 | 0.4406 | −0.4439 |
| 0.4035 | −0.5020 | 0.3959 | −0.5066 | 0.3880 | −0.4861 |
| 0.3435 | −0.5308 | 0.3364 | −0.5347 | 0.3307 | −0.5172 |
| 0.2831 | −0.5438 | 0.2765 | −0.5470 | 0.2724 | −0.5331 |
| 0.2238 | −0.5412 | 0.2179 | −0.5437 | 0.2142 | −0.5329 |
| 0.1712 | −0.5262 | 0.1661 | −0.5280 | 0.1625 | −0.5189 |
| 0.1265 | −0.5040 | 0.1222 | −0.5053 | 0.1190 | −0.4966 |
| 0.0893 | −0.4782 | 0.0861 | −0.4790 | 0.0836 | −0.4700 |
| 0.0601 | −0.4503 | 0.0578 | −0.4507 | 0.0561 | −0.4415 |
| 0.0385 | −0.4218 | 0.0371 | −0.4221 | 0.0359 | −0.4130 |
| 0.0234 | −0.3948 | 0.0225 | −0.3952 | 0.0218 | −0.3862 |
| 0.0135 | −0.3706 | 0.0130 | −0.3711 | 0.0126 | −0.3624 |
| 0.0073 | −0.3501 | 0.0070 | −0.3508 | 0.0068 | −0.3422 |
| 0.0038 | −0.3339 | 0.0037 | −0.3347 | 0.0035 | −0.3263 |
| 0.0020 | −0.3221 | 0.0019 | −0.3230 | 0.0018 | −0.3147 |
| 0.0010 | −0.3126 | 0.0009 | −0.3137 | 0.0009 | −0.3055 |
| 0.0004 | −0.3055 | 0.0004 | −0.3066 | 0.0004 | −0.2985 |
| 0.0002 | −0.3008 | 0.0002 | −0.3019 | 0.0002 | −0.2938 |

TABLE 3-continued

Normalized Coordinates (Vane Airfoils)
Tolerance: ±0.05" (±1.27 mm)

| 0.0000 | −0.2960 | 0.0000 | −0.2972 | 0.0000 | −0.2892 |
|---|---|---|---|---|---|
| 0.0000 | −0.2936 | 0.0000 | −0.2949 | 0.0000 | −0.2868 |

TABLE 4

Normalized Coordinates (Blade Airfoils)
Tolerance: ±0.05" (±1.27 mm)

| Section S1 | | Section S2 | | Section S3 | | Section S4 | |
|---|---|---|---|---|---|---|---|
| $X/B_X$ | $Y/B_X$ | $X/B_X$ | $Y/B_X$ | $X/B_X$ | $Y/B_X$ | $X/B_X$ | $Y/B_X$ |
| 0.0000 | 0.2403 | 0.0000 | 0.2599 | 0.0000 | 0.2832 | 0.0000 | 0.3105 |
| 0.0019 | 0.2591 | 0.0014 | 0.2791 | 0.0010 | 0.3027 | 0.0008 | 0.3303 |
| 0.0072 | 0.2816 | 0.0061 | 0.3021 | 0.0053 | 0.3262 | 0.0050 | 0.3542 |
| 0.0156 | 0.3076 | 0.0143 | 0.3286 | 0.0135 | 0.3533 | 0.0133 | 0.3817 |
| 0.0266 | 0.3371 | 0.0257 | 0.3586 | 0.0254 | 0.3836 | 0.0256 | 0.4124 |
| 0.0411 | 0.3697 | 0.0408 | 0.3917 | 0.0410 | 0.4171 | 0.0419 | 0.4462 |
| 0.0602 | 0.4048 | 0.0604 | 0.4272 | 0.0615 | 0.4530 | 0.0633 | 0.4823 |
| 0.0850 | 0.4412 | 0.0861 | 0.4640 | 0.0882 | 0.4899 | 0.0913 | 0.5192 |
| 0.1173 | 0.4771 | 0.1195 | 0.5000 | 0.1229 | 0.5257 | 0.1276 | 0.5544 |
| 0.1589 | 0.5093 | 0.1624 | 0.5319 | 0.1675 | 0.5567 | 0.1743 | 0.5838 |
| 0.2085 | 0.5319 | 0.2138 | 0.5535 | 0.2207 | 0.5764 | 0.2292 | 0.6007 |
| 0.2664 | 0.5415 | 0.2733 | 0.5607 | 0.2815 | 0.5806 | 0.2910 | 0.6014 |
| 0.3269 | 0.5354 | 0.3346 | 0.5516 | 0.3432 | 0.5684 | 0.3528 | 0.5855 |
| 0.3846 | 0.5161 | 0.3924 | 0.5296 | 0.4009 | 0.5435 | 0.4102 | 0.5575 |
| 0.4399 | 0.4862 | 0.4475 | 0.4972 | 0.4557 | 0.5084 | 0.4643 | 0.5196 |
| 0.4907 | 0.4490 | 0.4980 | 0.4578 | 0.5056 | 0.4666 | 0.5135 | 0.4755 |
| 0.5372 | 0.4067 | 0.5440 | 0.4134 | 0.5510 | 0.4201 | 0.5581 | 0.4268 |
| 0.5799 | 0.3604 | 0.5862 | 0.3652 | 0.5925 | 0.3700 | 0.5988 | 0.3747 |
| 0.6190 | 0.3111 | 0.6247 | 0.3141 | 0.6303 | 0.3171 | 0.6357 | 0.3199 |
| 0.6549 | 0.2594 | 0.6600 | 0.2607 | 0.6648 | 0.2620 | 0.6694 | 0.2631 |
| 0.6878 | 0.2058 | 0.6923 | 0.2055 | 0.6964 | 0.2051 | 0.7001 | 0.2046 |
| 0.7181 | 0.1506 | 0.7219 | 0.1488 | 0.7253 | 0.1469 | 0.7283 | 0.1449 |
| 0.7460 | 0.0942 | 0.7492 | 0.0909 | 0.7519 | 0.0875 | 0.7542 | 0.0842 |
| 0.7717 | 0.0367 | 0.7743 | 0.0321 | 0.7765 | 0.0274 | 0.7782 | 0.0226 |
| 0.7955 | −0.0215 | 0.7976 | −0.0275 | 0.7993 | −0.0335 | 0.8005 | −0.0396 |
| 0.8175 | −0.0804 | 0.8193 | −0.0877 | 0.8205 | −0.0950 | 0.8212 | −0.1023 |
| 0.8381 | −0.1399 | 0.8394 | −0.1484 | 0.8403 | −0.1569 | 0.8406 | −0.1654 |
| 0.8573 | −0.1998 | 0.8583 | −0.2095 | 0.8588 | −0.2192 | 0.8588 | −0.2288 |
| 0.8747 | −0.2581 | 0.8754 | −0.2689 | 0.8756 | −0.2797 | 0.8754 | −0.2905 |
| 0.8910 | −0.3167 | 0.8915 | −0.3286 | 0.8915 | −0.3405 | 0.8912 | −0.3523 |
| 0.9059 | −0.3734 | 0.9061 | −0.3864 | 0.9060 | −0.3994 | 0.9055 | −0.4122 |
| 0.9191 | −0.4263 | 0.9192 | −0.4403 | 0.9190 | −0.4542 | 0.9184 | −0.4680 |
| 0.9324 | −0.4770 | 0.9324 | −0.4919 | 0.9322 | −0.5067 | 0.9316 | −0.5214 |
| 0.9450 | −0.5235 | 0.9450 | −0.5393 | 0.9447 | −0.5549 | 0.9442 | −0.5703 |
| 0.9567 | −0.5660 | 0.9567 | −0.5824 | 0.9565 | −0.5988 | 0.9561 | −0.6150 |
| 0.9668 | −0.6045 | 0.9668 | −0.6216 | 0.9666 | −0.6387 | 0.9663 | −0.6555 |
| 0.9755 | −0.6391 | 0.9755 | −0.6568 | 0.9754 | −0.6744 | 0.9752 | −0.6918 |
| 0.9830 | −0.6696 | 0.9830 | −0.6878 | 0.9830 | −0.7060 | 0.9828 | −0.7239 |
| 0.9893 | −0.6961 | 0.9894 | −0.7148 | 0.9894 | −0.7334 | 0.9894 | −0.7518 |
| 0.9946 | −0.7185 | 0.9946 | −0.7376 | 0.9947 | −0.7566 | 0.9948 | −0.7754 |
| 0.9981 | −0.7370 | 0.9982 | −0.7564 | 0.9984 | −0.7757 | 0.9985 | −0.7948 |
| 1.0000 | −0.7516 | 1.0000 | −0.7713 | 1.0000 | −0.7908 | 1.0000 | −0.8101 |
| 0.9981 | −0.7619 | 0.9980 | −0.7817 | 0.9978 | −0.8014 | 0.9976 | −0.8208 |
| 0.9942 | −0.7692 | 0.9938 | −0.7892 | 0.9935 | −0.8089 | 0.9932 | −0.8284 |
| 0.9900 | −0.7739 | 0.9895 | −0.7939 | 0.9891 | −0.8137 | 0.9887 | −0.8333 |
| 0.9867 | −0.7766 | 0.9862 | −0.7965 | 0.9857 | −0.8164 | 0.9852 | −0.8359 |
| 0.9831 | −0.7787 | 0.9825 | −0.7987 | 0.9820 | −0.8186 | 0.9814 | −0.8382 |
| 0.9812 | −0.7796 | 0.9806 | −0.7996 | 0.9800 | −0.8195 | 0.9794 | −0.8391 |
| 0.9793 | −0.7804 | 0.9786 | −0.8004 | 0.9780 | −0.8203 | 0.9774 | −0.8399 |
| 0.9779 | −0.7808 | 0.9772 | −0.8008 | 0.9766 | −0.8207 | 0.9759 | −0.8403 |
| 0.9765 | −0.7811 | 0.9758 | −0.8011 | 0.9751 | −0.8210 | 0.9744 | −0.8406 |
| 0.9738 | −0.7815 | 0.9730 | −0.8016 | 0.9722 | −0.8215 | 0.9714 | −0.8411 |
| 0.9710 | −0.7818 | 0.9701 | −0.8018 | 0.9693 | −0.8217 | 0.9684 | −0.8413 |
| 0.9668 | −0.7816 | 0.9658 | −0.8016 | 0.9649 | −0.8215 | 0.9639 | −0.8411 |
| 0.9613 | −0.7805 | 0.9602 | −0.8005 | 0.9591 | −0.8203 | 0.9579 | −0.8399 |
| 0.9548 | −0.7777 | 0.9536 | −0.7976 | 0.9523 | −0.8174 | 0.9510 | −0.8369 |
| 0.9473 | −0.7714 | 0.9459 | −0.7912 | 0.9444 | −0.8108 | 0.9429 | −0.8300 |
| 0.9406 | −0.7606 | 0.9391 | −0.7801 | 0.9375 | −0.7995 | 0.9358 | −0.8184 |
| 0.9341 | −0.7466 | 0.9325 | −0.7658 | 0.9307 | −0.7847 | 0.9289 | −0.8033 |
| 0.9260 | −0.7303 | 0.9243 | −0.7490 | 0.9224 | −0.7675 | 0.9205 | −0.7855 |
| 0.9166 | −0.7114 | 0.9149 | −0.7296 | 0.9130 | −0.7475 | 0.9110 | −0.7649 |
| 0.9058 | −0.6901 | 0.9041 | −0.7077 | 0.9022 | −0.7249 | 0.9000 | −0.7417 |

TABLE 4-continued

Normalized Coordinates (Blade Airfoils)
Tolerance: ±0.05" (±1.27 mm)

| | | | | | | | |
|---|---|---|---|---|---|---|---|
| 0.8935 | −0.6665 | 0.8919 | −0.6833 | 0.8899 | −0.6998 | 0.8877 | −0.7157 |
| 0.8798 | −0.6403 | 0.8783 | −0.6563 | 0.8765 | −0.6719 | 0.8742 | −0.6870 |
| 0.8645 | −0.6119 | 0.8633 | −0.6269 | 0.8615 | −0.6415 | 0.8593 | −0.6555 |
| 0.8465 | −0.5817 | 0.8456 | −0.5956 | 0.8441 | −0.6091 | 0.8419 | −0.6220 |
| 0.8267 | −0.5510 | 0.8262 | −0.5637 | 0.8249 | −0.5759 | 0.8228 | −0.5876 |
| 0.8045 | −0.5186 | 0.8043 | −0.5299 | 0.8033 | −0.5408 | 0.8014 | −0.5510 |
| 0.7809 | −0.4854 | 0.7813 | −0.4952 | 0.7807 | −0.5046 | 0.7790 | −0.5133 |
| 0.7568 | −0.4525 | 0.7578 | −0.4608 | 0.7576 | −0.4686 | 0.7562 | −0.4758 |
| 0.7314 | −0.4189 | 0.7330 | −0.4256 | 0.7334 | −0.4317 | 0.7324 | −0.4372 |
| 0.7054 | −0.3857 | 0.7077 | −0.3906 | 0.7087 | −0.3951 | 0.7081 | −0.3989 |
| 0.6789 | −0.3529 | 0.6820 | −0.3561 | 0.6836 | −0.3587 | 0.6835 | −0.3607 |
| 0.6519 | −0.3205 | 0.6557 | −0.3219 | 0.6580 | −0.3227 | 0.6585 | −0.3228 |
| 0.6244 | −0.2886 | 0.6290 | −0.2881 | 0.6319 | −0.2870 | 0.6331 | −0.2852 |
| 0.5964 | −0.2571 | 0.6017 | −0.2547 | 0.6054 | −0.2516 | 0.6072 | −0.2479 |
| 0.5678 | −0.2261 | 0.5739 | −0.2217 | 0.5783 | −0.2167 | 0.5809 | −0.2109 |
| 0.5387 | −0.1956 | 0.5455 | −0.1892 | 0.5507 | −0.1821 | 0.5540 | −0.1743 |
| 0.5091 | −0.1656 | 0.5166 | −0.1572 | 0.5225 | −0.1480 | 0.5266 | −0.1381 |
| 0.4789 | −0.1361 | 0.4871 | −0.1257 | 0.4937 | −0.1144 | 0.4986 | −0.1023 |
| 0.4482 | −0.1073 | 0.4570 | −0.0947 | 0.4643 | −0.0813 | 0.4700 | −0.0670 |
| 0.4169 | −0.0790 | 0.4262 | −0.0644 | 0.4342 | −0.0488 | 0.4407 | −0.0322 |
| 0.3849 | −0.0515 | 0.3948 | −0.0348 | 0.4035 | −0.0170 | 0.4107 | 0.0020 |
| 0.3523 | −0.0248 | 0.3627 | −0.0059 | 0.3719 | 0.0141 | 0.3799 | 0.0354 |
| 0.3202 | 0.0003 | 0.3309 | 0.0211 | 0.3406 | 0.0433 | 0.3492 | 0.0668 |
| 0.2873 | 0.0244 | 0.2983 | 0.0472 | 0.3083 | 0.0715 | 0.3174 | 0.0971 |
| 0.2549 | 0.0467 | 0.2660 | 0.0713 | 0.2762 | 0.0974 | 0.2854 | 0.1250 |
| 0.2242 | 0.0664 | 0.2351 | 0.0924 | 0.2452 | 0.1200 | 0.2544 | 0.1493 |
| 0.1939 | 0.0843 | 0.2044 | 0.1112 | 0.2142 | 0.1400 | 0.2231 | 0.1706 |
| 0.1655 | 0.0996 | 0.1753 | 0.1268 | 0.1844 | 0.1561 | 0.1926 | 0.1874 |
| 0.1389 | 0.1125 | 0.1477 | 0.1391 | 0.1558 | 0.1680 | 0.1631 | 0.1993 |
| 0.1144 | 0.1231 | 0.1220 | 0.1476 | 0.1290 | 0.1749 | 0.1352 | 0.2050 |
| 0.0921 | 0.1314 | 0.0986 | 0.1538 | 0.1045 | 0.1792 | 0.1097 | 0.2078 |
| 0.0722 | 0.1386 | 0.0779 | 0.1599 | 0.0830 | 0.1844 | 0.0874 | 0.2121 |
| 0.0556 | 0.1462 | 0.0606 | 0.1668 | 0.0649 | 0.1906 | 0.0686 | 0.2178 |
| 0.0425 | 0.1543 | 0.0467 | 0.1743 | 0.0504 | 0.1977 | 0.0534 | 0.2246 |
| 0.0325 | 0.1621 | 0.0362 | 0.1818 | 0.0392 | 0.2049 | 0.0417 | 0.2315 |
| 0.0255 | 0.1690 | 0.0286 | 0.1884 | 0.0312 | 0.2113 | 0.0332 | 0.2379 |
| 0.0208 | 0.1743 | 0.0236 | 0.1936 | 0.0259 | 0.2164 | 0.0276 | 0.2430 |
| 0.0174 | 0.1788 | 0.0200 | 0.1980 | 0.0220 | 0.2208 | 0.0235 | 0.2474 |
| 0.0151 | 0.1822 | 0.0174 | 0.2015 | 0.0192 | 0.2243 | 0.0205 | 0.2509 |
| 0.0136 | 0.1846 | 0.0157 | 0.2038 | 0.0175 | 0.2266 | 0.0187 | 0.2533 |
| 0.0122 | 0.1870 | 0.0142 | 0.2063 | 0.0158 | 0.2291 | 0.0169 | 0.2557 |
| 0.0115 | 0.1883 | 0.0134 | 0.2075 | 0.0150 | 0.2303 | 0.0160 | 0.2570 |
| 0.0108 | 0.1895 | 0.0127 | 0.2087 | 0.0142 | 0.2316 | 0.0152 | 0.2582 |
| 0.0099 | 0.1914 | 0.0117 | 0.2106 | 0.0131 | 0.2334 | 0.0140 | 0.2601 |
| 0.0090 | 0.1933 | 0.0107 | 0.2125 | 0.0120 | 0.2353 | 0.0129 | 0.2620 |
| 0.0073 | 0.1971 | 0.0088 | 0.2163 | 0.0100 | 0.2391 | 0.0108 | 0.2659 |
| 0.0058 | 0.2010 | 0.0071 | 0.2202 | 0.0082 | 0.2431 | 0.0089 | 0.2698 |
| 0.0039 | 0.2070 | 0.0050 | 0.2263 | 0.0058 | 0.2492 | 0.0064 | 0.2759 |
| 0.0019 | 0.2152 | 0.0027 | 0.2345 | 0.0033 | 0.2575 | 0.0037 | 0.2843 |
| 0.0004 | 0.2256 | 0.0009 | 0.2450 | 0.0012 | 0.2681 | 0.0014 | 0.2951 |
| 0.0000 | 0.2403 | 0.0000 | 0.2599 | 0.0000 | 0.2832 | 0.0000 | 0.3105 |

| Section S5 | | Section S6 | | Section S7 | | Section S8 | |
|---|---|---|---|---|---|---|---|
| $X/B_X$ | $Y/B_X$ | $X/B_X$ | $Y/B_X$ | $X/B_X$ | $Y/B_X$ | $X/B_X$ | $Y/B_X$ |
| 0.0000 | 0.3419 | 0.0000 | 0.3775 | 0.0000 | 0.4171 | 0.0000 | 0.4602 |
| 0.0008 | 0.3620 | 0.0010 | 0.3979 | 0.0014 | 0.4377 | 0.0020 | 0.4811 |
| 0.0050 | 0.3863 | 0.0055 | 0.4225 | 0.0065 | 0.4626 | 0.0079 | 0.5061 |
| 0.0136 | 0.4141 | 0.0145 | 0.4506 | 0.0161 | 0.4908 | 0.0184 | 0.5345 |
| 0.0265 | 0.4451 | 0.0281 | 0.4818 | 0.0305 | 0.5222 | 0.0338 | 0.5659 |
| 0.0435 | 0.4792 | 0.0460 | 0.5160 | 0.0495 | 0.5563 | 0.0542 | 0.5998 |
| 0.0660 | 0.5153 | 0.0696 | 0.5521 | 0.0745 | 0.5921 | 0.0812 | 0.6350 |
| 0.0954 | 0.5520 | 0.1008 | 0.5883 | 0.1078 | 0.6275 | 0.1169 | 0.6687 |
| 0.1338 | 0.5863 | 0.1416 | 0.6211 | 0.1513 | 0.6580 | 0.1633 | 0.6960 |
| 0.1828 | 0.6133 | 0.1932 | 0.6448 | 0.2055 | 0.6776 | 0.2199 | 0.7104 |
| 0.2394 | 0.6264 | 0.2514 | 0.6534 | 0.2651 | 0.6807 | 0.2803 | 0.7074 |
| 0.3019 | 0.6228 | 0.3142 | 0.6448 | 0.3278 | 0.6666 | 0.3424 | 0.6876 |
| 0.3636 | 0.6030 | 0.3753 | 0.6207 | 0.3880 | 0.6380 | 0.4012 | 0.6544 |
| 0.4203 | 0.5717 | 0.4311 | 0.5859 | 0.4425 | 0.5997 | 0.4542 | 0.6125 |
| 0.4735 | 0.5310 | 0.4833 | 0.5423 | 0.4933 | 0.5531 | 0.5035 | 0.5629 |
| 0.5217 | 0.4844 | 0.5303 | 0.4931 | 0.5390 | 0.5014 | 0.5477 | 0.5087 |
| 0.5654 | 0.4335 | 0.5727 | 0.4400 | 0.5801 | 0.4460 | 0.5874 | 0.4512 |
| 0.6050 | 0.3793 | 0.6111 | 0.3838 | 0.6172 | 0.3878 | 0.6232 | 0.3911 |
| 0.6409 | 0.3227 | 0.6459 | 0.3253 | 0.6507 | 0.3275 | 0.6555 | 0.3291 |
| 0.6736 | 0.2642 | 0.6775 | 0.2651 | 0.6813 | 0.2657 | 0.6851 | 0.2658 |
| 0.7034 | 0.2041 | 0.7064 | 0.2035 | 0.7092 | 0.2026 | 0.7121 | 0.2013 |

TABLE 4-continued

Normalized Coordinates (Blade Airfoils)
Tolerance: ±0.05" (±1.27 mm)

| | | | | | | | |
|---|---|---|---|---|---|---|---|
| 0.7308 | 0.1429 | 0.7329 | 0.1408 | 0.7348 | 0.1385 | 0.7370 | 0.1359 |
| 0.7560 | 0.0807 | 0.7574 | 0.0773 | 0.7586 | 0.0737 | 0.7602 | 0.0700 |
| 0.7794 | 0.0179 | 0.7801 | 0.0131 | 0.7807 | 0.0084 | 0.7818 | 0.0035 |
| 0.8011 | −0.0456 | 0.8012 | −0.0515 | 0.8014 | −0.0575 | 0.8021 | −0.0635 |
| 0.8214 | −0.1095 | 0.8211 | −0.1166 | 0.8208 | −0.1237 | 0.8212 | −0.1307 |
| 0.8404 | −0.1738 | 0.8398 | −0.1820 | 0.8392 | −0.1902 | 0.8393 | −0.1983 |
| 0.8584 | −0.2384 | 0.8574 | −0.2477 | 0.8566 | −0.2570 | 0.8565 | −0.2660 |
| 0.8747 | −0.3011 | 0.8736 | −0.3115 | 0.8726 | −0.3217 | 0.8725 | −0.3317 |
| 0.8903 | −0.3640 | 0.8891 | −0.3754 | 0.8880 | −0.3866 | 0.8877 | −0.3975 |
| 0.9046 | −0.4249 | 0.9033 | −0.4373 | 0.9022 | −0.4494 | 0.9019 | −0.4612 |
| 0.9174 | −0.4815 | 0.9162 | −0.4948 | 0.9151 | −0.5078 | 0.9148 | −0.5204 |
| 0.9307 | −0.5358 | 0.9296 | −0.5499 | 0.9286 | −0.5636 | 0.9283 | −0.5771 |
| 0.9435 | −0.5855 | 0.9425 | −0.6004 | 0.9416 | −0.6149 | 0.9414 | −0.6291 |
| 0.9555 | −0.6309 | 0.9546 | −0.6464 | 0.9540 | −0.6616 | 0.9538 | −0.6764 |
| 0.9658 | −0.6721 | 0.9652 | −0.6882 | 0.9647 | −0.7039 | 0.9646 | −0.7193 |
| 0.9748 | −0.7089 | 0.9744 | −0.7256 | 0.9740 | −0.7419 | 0.9740 | −0.7578 |
| 0.9826 | −0.7415 | 0.9823 | −0.7587 | 0.9821 | −0.7754 | 0.9822 | −0.7918 |
| 0.9893 | −0.7698 | 0.9892 | −0.7873 | 0.9891 | −0.8045 | 0.9892 | −0.8212 |
| 0.9948 | −0.7937 | 0.9948 | −0.8116 | 0.9948 | −0.8291 | 0.9949 | −0.8462 |
| 0.9986 | −0.8134 | 0.9988 | −0.8316 | 0.9989 | −0.8494 | 0.9991 | −0.8668 |
| 1.0000 | −0.8291 | 1.0000 | −0.8475 | 1.0000 | −0.8655 | 1.0000 | −0.8831 |
| 0.9974 | −0.8399 | 0.9972 | −0.8584 | 0.9971 | −0.8765 | 0.9969 | −0.8943 |
| 0.9929 | −0.8476 | 0.9926 | −0.8662 | 0.9922 | −0.8844 | 0.9919 | −0.9022 |
| 0.9883 | −0.8524 | 0.9878 | −0.8711 | 0.9874 | −0.8893 | 0.9870 | −0.9071 |
| 0.9847 | −0.8551 | 0.9842 | −0.8738 | 0.9838 | −0.8920 | 0.9833 | −0.9099 |
| 0.9808 | −0.8574 | 0.9803 | −0.8761 | 0.9798 | −0.8943 | 0.9792 | −0.9122 |
| 0.9788 | −0.8583 | 0.9782 | −0.8770 | 0.9777 | −0.8953 | 0.9771 | −0.9131 |
| 0.9767 | −0.8591 | 0.9761 | −0.8778 | 0.9755 | −0.8961 | 0.9749 | −0.9140 |
| 0.9752 | −0.8595 | 0.9746 | −0.8782 | 0.9739 | −0.8965 | 0.9733 | −0.9144 |
| 0.9737 | −0.8599 | 0.9730 | −0.8786 | 0.9723 | −0.8969 | 0.9716 | −0.9148 |
| 0.9706 | −0.8603 | 0.9698 | −0.8791 | 0.9690 | −0.8974 | 0.9683 | −0.9153 |
| 0.9675 | −0.8605 | 0.9666 | −0.8793 | 0.9657 | −0.8975 | 0.9649 | −0.9155 |
| 0.9629 | −0.8603 | 0.9618 | −0.8790 | 0.9608 | −0.8973 | 0.9598 | −0.9152 |
| 0.9568 | −0.8590 | 0.9556 | −0.8777 | 0.9544 | −0.8959 | 0.9531 | −0.9137 |
| 0.9496 | −0.8559 | 0.9482 | −0.8744 | 0.9468 | −0.8925 | 0.9454 | −0.9101 |
| 0.9414 | −0.8489 | 0.9398 | −0.8671 | 0.9382 | −0.8849 | 0.9365 | −0.9022 |
| 0.9341 | −0.8369 | 0.9323 | −0.8548 | 0.9306 | −0.8721 | 0.9288 | −0.8890 |
| 0.9271 | −0.8213 | 0.9251 | −0.8387 | 0.9232 | −0.8555 | 0.9213 | −0.8719 |
| 0.9184 | −0.8030 | 0.9163 | −0.8199 | 0.9141 | −0.8361 | 0.9120 | −0.8518 |
| 0.9087 | −0.7818 | 0.9063 | −0.7980 | 0.9039 | −0.8136 | 0.9016 | −0.8285 |
| 0.8976 | −0.7578 | 0.8949 | −0.7733 | 0.8922 | −0.7881 | 0.8897 | −0.8022 |
| 0.8851 | −0.7311 | 0.8822 | −0.7457 | 0.8792 | −0.7595 | 0.8764 | −0.7727 |
| 0.8714 | −0.7014 | 0.8683 | −0.7150 | 0.8650 | −0.7279 | 0.8621 | −0.7400 |
| 0.8565 | −0.6689 | 0.8531 | −0.6815 | 0.8496 | −0.6933 | 0.8464 | −0.7042 |
| 0.8390 | −0.6341 | 0.8354 | −0.6455 | 0.8316 | −0.6561 | 0.8282 | −0.6658 |
| 0.8198 | −0.5985 | 0.8161 | −0.6087 | 0.8120 | −0.6179 | 0.8083 | −0.6263 |
| 0.7984 | −0.5606 | 0.7945 | −0.5693 | 0.7902 | −0.5772 | 0.7863 | −0.5840 |
| 0.7761 | −0.5214 | 0.7721 | −0.5286 | 0.7676 | −0.5349 | 0.7635 | −0.5403 |
| 0.7535 | −0.4823 | 0.7495 | −0.4880 | 0.7449 | −0.4928 | 0.7407 | −0.4966 |
| 0.7299 | −0.4421 | 0.7260 | −0.4461 | 0.7214 | −0.4492 | 0.7170 | −0.4513 |
| 0.7060 | −0.4020 | 0.7022 | −0.4043 | 0.6977 | −0.4057 | 0.6933 | −0.4061 |
| 0.6818 | −0.3620 | 0.6783 | −0.3626 | 0.6739 | −0.3623 | 0.6696 | −0.3609 |
| 0.6572 | −0.3223 | 0.6541 | −0.3210 | 0.6500 | −0.3189 | 0.6458 | −0.3158 |
| 0.6323 | −0.2828 | 0.6297 | −0.2796 | 0.6259 | −0.2756 | 0.6219 | −0.2706 |
| 0.6071 | −0.2435 | 0.6050 | −0.2384 | 0.6016 | −0.2324 | 0.5980 | −0.2255 |
| 0.5814 | −0.2045 | 0.5800 | −0.1973 | 0.5772 | −0.1893 | 0.5740 | −0.1805 |
| 0.5553 | −0.1658 | 0.5547 | −0.1564 | 0.5526 | −0.1463 | 0.5499 | −0.1355 |
| 0.5288 | −0.1274 | 0.5290 | −0.1158 | 0.5278 | −0.1035 | 0.5257 | −0.0906 |
| 0.5017 | −0.0893 | 0.5029 | −0.0755 | 0.5025 | −0.0609 | 0.5011 | −0.0458 |
| 0.4740 | −0.0517 | 0.4762 | −0.0355 | 0.4768 | −0.0187 | 0.4762 | −0.0013 |
| 0.4456 | −0.0146 | 0.4488 | 0.0040 | 0.4504 | 0.0232 | 0.4506 | 0.0429 |
| 0.4165 | 0.0220 | 0.4207 | 0.0430 | 0.4233 | 0.0646 | 0.4243 | 0.0866 |
| 0.3865 | 0.0578 | 0.3916 | 0.0812 | 0.3951 | 0.1054 | 0.3970 | 0.1297 |
| 0.3565 | 0.0915 | 0.3624 | 0.1174 | 0.3668 | 0.1439 | 0.3693 | 0.1705 |
| 0.3252 | 0.1241 | 0.3318 | 0.1523 | 0.3369 | 0.1813 | 0.3401 | 0.2103 |
| 0.2937 | 0.1541 | 0.3007 | 0.1846 | 0.3063 | 0.2159 | 0.3099 | 0.2472 |
| 0.2627 | 0.1803 | 0.2699 | 0.2127 | 0.2757 | 0.2460 | 0.2797 | 0.2794 |
| 0.2311 | 0.2030 | 0.2381 | 0.2371 | 0.2438 | 0.2723 | 0.2478 | 0.3077 |
| 0.2000 | 0.2207 | 0.2065 | 0.2560 | 0.2117 | 0.2926 | 0.2155 | 0.3299 |
| 0.1696 | 0.2329 | 0.1751 | 0.2688 | 0.1796 | 0.3065 | 0.1830 | 0.3452 |
| 0.1406 | 0.2380 | 0.1451 | 0.2738 | 0.1486 | 0.3121 | 0.1514 | 0.3522 |
| 0.1141 | 0.2398 | 0.1177 | 0.2751 | 0.1204 | 0.3133 | 0.1223 | 0.3541 |
| 0.0911 | 0.2433 | 0.0938 | 0.2780 | 0.0958 | 0.3159 | 0.0970 | 0.3565 |
| 0.0715 | 0.2487 | 0.0736 | 0.2832 | 0.0749 | 0.3210 | 0.0755 | 0.3617 |
| 0.0557 | 0.2552 | 0.0572 | 0.2895 | 0.0579 | 0.3273 | 0.0579 | 0.3682 |
| 0.0435 | 0.2620 | 0.0445 | 0.2963 | 0.0448 | 0.3342 | 0.0443 | 0.3752 |
| 0.0346 | 0.2684 | 0.0353 | 0.3027 | 0.0353 | 0.3407 | 0.0345 | 0.3820 |

TABLE 4-continued

Normalized Coordinates (Blade Airfoils)
Tolerance: ±0.05" (±1.27 mm)

| 0.0287 | 0.2735 | 0.0292 | 0.3079 | 0.0290 | 0.3461 | 0.0281 | 0.3875 |
|---|---|---|---|---|---|---|---|
| 0.0244 | 0.2779 | 0.0246 | 0.3125 | 0.0243 | 0.3507 | 0.0233 | 0.3923 |
| 0.0213 | 0.2814 | 0.0214 | 0.3160 | 0.0210 | 0.3544 | 0.0199 | 0.3962 |
| 0.0193 | 0.2839 | 0.0194 | 0.3185 | 0.0189 | 0.3570 | 0.0178 | 0.3989 |
| 0.0175 | 0.2864 | 0.0175 | 0.3211 | 0.0170 | 0.3597 | 0.0158 | 0.4016 |
| 0.0166 | 0.2876 | 0.0166 | 0.3224 | 0.0160 | 0.3610 | 0.0149 | 0.4030 |
| 0.0157 | 0.2889 | 0.0157 | 0.3237 | 0.0151 | 0.3624 | 0.0139 | 0.4045 |
| 0.0145 | 0.2908 | 0.0145 | 0.3256 | 0.0139 | 0.3643 | 0.0127 | 0.4065 |
| 0.0134 | 0.2927 | 0.0133 | 0.3276 | 0.0127 | 0.3663 | 0.0116 | 0.4085 |
| 0.0112 | 0.2966 | 0.0111 | 0.3315 | 0.0105 | 0.3703 | 0.0094 | 0.4126 |
| 0.0092 | 0.3006 | 0.0091 | 0.3356 | 0.0085 | 0.3745 | 0.0075 | 0.4169 |
| 0.0066 | 0.3068 | 0.0065 | 0.3419 | 0.0059 | 0.3809 | 0.0050 | 0.4234 |
| 0.0038 | 0.3153 | 0.0037 | 0.3506 | 0.0033 | 0.3897 | 0.0026 | 0.4324 |
| 0.0015 | 0.3263 | 0.0014 | 0.3617 | 0.0011 | 0.4010 | 0.0007 | 0.4439 |
| 0.0000 | 0.3419 | 0.0000 | 0.3775 | 0.0000 | 0.4171 | 0.0000 | 0.4602 |

| Section S9 | | Section S10 | | Section S11 | |
|---|---|---|---|---|---|
| $X/B_X$ | $Y/B_X$ | $X/B_X$ | $Y/B_X$ | $X/B_X$ | $Y/B_X$ |
| 0.0000 | 0.5065 | 0.0000 | 0.5384 | 0.0000 | 0.5906 |
| 0.0029 | 0.5276 | 0.0007 | 0.5552 | 0.0017 | 0.6076 |
| 0.0098 | 0.5527 | 0.0046 | 0.5765 | 0.0069 | 0.6289 |
| 0.0215 | 0.5811 | 0.0128 | 0.6016 | 0.0167 | 0.6538 |
| 0.0382 | 0.6124 | 0.0260 | 0.6299 | 0.0317 | 0.6817 |
| 0.0604 | 0.6460 | 0.0445 | 0.6610 | 0.0523 | 0.7121 |
| 0.0899 | 0.6799 | 0.0691 | 0.6938 | 0.0796 | 0.7436 |
| 0.1286 | 0.7110 | 0.1016 | 0.7259 | 0.1157 | 0.7729 |
| 0.1779 | 0.7338 | 0.1438 | 0.7531 | 0.1614 | 0.7950 |
| 0.2363 | 0.7419 | 0.1958 | 0.7698 | 0.2157 | 0.8043 |
| 0.2969 | 0.7324 | 0.2551 | 0.7706 | 0.2751 | 0.7971 |
| 0.3578 | 0.7068 | 0.3149 | 0.7545 | 0.3332 | 0.7743 |
| 0.4148 | 0.6691 | 0.3740 | 0.7233 | 0.3900 | 0.7377 |
| 0.4660 | 0.6237 | 0.4288 | 0.6811 | 0.4424 | 0.6915 |
| 0.5135 | 0.5712 | 0.4779 | 0.6324 | 0.4892 | 0.6397 |
| 0.5562 | 0.5147 | 0.5235 | 0.5773 | 0.5328 | 0.5819 |
| 0.5945 | 0.4551 | 0.5645 | 0.5186 | 0.5722 | 0.5212 |
| 0.6290 | 0.3933 | 0.6015 | 0.4572 | 0.6080 | 0.4583 |
| 0.6604 | 0.3298 | 0.6350 | 0.3940 | 0.6407 | 0.3937 |
| 0.6891 | 0.2651 | 0.6657 | 0.3292 | 0.6708 | 0.3278 |
| 0.7155 | 0.1994 | 0.6939 | 0.2634 | 0.6986 | 0.2610 |
| 0.7400 | 0.1329 | 0.7199 | 0.1967 | 0.7245 | 0.1934 |
| 0.7627 | 0.0659 | 0.7441 | 0.1293 | 0.7487 | 0.1252 |
| 0.7840 | −0.0016 | 0.7667 | 0.0614 | 0.7713 | 0.0564 |
| 0.8041 | −0.0696 | 0.7880 | −0.0070 | 0.7926 | −0.0127 |
| 0.8230 | −0.1378 | 0.8080 | −0.0758 | 0.8127 | −0.0823 |
| 0.8410 | −0.2063 | 0.8268 | −0.1448 | 0.8317 | −0.1521 |
| 0.8581 | −0.2750 | 0.8448 | −0.2141 | 0.8496 | −0.2222 |
| 0.8739 | −0.3415 | 0.8618 | −0.2837 | 0.8666 | −0.2925 |
| 0.8891 | −0.4083 | 0.8775 | −0.3511 | 0.8822 | −0.3607 |
| 0.9031 | −0.4728 | 0.8925 | −0.4186 | 0.8971 | −0.4291 |
| 0.9158 | −0.5328 | 0.9063 | −0.4840 | 0.9106 | −0.4952 |
| 0.9292 | −0.5903 | 0.9188 | −0.5447 | 0.9228 | −0.5567 |
| 0.9423 | −0.6430 | 0.9319 | −0.6029 | 0.9355 | −0.6156 |
| 0.9546 | −0.6909 | 0.9446 | −0.6562 | 0.9478 | −0.6697 |
| 0.9653 | −0.7345 | 0.9567 | −0.7049 | 0.9595 | −0.7190 |
| 0.9746 | −0.7735 | 0.9671 | −0.7490 | 0.9694 | −0.7637 |
| 0.9827 | −0.8079 | 0.9760 | −0.7885 | 0.9779 | −0.8038 |
| 0.9896 | −0.8378 | 0.9837 | −0.8235 | 0.9851 | −0.8392 |
| 0.9952 | −0.8631 | 0.9904 | −0.8537 | 0.9914 | −0.8699 |
| 0.9993 | −0.8840 | 0.9957 | −0.8794 | 0.9963 | −0.8960 |
| 1.0000 | −0.9005 | 0.9995 | −0.9005 | 0.9997 | −0.9174 |
| 0.9967 | −0.9118 | 1.0000 | −0.9173 | 1.0000 | −0.9343 |
| 0.9916 | −0.9197 | 0.9966 | −0.9286 | 0.9964 | −0.9457 |
| 0.9867 | −0.9247 | 0.9914 | −0.9366 | 0.9911 | −0.9538 |
| 0.9828 | −0.9275 | 0.9863 | −0.9417 | 0.9859 | −0.9588 |
| 0.9787 | −0.9298 | 0.9824 | −0.9445 | 0.9820 | −0.9617 |
| 0.9766 | −0.9308 | 0.9783 | −0.9468 | 0.9778 | −0.9640 |
| 0.9744 | −0.9316 | 0.9761 | −0.9477 | 0.9756 | −0.9650 |
| 0.9727 | −0.9321 | 0.9738 | −0.9486 | 0.9733 | −0.9658 |
| 0.9710 | −0.9324 | 0.9721 | −0.9490 | 0.9715 | −0.9663 |
| 0.9675 | −0.9330 | 0.9703 | −0.9494 | 0.9697 | −0.9666 |
| 0.9640 | −0.9331 | 0.9668 | −0.9499 | 0.9660 | −0.9672 |
| 0.9587 | −0.9328 | 0.9632 | −0.9501 | 0.9623 | −0.9674 |
| 0.9519 | −0.9312 | 0.9578 | −0.9498 | 0.9568 | −0.9670 |
| 0.9440 | −0.9275 | 0.9507 | −0.9481 | 0.9495 | −0.9652 |
| 0.9349 | −0.9193 | 0.9426 | −0.9442 | 0.9412 | −0.9612 |

TABLE 4-continued

Normalized Coordinates (Blade Airfoils)
Tolerance: ±0.05" (±1.27 mm)

| | | | | | |
|---|---|---|---|---|---|
| 0.9271 | −0.9056 | 0.9333 | −0.9357 | 0.9317 | −0.9523 |
| 0.9195 | −0.8879 | 0.9255 | −0.9215 | 0.9239 | −0.9375 |
| 0.9101 | −0.8671 | 0.9179 | −0.9031 | 0.9164 | −0.9185 |
| 0.8996 | −0.8430 | 0.9086 | −0.8816 | 0.9072 | −0.8962 |
| 0.8876 | −0.8158 | 0.8982 | −0.8567 | 0.8969 | −0.8703 |
| 0.8743 | −0.7853 | 0.8863 | −0.8285 | 0.8852 | −0.8410 |
| 0.8598 | −0.7515 | 0.8730 | −0.7969 | 0.8721 | −0.8083 |
| 0.8440 | −0.7144 | 0.8586 | −0.7619 | 0.8579 | −0.7720 |
| 0.8257 | −0.6746 | 0.8429 | −0.7235 | 0.8423 | −0.7322 |
| 0.8057 | −0.6337 | 0.8247 | −0.6823 | 0.8243 | −0.6895 |
| 0.7835 | −0.5899 | 0.8047 | −0.6398 | 0.8044 | −0.6454 |
| 0.7606 | −0.5446 | 0.7826 | −0.5945 | 0.7823 | −0.5984 |
| 0.7376 | −0.4992 | 0.7597 | −0.5474 | 0.7595 | −0.5496 |
| 0.7139 | −0.4523 | 0.7367 | −0.5004 | 0.7365 | −0.5008 |
| 0.6902 | −0.4054 | 0.7130 | −0.4518 | 0.7128 | −0.4504 |
| 0.6664 | −0.3585 | 0.6892 | −0.4032 | 0.6890 | −0.4000 |
| 0.6427 | −0.3115 | 0.6654 | −0.3545 | 0.6651 | −0.3496 |
| 0.6189 | −0.2646 | 0.6416 | −0.3059 | 0.6411 | −0.2993 |
| 0.5951 | −0.2177 | 0.6178 | −0.2573 | 0.6171 | −0.2489 |
| 0.5713 | −0.1708 | 0.5939 | −0.2087 | 0.5930 | −0.1986 |
| 0.5475 | −0.1239 | 0.5700 | −0.1600 | 0.5688 | −0.1483 |
| 0.5235 | −0.0770 | 0.5461 | −0.1114 | 0.5446 | −0.0981 |
| 0.4993 | −0.0303 | 0.5221 | −0.0629 | 0.5201 | −0.0479 |
| 0.4748 | 0.0162 | 0.4978 | −0.0144 | 0.4955 | 0.0022 |
| 0.4497 | 0.0625 | 0.4732 | 0.0339 | 0.4705 | 0.0522 |
| 0.4238 | 0.1083 | 0.4481 | 0.0820 | 0.4450 | 0.1019 |
| 0.3970 | 0.1536 | 0.4223 | 0.1296 | 0.4189 | 0.1513 |
| 0.3699 | 0.1967 | 0.3955 | 0.1768 | 0.3920 | 0.2003 |
| 0.3411 | 0.2387 | 0.3686 | 0.2218 | 0.3650 | 0.2470 |
| 0.3114 | 0.2778 | 0.3401 | 0.2658 | 0.3366 | 0.2930 |
| 0.2815 | 0.3122 | 0.3108 | 0.3071 | 0.3076 | 0.3364 |
| 0.2499 | 0.3427 | 0.2813 | 0.3437 | 0.2786 | 0.3751 |
| 0.2177 | 0.3669 | 0.2503 | 0.3764 | 0.2483 | 0.4104 |
| 0.1852 | 0.3844 | 0.2186 | 0.4032 | 0.2176 | 0.4400 |
| 0.1532 | 0.3936 | 0.1866 | 0.4233 | 0.1864 | 0.4631 |
| 0.1235 | 0.3968 | 0.1548 | 0.4355 | 0.1551 | 0.4789 |
| 0.0974 | 0.3996 | 0.1247 | 0.4409 | 0.1248 | 0.4873 |
| 0.0752 | 0.4049 | 0.0977 | 0.4445 | 0.0972 | 0.4922 |
| 0.0571 | 0.4116 | 0.0749 | 0.4501 | 0.0736 | 0.4982 |
| 0.0432 | 0.4190 | 0.0563 | 0.4572 | 0.0546 | 0.5058 |
| 0.0331 | 0.4260 | 0.0419 | 0.4649 | 0.0400 | 0.5141 |
| 0.0265 | 0.4318 | 0.0316 | 0.4723 | 0.0295 | 0.5219 |
| 0.0216 | 0.4368 | 0.0249 | 0.4783 | 0.0227 | 0.5283 |
| 0.0182 | 0.4408 | 0.0200 | 0.4836 | 0.0178 | 0.5339 |
| 0.0161 | 0.4436 | 0.0166 | 0.4879 | 0.0144 | 0.5384 |
| 0.0141 | 0.4465 | 0.0145 | 0.4908 | 0.0124 | 0.5416 |
| 0.0132 | 0.4480 | 0.0125 | 0.4939 | 0.0105 | 0.5448 |
| 0.0122 | 0.4495 | 0.0116 | 0.4954 | 0.0096 | 0.5464 |
| 0.0111 | 0.4516 | 0.0107 | 0.4970 | 0.0087 | 0.5481 |
| 0.0100 | 0.4536 | 0.0096 | 0.4991 | 0.0076 | 0.5503 |
| 0.0079 | 0.4579 | 0.0085 | 0.5013 | 0.0067 | 0.5525 |
| 0.0061 | 0.4623 | 0.0066 | 0.5057 | 0.0049 | 0.5570 |
| 0.0038 | 0.4690 | 0.0049 | 0.5102 | 0.0034 | 0.5617 |
| 0.0016 | 0.4782 | 0.0028 | 0.5171 | 0.0017 | 0.5688 |
| 0.0001 | 0.4899 | 0.0010 | 0.5265 | 0.0003 | 0.5784 |
| 0.0000 | 0.5065 | 0.0000 | 0.5384 | 0.0000 | 0.5906 |

| Section S12 | | Section S13 | | Section S14 | |
|---|---|---|---|---|---|
| $X/B_X$ | $Y/B_X$ | $X/B_X$ | $Y/B_X$ | $X/B_X$ | $Y/B_X$ |
| 0.0000 | 0.6351 | 0.0000 | 0.6880 | 0.0000 | 0.7510 |
| 0.0005 | 0.6474 | 0.0001 | 0.6979 | 0.0001 | 0.7584 |
| 0.0034 | 0.6644 | 0.0017 | 0.7102 | 0.0012 | 0.7683 |
| 0.0102 | 0.6855 | 0.0061 | 0.7269 | 0.0042 | 0.7803 |
| 0.0219 | 0.7099 | 0.0148 | 0.7474 | 0.0105 | 0.7964 |
| 0.0390 | 0.7370 | 0.0287 | 0.7708 | 0.0214 | 0.8158 |
| 0.0620 | 0.7660 | 0.0482 | 0.7963 | 0.0379 | 0.8375 |
| 0.0924 | 0.7952 | 0.0740 | 0.8230 | 0.0602 | 0.8605 |
| 0.1319 | 0.8205 | 0.1074 | 0.8483 | 0.0889 | 0.8834 |
| 0.1808 | 0.8362 | 0.1499 | 0.8681 | 0.1252 | 0.9031 |
| 0.2366 | 0.8372 | 0.2010 | 0.8763 | 0.1698 | 0.9154 |
| 0.2952 | 0.8217 | 0.2572 | 0.8686 | 0.2216 | 0.9149 |
| 0.3511 | 0.7924 | 0.3142 | 0.8450 | 0.2768 | 0.8985 |
| 0.4052 | 0.7508 | 0.3676 | 0.8095 | 0.3314 | 0.8674 |
| 0.4551 | 0.7008 | 0.4189 | 0.7633 | 0.3819 | 0.8262 |
| 0.4997 | 0.6460 | 0.4662 | 0.7097 | 0.4306 | 0.7758 |

TABLE 4-continued

Normalized Coordinates (Blade Airfoils)
Tolerance: ±0.05" (±1.27 mm)

| | | | | | |
|---|---|---|---|---|---|
| 0.5413 | 0.5858 | 0.5087 | 0.6522 | 0.4756 | 0.7190 |
| 0.5791 | 0.5232 | 0.5484 | 0.5897 | 0.5162 | 0.6589 |
| 0.6137 | 0.4588 | 0.5847 | 0.5253 | 0.5542 | 0.5943 |
| 0.6457 | 0.3929 | 0.6183 | 0.4593 | 0.5892 | 0.5280 |
| 0.6753 | 0.3260 | 0.6495 | 0.3922 | 0.6217 | 0.4605 |
| 0.7029 | 0.2582 | 0.6786 | 0.3242 | 0.6521 | 0.3920 |
| 0.7287 | 0.1898 | 0.7059 | 0.2554 | 0.6806 | 0.3227 |
| 0.7529 | 0.1207 | 0.7315 | 0.1860 | 0.7073 | 0.2527 |
| 0.7756 | 0.0512 | 0.7557 | 0.1160 | 0.7326 | 0.1822 |
| 0.7971 | −0.0188 | 0.7784 | 0.0456 | 0.7564 | 0.1112 |
| 0.8173 | −0.0891 | 0.7999 | −0.0252 | 0.7789 | 0.0397 |
| 0.8363 | −0.1597 | 0.8201 | −0.0964 | 0.8002 | −0.0321 |
| 0.8544 | −0.2306 | 0.8392 | −0.1679 | 0.8203 | −0.1043 |
| 0.8713 | −0.3018 | 0.8572 | −0.2397 | 0.8393 | −0.1768 |
| 0.8868 | −0.3708 | 0.8742 | −0.3117 | 0.8572 | −0.2495 |
| 0.9015 | −0.4399 | 0.8896 | −0.3815 | 0.8741 | −0.3225 |
| 0.9148 | −0.5069 | 0.9041 | −0.4515 | 0.8894 | −0.3933 |
| 0.9266 | −0.5691 | 0.9172 | −0.5193 | 0.9039 | −0.4643 |
| 0.9389 | −0.6288 | 0.9288 | −0.5824 | 0.9169 | −0.5330 |
| 0.9509 | −0.6836 | 0.9409 | −0.6429 | 0.9285 | −0.5969 |
| 0.9621 | −0.7335 | 0.9526 | −0.6983 | 0.9406 | −0.6581 |
| 0.9716 | −0.7789 | 0.9636 | −0.7490 | 0.9523 | −0.7143 |
| 0.9796 | −0.8195 | 0.9728 | −0.7949 | 0.9634 | −0.7656 |
| 0.9865 | −0.8554 | 0.9806 | −0.8361 | 0.9727 | −0.8121 |
| 0.9923 | −0.8866 | 0.9872 | −0.8725 | 0.9805 | −0.8539 |
| 0.9969 | −0.9130 | 0.9928 | −0.9040 | 0.9871 | −0.8907 |
| 1.0000 | −0.9347 | 0.9971 | −0.9308 | 0.9927 | −0.9227 |
| 1.0000 | −0.9518 | 1.0000 | −0.9528 | 0.9971 | −0.9498 |
| 0.9963 | −0.9633 | 0.9998 | −0.9701 | 1.0000 | −0.9721 |
| 0.9908 | −0.9714 | 0.9959 | −0.9818 | 0.9996 | −0.9896 |
| 0.9856 | −0.9765 | 0.9903 | −0.9899 | 0.9955 | −1.0014 |
| 0.9816 | −0.9793 | 0.9850 | −0.9950 | 0.9898 | −1.0095 |
| 0.9773 | −0.9817 | 0.9810 | −0.9978 | 0.9844 | −1.0147 |
| 0.9751 | −0.9826 | 0.9766 | −1.0002 | 0.9803 | −1.0176 |
| 0.9728 | −0.9835 | 0.9744 | −1.0012 | 0.9759 | −1.0199 |
| 0.9710 | −0.9840 | 0.9720 | −1.0020 | 0.9736 | −1.0209 |
| 0.9691 | −0.9844 | 0.9701 | −1.0025 | 0.9712 | −1.0218 |
| 0.9653 | −0.9849 | 0.9682 | −1.0029 | 0.9693 | −1.0223 |
| 0.9615 | −0.9851 | 0.9643 | −1.0035 | 0.9672 | −1.0227 |
| 0.9557 | −0.9846 | 0.9603 | −1.0037 | 0.9632 | −1.0233 |
| 0.9483 | −0.9828 | 0.9544 | −1.0032 | 0.9591 | −1.0234 |
| 0.9397 | −0.9786 | 0.9467 | −1.0012 | 0.9529 | −1.0229 |
| 0.9301 | −0.9693 | 0.9379 | −0.9968 | 0.9450 | −1.0208 |
| 0.9222 | −0.9539 | 0.9281 | −0.9870 | 0.9359 | −1.0161 |
| 0.9148 | −0.9342 | 0.9201 | −0.9711 | 0.9259 | −1.0058 |
| 0.9057 | −0.9110 | 0.9127 | −0.9506 | 0.9178 | −0.9892 |
| 0.8955 | −0.8842 | 0.9035 | −0.9266 | 0.9101 | −0.9680 |
| 0.8838 | −0.8538 | 0.8932 | −0.8987 | 0.9006 | −0.9430 |
| 0.8708 | −0.8198 | 0.8815 | −0.8672 | 0.8899 | −0.9141 |
| 0.8567 | −0.7822 | 0.8683 | −0.8319 | 0.8778 | −0.8814 |
| 0.8413 | −0.7409 | 0.8541 | −0.7928 | 0.8642 | −0.8449 |
| 0.8233 | −0.6965 | 0.8386 | −0.7500 | 0.8495 | −0.8043 |
| 0.8035 | −0.6509 | 0.8204 | −0.7040 | 0.8334 | −0.7599 |
| 0.7814 | −0.6020 | 0.8004 | −0.6565 | 0.8147 | −0.7121 |
| 0.7585 | −0.5514 | 0.7781 | −0.6058 | 0.7940 | −0.6629 |
| 0.7355 | −0.5008 | 0.7549 | −0.5532 | 0.7710 | −0.6102 |
| 0.7117 | −0.4485 | 0.7316 | −0.5007 | 0.7472 | −0.5556 |
| 0.6877 | −0.3962 | 0.7075 | −0.4464 | 0.7234 | −0.5009 |
| 0.6637 | −0.3440 | 0.6833 | −0.3921 | 0.6987 | −0.4444 |
| 0.6395 | −0.2918 | 0.6589 | −0.3378 | 0.6740 | −0.3880 |
| 0.6152 | −0.2396 | 0.6345 | −0.2837 | 0.6492 | −0.3315 |
| 0.5908 | −0.1875 | 0.6099 | −0.2295 | 0.6244 | −0.2751 |
| 0.5662 | −0.1355 | 0.5851 | −0.1754 | 0.5995 | −0.2187 |
| 0.5415 | −0.0835 | 0.5602 | −0.1214 | 0.5745 | −0.1623 |
| 0.5165 | −0.0316 | 0.5351 | −0.0675 | 0.5494 | −0.1060 |
| 0.4913 | 0.0202 | 0.5097 | −0.0137 | 0.5241 | −0.0497 |
| 0.4658 | 0.0718 | 0.4841 | 0.0400 | 0.4986 | 0.0064 |
| 0.4399 | 0.1232 | 0.4582 | 0.0936 | 0.4729 | 0.0625 |
| 0.4134 | 0.1744 | 0.4319 | 0.1470 | 0.4469 | 0.1184 |
| 0.3862 | 0.2252 | 0.4051 | 0.2001 | 0.4205 | 0.1741 |
| 0.3590 | 0.2738 | 0.3777 | 0.2530 | 0.3938 | 0.2297 |
| 0.3308 | 0.3218 | 0.3505 | 0.3037 | 0.3665 | 0.2850 |
| 0.3021 | 0.3673 | 0.3224 | 0.3539 | 0.3396 | 0.3382 |
| 0.2737 | 0.4084 | 0.2941 | 0.4017 | 0.3118 | 0.3909 |
| 0.2443 | 0.4462 | 0.2663 | 0.4452 | 0.2840 | 0.4414 |
| 0.2146 | 0.4788 | 0.2378 | 0.4858 | 0.2569 | 0.4875 |
| 0.1845 | 0.5053 | 0.2093 | 0.5215 | 0.2293 | 0.5310 |

TABLE 4-continued

Normalized Coordinates (Blade Airfoils)
Tolerance: ±0.05" (±1.27 mm)

| 0.1541 | 0.5251 | 0.1804 | 0.5515 | 0.2018 | 0.5697 |
| 0.1238 | 0.5369 | 0.1510 | 0.5752 | 0.1740 | 0.6031 |
| 0.0957 | 0.5436 | 0.1211 | 0.5907 | 0.1457 | 0.6306 |
| 0.0716 | 0.5503 | 0.0928 | 0.5999 | 0.1167 | 0.6500 |
| 0.0521 | 0.5588 | 0.0683 | 0.6079 | 0.0886 | 0.6622 |
| 0.0373 | 0.5677 | 0.0487 | 0.6174 | 0.0640 | 0.6721 |
| 0.0268 | 0.5761 | 0.0338 | 0.6272 | 0.0444 | 0.6831 |
| 0.0200 | 0.5830 | 0.0233 | 0.6364 | 0.0296 | 0.6941 |
| 0.0152 | 0.5890 | 0.0167 | 0.6438 | 0.0195 | 0.7042 |
| 0.0119 | 0.5938 | 0.0121 | 0.6502 | 0.0131 | 0.7123 |
| 0.0100 | 0.5971 | 0.0090 | 0.6553 | 0.0088 | 0.7192 |
| 0.0082 | 0.6005 | 0.0072 | 0.6589 | 0.0061 | 0.7247 |
| 0.0073 | 0.6022 | 0.0056 | 0.6625 | 0.0045 | 0.7285 |
| 0.0065 | 0.6040 | 0.0049 | 0.6644 | 0.0032 | 0.7324 |
| 0.0056 | 0.6063 | 0.0042 | 0.6662 | 0.0026 | 0.7343 |
| 0.0047 | 0.6086 | 0.0034 | 0.6686 | 0.0021 | 0.7363 |
| 0.0032 | 0.6132 | 0.0027 | 0.6709 | 0.0015 | 0.7387 |
| 0.0020 | 0.6180 | 0.0015 | 0.6757 | 0.0010 | 0.7411 |
| 0.0007 | 0.6253 | 0.0007 | 0.6806 | 0.0004 | 0.7461 |
| 0.0000 | 0.6351 | 0.0000 | 0.6880 | 0.0000 | 0.7510 |

| Section S15 | | Section S16 | | Section S17 | |
|---|---|---|---|---|---|
| $X/B_X$ | $Y/B_X$ | $X/B_X$ | $Y/B_X$ | $X/B_X$ | $Y/B_X$ |
| 0.0000 | 0.8250 | 0.0000 | 0.9029 | 0.0000 | 0.9910 |
| 0.0003 | 0.8299 | 0.0001 | 0.9054 | 0.0002 | 0.9957 |
| 0.0013 | 0.8373 | 0.0002 | 0.9079 | 0.0004 | 0.9981 |
| 0.0038 | 0.8469 | 0.0009 | 0.9130 | 0.0007 | 1.0004 |
| 0.0084 | 0.8584 | 0.0019 | 0.9179 | 0.0012 | 1.0030 |
| 0.0169 | 0.8736 | 0.0042 | 0.9251 | 0.0018 | 1.0055 |
| 0.0305 | 0.8912 | 0.0082 | 0.9343 | 0.0034 | 1.0105 |
| 0.0499 | 0.9104 | 0.0148 | 0.9451 | 0.0054 | 1.0154 |
| 0.0753 | 0.9299 | 0.0260 | 0.9587 | 0.0090 | 1.0224 |
| 0.1073 | 0.9474 | 0.0426 | 0.9740 | 0.0150 | 1.0309 |
| 0.1463 | 0.9595 | 0.0653 | 0.9898 | 0.0239 | 1.0406 |
| 0.1919 | 0.9622 | 0.0943 | 1.0045 | 0.0381 | 1.0522 |
| 0.2427 | 0.9519 | 0.1297 | 1.0150 | 0.0583 | 1.0643 |
| 0.2953 | 0.9268 | 0.1710 | 1.0172 | 0.0847 | 1.0758 |
| 0.3466 | 0.8887 | 0.2165 | 1.0083 | 0.1175 | 1.0846 |
| 0.3942 | 0.8426 | 0.2645 | 0.9868 | 0.1567 | 1.0863 |
| 0.4402 | 0.7884 | 0.3128 | 0.9530 | 0.2000 | 1.0762 |
| 0.4832 | 0.7286 | 0.3600 | 0.9087 | 0.2441 | 1.0532 |
| 0.5221 | 0.6662 | 0.4043 | 0.8583 | 0.2873 | 1.0193 |
| 0.5588 | 0.5996 | 0.4479 | 0.8007 | 0.3296 | 0.9768 |
| 0.5926 | 0.5315 | 0.4890 | 0.7384 | 0.3717 | 0.9271 |
| 0.6240 | 0.4624 | 0.5265 | 0.6739 | 0.4124 | 0.8730 |
| 0.6534 | 0.3924 | 0.5620 | 0.6055 | 0.4535 | 0.8126 |
| 0.6811 | 0.3217 | 0.5948 | 0.5357 | 0.4930 | 0.7482 |
| 0.7071 | 0.2503 | 0.6252 | 0.4649 | 0.5294 | 0.6819 |
| 0.7317 | 0.1785 | 0.6536 | 0.3933 | 0.5641 | 0.6118 |
| 0.7549 | 0.1062 | 0.6802 | 0.3210 | 0.5959 | 0.5404 |
| 0.7769 | 0.0335 | 0.7052 | 0.2481 | 0.6253 | 0.4679 |
| 0.7977 | −0.0395 | 0.7287 | 0.1748 | 0.6525 | 0.3946 |
| 0.8174 | −0.1128 | 0.7510 | 0.1010 | 0.6778 | 0.3205 |
| 0.8361 | −0.1865 | 0.7722 | 0.0270 | 0.7015 | 0.2460 |
| 0.8538 | −0.2603 | 0.7923 | −0.0474 | 0.7237 | 0.1710 |
| 0.8705 | −0.3344 | 0.8114 | −0.1220 | 0.7447 | 0.0957 |
| 0.8858 | −0.4062 | 0.8295 | −0.1969 | 0.7647 | 0.0200 |
| 0.9003 | −0.4782 | 0.8469 | −0.2720 | 0.7837 | −0.0558 |
| 0.9135 | −0.5478 | 0.8634 | −0.3472 | 0.8019 | −0.1319 |
| 0.9252 | −0.6126 | 0.8787 | −0.4201 | 0.8194 | −0.2081 |
| 0.9376 | −0.6747 | 0.8933 | −0.4932 | 0.8362 | −0.2845 |
| 0.9497 | −0.7316 | 0.9067 | −0.5638 | 0.8524 | −0.3610 |
| 0.9612 | −0.7835 | 0.9188 | −0.6295 | 0.8676 | −0.4351 |
| 0.9709 | −0.8306 | 0.9318 | −0.6924 | 0.8825 | −0.5092 |
| 0.9791 | −0.8729 | 0.9446 | −0.7500 | 0.8963 | −0.5809 |
| 0.9861 | −0.9102 | 0.9569 | −0.8025 | 0.9091 | −0.6474 |
| 0.9921 | −0.9425 | 0.9673 | −0.8502 | 0.9230 | −0.7111 |
| 0.9968 | −0.9700 | 0.9764 | −0.8929 | 0.9369 | −0.7694 |
| 1.0000 | −0.9925 | 0.9842 | −0.9306 | 0.9503 | −0.8225 |
| 0.9994 | −1.0102 | 0.9909 | −0.9633 | 0.9620 | −0.8706 |
| 0.9952 | −1.0221 | 0.9962 | −0.9910 | 0.9722 | −0.9137 |
| 0.9893 | −1.0304 | 1.0000 | −1.0138 | 0.9812 | −0.9518 |
| 0.9838 | −1.0355 | 0.9993 | −1.0318 | 0.9891 | −0.9848 |
| 0.9796 | −1.0384 | 0.9948 | −1.0438 | 0.9953 | −1.0127 |
| 0.9751 | −1.0408 | 0.9888 | −1.0521 | 1.0000 | −1.0358 |

TABLE 4-continued

Normalized Coordinates (Blade Airfoils)
Tolerance: ±0.05" (±1.27 mm)

| | | | | | |
|---|---|---|---|---|---|
| 0.9728 | −1.0418 | 0.9831 | −1.0573 | 0.9992 | −1.0540 |
| 0.9704 | −1.0427 | 0.9789 | −1.0602 | 0.9945 | −1.0661 |
| 0.9684 | −1.0432 | 0.9744 | −1.0626 | 0.9883 | −1.0745 |
| 0.9663 | −1.0436 | 0.9720 | −1.0636 | 0.9826 | −1.0797 |
| 0.9620 | −1.0442 | 0.9696 | −1.0645 | 0.9782 | −1.0827 |
| 0.9578 | −1.0444 | 0.9674 | −1.0650 | 0.9736 | −1.0851 |
| 0.9514 | −1.0438 | 0.9653 | −1.0655 | 0.9712 | −1.0861 |
| 0.9432 | −1.0415 | 0.9608 | −1.0661 | 0.9688 | −1.0870 |
| 0.9337 | −1.0364 | 0.9564 | −1.0662 | 0.9665 | −1.0876 |
| 0.9236 | −1.0256 | 0.9497 | −1.0655 | 0.9642 | −1.0880 |
| 0.9153 | −1.0082 | 0.9412 | −1.0631 | 0.9596 | −1.0886 |
| 0.9069 | −0.9863 | 0.9315 | −1.0576 | 0.9550 | −1.0887 |
| 0.8969 | −0.9604 | 0.9211 | −1.0461 | 0.9480 | −1.0879 |
| 0.8855 | −0.9305 | 0.9125 | −1.0279 | 0.9391 | −1.0852 |
| 0.8726 | −0.8966 | 0.9033 | −1.0053 | 0.9290 | −1.0794 |
| 0.8582 | −0.8587 | 0.8924 | −0.9785 | 0.9185 | −1.0671 |
| 0.8425 | −0.8167 | 0.8800 | −0.9475 | 0.9096 | −1.0480 |
| 0.8255 | −0.7706 | 0.8659 | −0.9124 | 0.8992 | −1.0247 |
| 0.8057 | −0.7210 | 0.8501 | −0.8731 | 0.8871 | −0.9970 |
| 0.7839 | −0.6699 | 0.8331 | −0.8296 | 0.8732 | −0.9649 |
| 0.7599 | −0.6151 | 0.8146 | −0.7818 | 0.8575 | −0.9286 |
| 0.7350 | −0.5584 | 0.7932 | −0.7304 | 0.8400 | −0.8880 |
| 0.7102 | −0.5016 | 0.7699 | −0.6774 | 0.8211 | −0.8429 |
| 0.6847 | −0.4427 | 0.7443 | −0.6205 | 0.8006 | −0.7935 |
| 0.6593 | −0.3838 | 0.7180 | −0.5615 | 0.7771 | −0.7402 |
| 0.6340 | −0.3249 | 0.6919 | −0.5024 | 0.7518 | −0.6852 |
| 0.6087 | −0.2660 | 0.6652 | −0.4410 | 0.7240 | −0.6262 |
| 0.5835 | −0.2070 | 0.6388 | −0.3796 | 0.6958 | −0.5649 |
| 0.5584 | −0.1480 | 0.6128 | −0.3180 | 0.6680 | −0.5033 |
| 0.5333 | −0.0890 | 0.5870 | −0.2562 | 0.6398 | −0.4393 |
| 0.5081 | −0.0300 | 0.5616 | −0.1944 | 0.6123 | −0.3751 |
| 0.4828 | 0.0289 | 0.5364 | −0.1324 | 0.5853 | −0.3105 |
| 0.4573 | 0.0878 | 0.5115 | −0.0703 | 0.5590 | −0.2457 |
| 0.4316 | 0.1465 | 0.4868 | −0.0081 | 0.5333 | −0.1807 |
| 0.4057 | 0.2051 | 0.4620 | 0.0540 | 0.5083 | −0.1153 |
| 0.3793 | 0.2636 | 0.4373 | 0.1161 | 0.4839 | −0.0497 |
| 0.3526 | 0.3218 | 0.4123 | 0.1782 | 0.4599 | 0.0160 |
| 0.3261 | 0.3779 | 0.3872 | 0.2401 | 0.4361 | 0.0818 |
| 0.2989 | 0.4336 | 0.3617 | 0.3020 | 0.4125 | 0.1477 |
| 0.2718 | 0.4870 | 0.3358 | 0.3637 | 0.3888 | 0.2136 |
| 0.2454 | 0.5360 | 0.3102 | 0.4231 | 0.3650 | 0.2795 |
| 0.2186 | 0.5825 | 0.2839 | 0.4822 | 0.3408 | 0.3453 |
| 0.1921 | 0.6242 | 0.2576 | 0.5389 | 0.3163 | 0.4109 |
| 0.1654 | 0.6608 | 0.2320 | 0.5910 | 0.2919 | 0.4741 |
| 0.1383 | 0.6918 | 0.2060 | 0.6405 | 0.2667 | 0.5370 |
| 0.1104 | 0.7152 | 0.1803 | 0.6852 | 0.2414 | 0.5974 |
| 0.0831 | 0.7311 | 0.1546 | 0.7248 | 0.2166 | 0.6529 |
| 0.0589 | 0.7436 | 0.1288 | 0.7590 | 0.1914 | 0.7055 |
| 0.0394 | 0.7565 | 0.1026 | 0.7865 | 0.1664 | 0.7531 |
| 0.0251 | 0.7691 | 0.0767 | 0.8069 | 0.1417 | 0.7956 |
| 0.0154 | 0.7803 | 0.0530 | 0.8229 | 0.1172 | 0.8326 |
| 0.0095 | 0.7892 | 0.0340 | 0.8381 | 0.0932 | 0.8643 |
| 0.0057 | 0.7967 | 0.0203 | 0.8526 | 0.0693 | 0.8899 |
| 0.0034 | 0.8027 | 0.0113 | 0.8652 | 0.0467 | 0.9103 |
| 0.0022 | 0.8067 | 0.0062 | 0.8750 | 0.0285 | 0.9284 |
| 0.0012 | 0.8108 | 0.0030 | 0.8833 | 0.0157 | 0.9451 |
| 0.0009 | 0.8129 | 0.0013 | 0.8897 | 0.0076 | 0.9594 |
| 0.0006 | 0.8150 | 0.0006 | 0.8941 | 0.0034 | 0.9703 |
| 0.0003 | 0.8175 | 0.0001 | 0.8985 | 0.0011 | 0.9794 |
| 0.0001 | 0.8200 | 0.0000 | 0.9007 | 0.0002 | 0.9864 |
| 0.0000 | 0.8250 | 0.0000 | 0.9029 | 0.0000 | 0.9910 |

TABLE 5

Normalized Platform (ID) and Shroud (OD) Coordinates (Vanes)
Tolerance: ±0.05" (±1.27 mm)

| $X_{ID}/B_{Xroot}$ | $SD_{ID}$ (Y = 0) | $X_{OD}/B_{Xroot}$ | $S_{OD}$ (Y = 0) | $X_{ID}/B_{Xroot}$ | $SD_{ID}$ (Y = 0) | $X_{OD}/B_{Xroot}$ | $S_{OD}$ (Y = 0) |
|---|---|---|---|---|---|---|---|
| −0.2859 | −0.1706 | −0.1514 | 1.2259 | −0.1597 | −0.1119 | −0.0169 | 1.1834 |
| −0.2613 | −0.1492 | −0.1236 | 1.2073 | −0.1218 | −0.1057 | 0.0213 | 1.1827 |
| −0.2318 | −0.1313 | −0.0912 | 1.1931 | −0.0840 | −0.0995 | 0.0593 | 1.1805 |
| −0.1973 | −0.1187 | −0.0549 | 1.1849 | −0.0461 | −0.0932 | 0.0972 | 1.1771 |

TABLE 5-continued

Normalized Platform (ID) and Shroud (OD) Coordinates (Vanes)
Tolerance: ±0.05" (±1.27 mm)

| $X_{ID}/B_{Xroot}$ | $SD_{ID}$ (Y = 0) | $X_{OD}/B_{Xroot}$ | $S_{OD}$ (Y = 0) |
|---|---|---|---|
| −0.0082 | −0.0870 | 0.1349 | 1.1729 |
| 0.0296 | −0.0808 | 0.1726 | 1.1683 |
| 0.0675 | −0.0746 | 0.2102 | 1.1636 |
| 0.1053 | −0.0683 | 0.2477 | 1.1588 |
| 0.1432 | −0.0621 | 0.2853 | 1.1541 |
| 0.1811 | −0.0559 | 0.3230 | 1.1495 |
| 0.2190 | −0.0497 | 0.3606 | 1.1449 |
| 0.2568 | −0.0434 | 0.3982 | 1.1402 |
| 0.2946 | −0.0371 | 0.4358 | 1.1356 |
| 0.3325 | −0.0309 | 0.4734 | 1.1309 |
| 0.3705 | −0.0252 | 0.5110 | 1.1263 |
| 0.4087 | −0.0202 | 0.5487 | 1.1216 |
| 0.4472 | −0.0162 | 0.5863 | 1.1170 |
| 0.4858 | −0.0131 | 0.6239 | 1.1124 |
| 0.5246 | −0.0112 | 0.6615 | 1.1077 |
| 0.5634 | −0.0102 | 0.6991 | 1.1030 |
| 0.6023 | −0.0098 | 0.7367 | 1.0983 |
| 0.6411 | −0.0098 | 0.7744 | 1.0937 |
| 0.6800 | −0.0100 | 0.8120 | 1.0892 |
| 0.7188 | −0.0101 | 0.8496 | 1.0846 |
| 0.7577 | −0.0101 | 0.8872 | 1.0799 |
| 0.7966 | −0.0101 | 0.9248 | 1.0749 |
| 0.8354 | −0.0101 | 0.9624 | 1.0704 |
| 0.8743 | −0.0101 | 1.0003 | 1.0673 |
| 0.9131 | −0.0101 | 1.0384 | 1.0659 |
| 0.9520 | −0.0100 | 1.0766 | 1.0660 |
| 0.9909 | −0.0100 | 1.1148 | 1.0668 |
| 1.0297 | −0.0099 | 1.1529 | 1.0681 |
| 1.0686 | −0.0096 | 1.1910 | 1.0696 |
| 1.1074 | −0.0092 | 1.2292 | 1.0712 |
| 1.1463 | −0.0088 | 1.2673 | 1.0729 |
| 1.1851 | −0.0088 | 1.3053 | 1.0748 |

TABLE 6

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.4202 | −0.3680 | −0.0257 |
| −0.4200 | −0.3470 | −0.0253 |
| −0.4198 | −0.3259 | −0.0250 |
| −0.4196 | −0.3048 | −0.0247 |
| −0.4193 | −0.2837 | −0.0245 |
| −0.4191 | −0.2626 | −0.0243 |
| −0.4189 | −0.2415 | −0.0241 |
| −0.4187 | −0.2204 | −0.0240 |
| −0.4184 | −0.1993 | −0.0239 |
| −0.4182 | −0.1782 | −0.0239 |
| −0.4180 | −0.1572 | −0.0239 |
| −0.4178 | −0.1361 | −0.0239 |
| −0.4176 | −0.1150 | −0.0240 |
| −0.4173 | −0.0939 | −0.0241 |
| −0.4171 | −0.0728 | −0.0243 |
| −0.4169 | −0.0517 | −0.0245 |
| −0.4167 | −0.0306 | −0.0247 |
| −0.4164 | −0.0095 | −0.0250 |
| −0.4162 | 0.0116 | −0.0253 |
| −0.4160 | 0.0326 | −0.0257 |
| −0.4158 | 0.0537 | −0.0261 |
| −0.4155 | 0.0748 | −0.0265 |
| −0.4153 | 0.0959 | −0.0270 |
| −0.4151 | 0.1170 | −0.0275 |
| −0.4149 | 0.1380 | −0.0281 |
| −0.4146 | 0.1591 | −0.0287 |
| −0.4144 | 0.1802 | −0.0293 |
| −0.4142 | 0.2012 | −0.0300 |
| −0.4140 | 0.2223 | −0.0307 |
| −0.4137 | 0.2434 | −0.0315 |
| −0.4135 | 0.2644 | −0.0323 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.4133 | 0.2855 | −0.0331 |
| −0.4131 | 0.3065 | −0.0340 |
| −0.4128 | 0.3275 | −0.0349 |
| −0.4126 | 0.3486 | −0.0359 |
| −0.4124 | 0.3696 | −0.0369 |
| −0.4122 | 0.3906 | −0.0379 |
| −0.4120 | 0.4116 | −0.0390 |
| −0.4117 | 0.4327 | −0.0401 |
| −0.4115 | 0.4537 | −0.0413 |
| −0.4113 | 0.4747 | −0.0425 |
| −0.4111 | 0.4957 | −0.0437 |
| −0.4108 | 0.5166 | −0.0450 |
| −0.4106 | 0.5376 | −0.0463 |
| −0.4104 | 0.5586 | −0.0476 |
| −0.3939 | −0.3893 | −0.0261 |
| −0.3937 | −0.3682 | −0.0257 |
| −0.3935 | −0.3471 | −0.0253 |
| −0.3933 | −0.3260 | −0.0250 |
| −0.3931 | −0.3050 | −0.0247 |
| −0.3928 | −0.2839 | −0.0245 |
| −0.3926 | −0.2628 | −0.0243 |
| −0.3924 | −0.2417 | −0.0241 |
| −0.3922 | −0.2206 | −0.0240 |
| −0.3919 | −0.1995 | −0.0239 |
| −0.3917 | −0.1784 | −0.0239 |
| −0.3915 | −0.1573 | −0.0239 |
| −0.3913 | −0.1362 | −0.0239 |
| −0.3910 | −0.1151 | −0.0240 |
| −0.3908 | −0.0940 | −0.0241 |
| −0.3906 | −0.0730 | −0.0243 |
| −0.3904 | −0.0519 | −0.0245 |
| −0.3901 | −0.0308 | −0.0247 |
| −0.3899 | −0.0097 | −0.0250 |
| −0.3897 | 0.0114 | −0.0253 |
| −0.3895 | 0.0325 | −0.0257 |
| −0.3892 | 0.0536 | −0.0261 |
| −0.3890 | 0.0746 | −0.0265 |
| −0.3888 | 0.0957 | −0.0270 |
| −0.3886 | 0.1168 | −0.0275 |
| −0.3883 | 0.1379 | −0.0281 |
| −0.3881 | 0.1589 | −0.0287 |
| −0.3879 | 0.1800 | −0.0293 |
| −0.3877 | 0.2011 | −0.0300 |
| −0.3874 | 0.2221 | −0.0307 |
| −0.3872 | 0.2432 | −0.0315 |
| −0.3870 | 0.2642 | −0.0323 |
| −0.3868 | 0.2853 | −0.0331 |
| −0.3866 | 0.3063 | −0.0340 |
| −0.3863 | 0.3274 | −0.0349 |
| −0.3861 | 0.3484 | −0.0359 |
| −0.3859 | 0.3694 | −0.0369 |
| −0.3857 | 0.3905 | −0.0379 |
| −0.3854 | 0.4115 | −0.0390 |
| −0.3852 | 0.4325 | −0.0401 |
| −0.3850 | 0.4535 | −0.0413 |
| −0.3848 | 0.4745 | −0.0425 |
| −0.3845 | 0.4955 | −0.0437 |
| −0.3843 | 0.5165 | −0.0450 |
| −0.3841 | 0.5375 | −0.0463 |
| −0.3839 | 0.5584 | −0.0476 |
| −0.3674 | −0.3895 | −0.0261 |
| −0.3672 | −0.3684 | −0.0257 |
| −0.3670 | −0.3473 | −0.0253 |
| −0.3668 | −0.3262 | −0.0250 |
| −0.3665 | −0.3051 | −0.0247 |
| −0.3663 | −0.2840 | −0.0245 |
| −0.3661 | −0.2629 | −0.0243 |
| −0.3659 | −0.2419 | −0.0241 |
| −0.3656 | −0.2208 | −0.0240 |
| −0.3654 | −0.1997 | −0.0239 |
| −0.3652 | −0.1786 | −0.0239 |
| −0.3650 | −0.1575 | −0.0239 |
| −0.3647 | −0.1364 | −0.0239 |
| −0.3645 | −0.1153 | −0.0240 |
| −0.3643 | −0.0942 | −0.0241 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.3641 | −0.0731 | −0.0243 |
| −0.3638 | −0.0520 | −0.0245 |
| −0.3636 | −0.0309 | −0.0247 |
| −0.3634 | −0.0099 | −0.0250 |
| −0.3632 | 0.0112 | −0.0253 |
| −0.3629 | 0.0323 | −0.0257 |
| −0.3627 | 0.0534 | −0.0261 |
| −0.3625 | 0.0745 | −0.0265 |
| −0.3623 | 0.0956 | −0.0270 |
| −0.3621 | 0.1166 | −0.0275 |
| −0.3618 | 0.1377 | −0.0281 |
| −0.3616 | 0.1588 | −0.0287 |
| −0.3614 | 0.1798 | −0.0293 |
| −0.3612 | 0.2009 | −0.0300 |
| −0.3609 | 0.2220 | −0.0307 |
| −0.3607 | 0.2430 | −0.0315 |
| −0.3605 | 0.2641 | −0.0323 |
| −0.3603 | 0.2851 | −0.0331 |
| −0.3600 | 0.3062 | −0.0340 |
| −0.3598 | 0.3272 | −0.0349 |
| −0.3596 | 0.3482 | −0.0359 |
| −0.3594 | 0.3693 | −0.0369 |
| −0.3591 | 0.3903 | −0.0379 |
| −0.3589 | 0.4113 | −0.0390 |
| −0.3587 | 0.4323 | −0.0401 |
| −0.3585 | 0.4533 | −0.0413 |
| −0.3582 | 0.4743 | −0.0425 |
| −0.3580 | 0.4953 | −0.0437 |
| −0.3578 | 0.5163 | −0.0450 |
| −0.3576 | 0.5373 | −0.0463 |
| −0.3409 | −0.3896 | −0.0261 |
| −0.3407 | −0.3685 | −0.0257 |
| −0.3405 | −0.3475 | −0.0253 |
| −0.3402 | −0.3264 | −0.0250 |
| −0.3400 | −0.3053 | −0.0247 |
| −0.3398 | −0.2842 | −0.0245 |
| −0.3396 | −0.2631 | −0.0243 |
| −0.3393 | −0.2420 | −0.0241 |
| −0.3391 | −0.2209 | −0.0240 |
| −0.3389 | −0.1998 | −0.0239 |
| −0.3387 | −0.1787 | −0.0239 |
| −0.3384 | −0.1577 | −0.0239 |
| −0.3382 | −0.1366 | −0.0239 |
| −0.3380 | −0.1155 | −0.0240 |
| −0.3378 | −0.0944 | −0.0241 |
| −0.3375 | −0.0733 | −0.0243 |
| −0.3373 | −0.0522 | −0.0245 |
| −0.3371 | −0.0311 | −0.0247 |
| −0.3369 | −0.0100 | −0.0250 |
| −0.3367 | 0.0111 | −0.0253 |
| −0.3364 | 0.0321 | −0.0257 |
| −0.3362 | 0.0532 | −0.0261 |
| −0.3360 | 0.0743 | −0.0265 |
| −0.3358 | 0.0954 | −0.0270 |
| −0.3355 | 0.1165 | −0.0275 |
| −0.3353 | 0.1375 | −0.0281 |
| −0.3351 | 0.1586 | −0.0287 |
| −0.3349 | 0.1797 | −0.0293 |
| −0.3346 | 0.2007 | −0.0300 |
| −0.3344 | 0.2218 | −0.0307 |
| −0.3342 | 0.2428 | −0.0315 |
| −0.3340 | 0.2639 | −0.0323 |
| −0.3337 | 0.2849 | −0.0331 |
| −0.3335 | 0.3060 | −0.0340 |
| −0.3333 | 0.3270 | −0.0349 |
| −0.3331 | 0.3481 | −0.0359 |
| −0.3328 | 0.3691 | −0.0369 |
| −0.3326 | 0.3901 | −0.0379 |
| −0.3324 | 0.4111 | −0.0390 |
| −0.3322 | 0.4322 | −0.0401 |
| −0.3320 | 0.4532 | −0.0413 |
| −0.3317 | 0.4742 | −0.0425 |
| −0.3315 | 0.4952 | −0.0437 |
| −0.3313 | 0.5161 | −0.0450 |
| −0.3311 | 0.5371 | −0.0463 |
| −0.3146 | −0.4109 | −0.0265 |
| −0.3144 | −0.3898 | −0.0261 |
| −0.3142 | −0.3687 | −0.0257 |
| −0.3139 | −0.3476 | −0.0253 |
| −0.3137 | −0.3265 | −0.0250 |
| −0.3135 | −0.3055 | −0.0247 |
| −0.3133 | −0.2844 | −0.0245 |
| −0.3130 | −0.2633 | −0.0243 |
| −0.3128 | −0.2422 | −0.0241 |
| −0.3126 | −0.2211 | −0.0240 |
| −0.3124 | −0.2000 | −0.0239 |
| −0.3122 | −0.1789 | −0.0239 |
| −0.3119 | −0.1578 | −0.0239 |
| −0.3117 | −0.1367 | −0.0239 |
| −0.3115 | −0.1156 | −0.0240 |
| −0.3113 | −0.0945 | −0.0241 |
| −0.3110 | −0.0735 | −0.0243 |
| −0.3108 | −0.0524 | −0.0245 |
| −0.3106 | −0.0313 | −0.0247 |
| −0.3104 | −0.0102 | −0.0250 |
| −0.3101 | 0.0109 | −0.0253 |
| −0.3099 | 0.0320 | −0.0257 |
| −0.3097 | 0.0531 | −0.0261 |
| −0.3095 | 0.0741 | −0.0265 |
| −0.3092 | 0.0952 | −0.0270 |
| −0.3090 | 0.1163 | −0.0275 |
| −0.3088 | 0.1374 | −0.0281 |
| −0.3086 | 0.1584 | −0.0287 |
| −0.3083 | 0.1795 | −0.0293 |
| −0.3081 | 0.2006 | −0.0300 |
| −0.3079 | 0.2216 | −0.0307 |
| −0.3077 | 0.2427 | −0.0315 |
| −0.3074 | 0.2637 | −0.0323 |
| −0.3072 | 0.2848 | −0.0331 |
| −0.3070 | 0.3058 | −0.0340 |
| −0.3068 | 0.3269 | −0.0349 |
| −0.3066 | 0.3479 | −0.0359 |
| −0.3063 | 0.3689 | −0.0369 |
| −0.3061 | 0.3900 | −0.0379 |
| −0.3059 | 0.4110 | −0.0390 |
| −0.3057 | 0.4320 | −0.0401 |
| −0.3054 | 0.4530 | −0.0413 |
| −0.3052 | 0.4740 | −0.0425 |
| −0.3050 | 0.4950 | −0.0437 |
| −0.3048 | 0.5160 | −0.0450 |
| −0.2881 | −0.4110 | −0.0265 |
| −0.2879 | −0.3900 | −0.0261 |
| −0.2877 | −0.3689 | −0.0257 |
| −0.2874 | −0.3478 | −0.0253 |
| −0.2872 | −0.3267 | −0.0250 |
| −0.2870 | −0.3056 | −0.0247 |
| −0.2868 | −0.2845 | −0.0245 |
| −0.2865 | −0.2634 | −0.0243 |
| −0.2863 | −0.2424 | −0.0241 |
| −0.2861 | −0.2213 | −0.0240 |
| −0.2859 | −0.2002 | −0.0239 |
| −0.2856 | −0.1791 | −0.0239 |
| −0.2854 | −0.1580 | −0.0239 |
| −0.2852 | −0.1369 | −0.0239 |
| −0.2850 | −0.1158 | −0.0240 |
| −0.2847 | −0.0947 | −0.0241 |
| −0.2845 | −0.0736 | −0.0243 |
| −0.2843 | −0.0525 | −0.0245 |
| −0.2841 | −0.0314 | −0.0247 |
| −0.2838 | −0.0104 | −0.0250 |
| −0.2836 | 0.0107 | −0.0253 |
| −0.2834 | 0.0318 | −0.0257 |
| −0.2832 | 0.0529 | −0.0261 |
| −0.2829 | 0.0740 | −0.0265 |
| −0.2827 | 0.0950 | −0.0270 |
| −0.2825 | 0.1161 | −0.0275 |
| −0.2823 | 0.1372 | −0.0281 |
| −0.2820 | 0.1583 | −0.0287 |
| −0.2818 | 0.1793 | −0.0293 |
| −0.2816 | 0.2004 | −0.0300 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.2814 | 0.2215 | −0.0307 |
| −0.2812 | 0.2425 | −0.0315 |
| −0.2809 | 0.2636 | −0.0323 |
| −0.2807 | 0.2846 | −0.0331 |
| −0.2805 | 0.3057 | −0.0340 |
| −0.2803 | 0.3267 | −0.0349 |
| −0.2800 | 0.3477 | −0.0359 |
| −0.2798 | 0.3688 | −0.0369 |
| −0.2796 | 0.3898 | −0.0379 |
| −0.2794 | 0.4108 | −0.0390 |
| −0.2791 | 0.4318 | −0.0401 |
| −0.2789 | 0.4528 | −0.0413 |
| −0.2787 | 0.4738 | −0.0425 |
| −0.2785 | 0.4948 | −0.0437 |
| −0.2782 | 0.5158 | −0.0450 |
| −0.2618 | −0.4323 | −0.0270 |
| −0.2616 | −0.4112 | −0.0265 |
| −0.2614 | −0.3901 | −0.0261 |
| −0.2611 | −0.3691 | −0.0257 |
| −0.2609 | −0.3480 | −0.0253 |
| −0.2607 | −0.3269 | −0.0250 |
| −0.2605 | −0.3058 | −0.0247 |
| −0.2602 | −0.2847 | −0.0245 |
| −0.2600 | −0.2636 | −0.0243 |
| −0.2598 | −0.2425 | −0.0241 |
| −0.2596 | −0.2214 | −0.0240 |
| −0.2593 | −0.2003 | −0.0239 |
| −0.2591 | −0.1793 | −0.0239 |
| −0.2589 | −0.1582 | −0.0239 |
| −0.2587 | −0.1371 | −0.0239 |
| −0.2584 | −0.1160 | −0.0240 |
| −0.2582 | −0.0949 | −0.0241 |
| −0.2580 | −0.0738 | −0.0243 |
| −0.2578 | −0.0527 | −0.0245 |
| −0.2575 | −0.0316 | −0.0247 |
| −0.2573 | −0.0105 | −0.0250 |
| −0.2571 | 0.0106 | −0.0253 |
| −0.2569 | 0.0316 | −0.0257 |
| −0.2567 | 0.0527 | −0.0261 |
| −0.2564 | 0.0738 | −0.0265 |
| −0.2562 | 0.0949 | −0.0270 |
| −0.2560 | 0.1160 | −0.0275 |
| −0.2558 | 0.1370 | −0.0281 |
| −0.2555 | 0.1581 | −0.0287 |
| −0.2553 | 0.1792 | −0.0293 |
| −0.2551 | 0.2002 | −0.0300 |
| −0.2549 | 0.2213 | −0.0307 |
| −0.2546 | 0.2423 | −0.0315 |
| −0.2544 | 0.2634 | −0.0323 |
| −0.2542 | 0.2844 | −0.0331 |
| −0.2540 | 0.3055 | −0.0340 |
| −0.2537 | 0.3265 | −0.0349 |
| −0.2535 | 0.3476 | −0.0359 |
| −0.2533 | 0.3686 | −0.0369 |
| −0.2531 | 0.3896 | −0.0379 |
| −0.2528 | 0.4106 | −0.0390 |
| −0.2526 | 0.4316 | −0.0401 |
| −0.2524 | 0.4527 | −0.0413 |
| −0.2522 | 0.4737 | −0.0425 |
| −0.2520 | 0.4947 | −0.0437 |
| −0.2517 | 0.5156 | −0.0450 |
| −0.2353 | −0.4325 | −0.0270 |
| −0.2351 | −0.4114 | −0.0265 |
| −0.2348 | −0.3903 | −0.0261 |
| −0.2346 | −0.3692 | −0.0257 |
| −0.2344 | −0.3481 | −0.0253 |
| −0.2342 | −0.3270 | −0.0250 |
| −0.2339 | −0.3060 | −0.0247 |
| −0.2337 | −0.2849 | −0.0245 |
| −0.2335 | −0.2638 | −0.0243 |
| −0.2333 | −0.2427 | −0.0241 |
| −0.2330 | −0.2216 | −0.0240 |
| −0.2328 | −0.2005 | −0.0239 |
| −0.2326 | −0.1794 | −0.0239 |
| −0.2324 | −0.1583 | −0.0239 |
| −0.2322 | −0.1372 | −0.0239 |
| −0.2319 | −0.1161 | −0.0240 |
| −0.2317 | −0.0951 | −0.0241 |
| −0.2315 | −0.0740 | −0.0243 |
| −0.2313 | −0.0529 | −0.0245 |
| −0.2310 | −0.0318 | −0.0247 |
| −0.2308 | −0.0107 | −0.0250 |
| −0.2306 | 0.0104 | −0.0253 |
| −0.2304 | 0.0315 | −0.0257 |
| −0.2301 | 0.0526 | −0.0261 |
| −0.2299 | 0.0736 | −0.0265 |
| −0.2297 | 0.0947 | −0.0270 |
| −0.2295 | 0.1158 | −0.0275 |
| −0.2292 | 0.1369 | −0.0281 |
| −0.2290 | 0.1579 | −0.0287 |
| −0.2288 | 0.1790 | −0.0293 |
| −0.2286 | 0.2001 | −0.0300 |
| −0.2283 | 0.2211 | −0.0307 |
| −0.2281 | 0.2422 | −0.0315 |
| −0.2279 | 0.2632 | −0.0323 |
| −0.2277 | 0.2843 | −0.0331 |
| −0.2274 | 0.3053 | −0.0340 |
| −0.2272 | 0.3264 | −0.0349 |
| −0.2270 | 0.3474 | −0.0359 |
| −0.2268 | 0.3684 | −0.0369 |
| −0.2266 | 0.3894 | −0.0379 |
| −0.2263 | 0.4105 | −0.0390 |
| −0.2261 | 0.4315 | −0.0401 |
| −0.2259 | 0.4525 | −0.0413 |
| −0.2257 | 0.4735 | −0.0425 |
| −0.2254 | 0.4945 | −0.0437 |
| −0.2088 | −0.4367 | −0.0271 |
| −0.2088 | −0.4326 | −0.0270 |
| −0.2086 | −0.4156 | −0.0266 |
| −0.2085 | −0.4115 | −0.0265 |
| −0.2084 | −0.3945 | −0.0261 |
| −0.2083 | −0.3905 | −0.0261 |
| −0.2081 | −0.3734 | −0.0257 |
| −0.2081 | −0.3694 | −0.0257 |
| −0.2079 | −0.3523 | −0.0254 |
| −0.2079 | −0.3483 | −0.0253 |
| −0.2077 | −0.3312 | −0.0250 |
| −0.2076 | −0.3272 | −0.0250 |
| −0.2075 | −0.3101 | −0.0248 |
| −0.2074 | −0.3061 | −0.0247 |
| −0.2072 | −0.2890 | −0.0245 |
| −0.2072 | −0.2850 | −0.0245 |
| −0.2070 | −0.2679 | −0.0243 |
| −0.2070 | −0.2640 | −0.0243 |
| −0.2068 | −0.2468 | −0.0241 |
| −0.2068 | −0.2429 | −0.0241 |
| −0.2066 | −0.2257 | −0.0240 |
| −0.2065 | −0.2218 | −0.0240 |
| −0.2063 | −0.2046 | −0.0239 |
| −0.2063 | −0.2007 | −0.0239 |
| −0.2061 | −0.1834 | −0.0239 |
| −0.2061 | −0.1796 | −0.0239 |
| −0.2059 | −0.1623 | −0.0239 |
| −0.2059 | −0.1585 | −0.0239 |
| −0.2057 | −0.1412 | −0.0239 |
| −0.2056 | −0.1374 | −0.0239 |
| −0.2054 | −0.1201 | −0.0240 |
| −0.2054 | −0.1163 | −0.0240 |
| −0.2052 | −0.0990 | −0.0241 |
| −0.2052 | −0.0952 | −0.0241 |
| −0.2050 | −0.0779 | −0.0242 |
| −0.2050 | −0.0741 | −0.0243 |
| −0.2048 | −0.0568 | −0.0244 |
| −0.2047 | −0.0530 | −0.0245 |
| −0.2046 | −0.0357 | −0.0247 |
| −0.2045 | −0.0320 | −0.0247 |
| −0.2043 | −0.0146 | −0.0249 |
| −0.2043 | −0.0109 | −0.0250 |
| −0.2041 | 0.0065 | −0.0253 |
| −0.2041 | 0.0102 | −0.0253 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.2039 | 0.0277 | −0.0256 |
| −0.2038 | 0.0313 | −0.0257 |
| −0.2037 | 0.0488 | −0.0260 |
| −0.2036 | 0.0524 | −0.0261 |
| −0.2034 | 0.0699 | −0.0264 |
| −0.2034 | 0.0735 | −0.0265 |
| −0.2032 | 0.0910 | −0.0269 |
| −0.2032 | 0.0945 | −0.0270 |
| −0.2030 | 0.1121 | −0.0274 |
| −0.2029 | 0.1156 | −0.0275 |
| −0.2028 | 0.1331 | −0.0280 |
| −0.2027 | 0.1367 | −0.0281 |
| −0.2025 | 0.1542 | −0.0286 |
| −0.2025 | 0.1578 | −0.0287 |
| −0.2023 | 0.1753 | −0.0292 |
| −0.2023 | 0.1788 | −0.0293 |
| −0.2021 | 0.1964 | −0.0299 |
| −0.2020 | 0.1999 | −0.0300 |
| −0.2019 | 0.2175 | −0.0306 |
| −0.2018 | 0.2210 | −0.0307 |
| −0.2016 | 0.2386 | −0.0314 |
| −0.2016 | 0.2420 | −0.0315 |
| −0.2014 | 0.2596 | −0.0321 |
| −0.2014 | 0.2631 | −0.0323 |
| −0.2012 | 0.2807 | −0.0330 |
| −0.2012 | 0.2841 | −0.0331 |
| −0.2010 | 0.3018 | −0.0339 |
| −0.2009 | 0.3052 | −0.0340 |
| −0.2007 | 0.3228 | −0.0348 |
| −0.2007 | 0.3262 | −0.0349 |
| −0.2005 | 0.3439 | −0.0357 |
| −0.2005 | 0.3472 | −0.0359 |
| −0.2003 | 0.3649 | −0.0367 |
| −0.2003 | 0.3683 | −0.0369 |
| −0.2001 | 0.3860 | −0.0377 |
| −0.2000 | 0.3893 | −0.0379 |
| −0.1998 | 0.4070 | −0.0388 |
| −0.1998 | 0.4103 | −0.0390 |
| −0.1996 | 0.4281 | −0.0399 |
| −0.1996 | 0.4313 | −0.0401 |
| −0.1994 | 0.4491 | −0.0411 |
| −0.1994 | 0.4523 | −0.0413 |
| −0.1992 | 0.4701 | −0.0423 |
| −0.1991 | 0.4733 | −0.0425 |
| −0.1990 | 0.4911 | −0.0435 |
| −0.1989 | 0.4943 | −0.0437 |
| −0.1821 | −0.4377 | −0.0267 |
| −0.1819 | −0.4166 | −0.0262 |
| −0.1816 | −0.3955 | −0.0257 |
| −0.1814 | −0.3744 | −0.0253 |
| −0.1812 | −0.3533 | −0.0250 |
| −0.1810 | −0.3321 | −0.0246 |
| −0.1807 | −0.3110 | −0.0243 |
| −0.1805 | −0.2899 | −0.0241 |
| −0.1803 | −0.2688 | −0.0239 |
| −0.1801 | −0.2477 | −0.0237 |
| −0.1799 | −0.2266 | −0.0235 |
| −0.1797 | −0.2055 | −0.0234 |
| −0.1794 | −0.1844 | −0.0234 |
| −0.1792 | −0.1632 | −0.0234 |
| −0.1790 | −0.1421 | −0.0234 |
| −0.1788 | −0.1210 | −0.0235 |
| −0.1786 | −0.0999 | −0.0236 |
| −0.1783 | −0.0788 | −0.0237 |
| −0.1781 | −0.0577 | −0.0239 |
| −0.1779 | −0.0366 | −0.0241 |
| −0.1777 | −0.0155 | −0.0244 |
| −0.1774 | 0.0057 | −0.0247 |
| −0.1772 | 0.0268 | −0.0251 |
| −0.1770 | 0.0479 | −0.0255 |
| −0.1768 | 0.0690 | −0.0259 |
| −0.1765 | 0.0901 | −0.0264 |
| −0.1763 | 0.1112 | −0.0269 |
| −0.1761 | 0.1323 | −0.0275 |
| −0.1759 | 0.1534 | −0.0281 |
| −0.1756 | 0.1744 | −0.0287 |
| −0.1754 | 0.1955 | −0.0294 |
| −0.1752 | 0.2166 | −0.0301 |
| −0.1749 | 0.2377 | −0.0308 |
| −0.1747 | 0.2588 | −0.0316 |
| −0.1745 | 0.2798 | −0.0325 |
| −0.1743 | 0.3009 | −0.0334 |
| −0.1740 | 0.3220 | −0.0343 |
| −0.1738 | 0.3430 | −0.0352 |
| −0.1736 | 0.3641 | −0.0362 |
| −0.1734 | 0.3851 | −0.0373 |
| −0.1731 | 0.4062 | −0.0383 |
| −0.1729 | 0.4272 | −0.0394 |
| −0.1727 | 0.4482 | −0.0406 |
| −0.1725 | 0.4693 | −0.0418 |
| −0.1722 | 0.4903 | −0.0430 |
| −0.1557 | −0.4609 | −0.0260 |
| −0.1554 | −0.4398 | −0.0255 |
| −0.1552 | −0.4187 | −0.0250 |
| −0.1550 | −0.3976 | −0.0245 |
| −0.1547 | −0.3765 | −0.0241 |
| −0.1545 | −0.3554 | −0.0237 |
| −0.1543 | −0.3343 | −0.0234 |
| −0.1541 | −0.3131 | −0.0231 |
| −0.1539 | −0.2920 | −0.0228 |
| −0.1537 | −0.2709 | −0.0226 |
| −0.1535 | −0.2498 | −0.0223 |
| −0.1534 | −0.2287 | −0.0222 |
| −0.1532 | −0.2075 | −0.0220 |
| −0.1530 | −0.1864 | −0.0220 |
| −0.1528 | −0.1653 | −0.0219 |
| −0.1526 | −0.1442 | −0.0219 |
| −0.1524 | −0.1230 | −0.0220 |
| −0.1522 | −0.1019 | −0.0221 |
| −0.1520 | −0.0808 | −0.0222 |
| −0.1517 | −0.0597 | −0.0224 |
| −0.1515 | −0.0386 | −0.0226 |
| −0.1513 | −0.0174 | −0.0229 |
| −0.1510 | 0.0037 | −0.0232 |
| −0.1508 | 0.0248 | −0.0236 |
| −0.1506 | 0.0459 | −0.0240 |
| −0.1503 | 0.0670 | −0.0244 |
| −0.1501 | 0.0881 | −0.0249 |
| −0.1499 | 0.1092 | −0.0254 |
| −0.1496 | 0.1303 | −0.0260 |
| −0.1494 | 0.1514 | −0.0266 |
| −0.1491 | 0.1725 | −0.0272 |
| −0.1489 | 0.1936 | −0.0279 |
| −0.1487 | 0.2147 | −0.0286 |
| −0.1484 | 0.2358 | −0.0294 |
| −0.1482 | 0.2569 | −0.0302 |
| −0.1480 | 0.2779 | −0.0310 |
| −0.1477 | 0.2990 | −0.0319 |
| −0.1475 | 0.3201 | −0.0328 |
| −0.1473 | 0.3411 | −0.0338 |
| −0.1470 | 0.3622 | −0.0348 |
| −0.1468 | 0.3832 | −0.0358 |
| −0.1465 | 0.4043 | −0.0369 |
| −0.1463 | 0.4253 | −0.0380 |
| −0.1461 | 0.4464 | −0.0392 |
| −0.1458 | 0.4674 | −0.0404 |
| −0.1456 | 0.4884 | −0.0417 |
| −0.1293 | −0.4637 | −0.0240 |
| −0.1290 | −0.4426 | −0.0235 |
| −0.1288 | −0.4215 | −0.0230 |
| −0.1286 | −0.4004 | −0.0225 |
| −0.1283 | −0.3792 | −0.0221 |
| −0.1281 | −0.3581 | −0.0217 |
| −0.1279 | −0.3370 | −0.0214 |
| −0.1278 | −0.3159 | −0.0210 |
| −0.1276 | −0.2947 | −0.0207 |
| −0.1274 | −0.2736 | −0.0204 |
| −0.1273 | −0.2525 | −0.0202 |
| −0.1272 | −0.2313 | −0.0200 |
| −0.1270 | −0.2102 | −0.0198 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.1269 | −0.1891 | −0.0197 |
| −0.1267 | −0.1679 | −0.0196 |
| −0.1265 | −0.1468 | −0.0196 |
| −0.1264 | −0.1257 | −0.0196 |
| −0.1262 | −0.1045 | −0.0197 |
| −0.1259 | −0.0834 | −0.0198 |
| −0.1257 | −0.0623 | −0.0200 |
| −0.1255 | −0.0411 | −0.0202 |
| −0.1252 | −0.0200 | −0.0205 |
| −0.1250 | 0.0011 | −0.0208 |
| −0.1248 | 0.0223 | −0.0212 |
| −0.1245 | 0.0434 | −0.0216 |
| −0.1243 | 0.0645 | −0.0221 |
| −0.1240 | 0.0856 | −0.0225 |
| −0.1238 | 0.1067 | −0.0231 |
| −0.1235 | 0.1278 | −0.0237 |
| −0.1232 | 0.1490 | −0.0243 |
| −0.1230 | 0.1701 | −0.0249 |
| −0.1227 | 0.1912 | −0.0256 |
| −0.1225 | 0.2123 | −0.0263 |
| −0.1222 | 0.2334 | −0.0271 |
| −0.1220 | 0.2544 | −0.0279 |
| −0.1218 | 0.2755 | −0.0288 |
| −0.1215 | 0.2966 | −0.0296 |
| −0.1213 | 0.3177 | −0.0306 |
| −0.1210 | 0.3388 | −0.0315 |
| −0.1208 | 0.3598 | −0.0325 |
| −0.1205 | 0.3809 | −0.0336 |
| −0.1203 | 0.4019 | −0.0347 |
| −0.1200 | 0.4230 | −0.0358 |
| −0.1197 | 0.4440 | −0.0370 |
| −0.1195 | 0.4651 | −0.0382 |
| −0.1033 | −0.4666 | −0.0212 |
| −0.1030 | −0.4455 | −0.0207 |
| −0.1028 | −0.4243 | −0.0202 |
| −0.1025 | −0.4032 | −0.0198 |
| −0.1023 | −0.3821 | −0.0194 |
| −0.1021 | −0.3609 | −0.0190 |
| −0.1019 | −0.3398 | −0.0186 |
| −0.1018 | −0.3187 | −0.0182 |
| −0.1016 | −0.2975 | −0.0179 |
| −0.1015 | −0.2764 | −0.0176 |
| −0.1014 | −0.2552 | −0.0173 |
| −0.1013 | −0.2341 | −0.0171 |
| −0.1012 | −0.2129 | −0.0169 |
| −0.1011 | −0.1918 | −0.0167 |
| −0.1010 | −0.1706 | −0.0166 |
| −0.1008 | −0.1495 | −0.0165 |
| −0.1007 | −0.1283 | −0.0165 |
| −0.1005 | −0.1072 | −0.0166 |
| −0.1003 | −0.0860 | −0.0167 |
| −0.1001 | −0.0649 | −0.0169 |
| −0.0998 | −0.0437 | −0.0171 |
| −0.0996 | −0.0226 | −0.0174 |
| −0.0993 | −0.0014 | −0.0177 |
| −0.0991 | 0.0197 | −0.0181 |
| −0.0988 | 0.0409 | −0.0185 |
| −0.0986 | 0.0620 | −0.0189 |
| −0.0983 | 0.0831 | −0.0195 |
| −0.0980 | 0.1043 | −0.0200 |
| −0.0977 | 0.1254 | −0.0206 |
| −0.0975 | 0.1465 | −0.0212 |
| −0.0972 | 0.1676 | −0.0219 |
| −0.0969 | 0.1887 | −0.0226 |
| −0.0967 | 0.2098 | −0.0233 |
| −0.0964 | 0.2310 | −0.0241 |
| −0.0962 | 0.2521 | −0.0249 |
| −0.0959 | 0.2732 | −0.0257 |
| −0.0956 | 0.2943 | −0.0266 |
| −0.0954 | 0.3153 | −0.0275 |
| −0.0951 | 0.3364 | −0.0285 |
| −0.0949 | 0.3575 | −0.0295 |
| −0.0946 | 0.3786 | −0.0306 |
| −0.0943 | 0.3996 | −0.0317 |
| −0.0940 | 0.4207 | −0.0328 |
| −0.0938 | 0.4418 | −0.0340 |
| −0.0935 | 0.4628 | −0.0352 |
| −0.0777 | −0.4690 | −0.0177 |
| −0.0774 | −0.4479 | −0.0172 |
| −0.0771 | −0.4267 | −0.0167 |
| −0.0769 | −0.4056 | −0.0163 |
| −0.0767 | −0.3844 | −0.0159 |
| −0.0765 | −0.3633 | −0.0154 |
| −0.0763 | −0.3421 | −0.0151 |
| −0.0762 | −0.3210 | −0.0147 |
| −0.0761 | −0.2998 | −0.0143 |
| −0.0760 | −0.2786 | −0.0140 |
| −0.0759 | −0.2575 | −0.0137 |
| −0.0758 | −0.2363 | −0.0134 |
| −0.0758 | −0.2151 | −0.0132 |
| −0.0757 | −0.1939 | −0.0130 |
| −0.0756 | −0.1728 | −0.0129 |
| −0.0755 | −0.1516 | −0.0128 |
| −0.0753 | −0.1304 | −0.0128 |
| −0.0751 | −0.1093 | −0.0128 |
| −0.0749 | −0.0881 | −0.0129 |
| −0.0747 | −0.0669 | −0.0131 |
| −0.0745 | −0.0458 | −0.0133 |
| −0.0742 | −0.0246 | −0.0136 |
| −0.0740 | −0.0034 | −0.0139 |
| −0.0737 | 0.0177 | −0.0143 |
| −0.0734 | 0.0389 | −0.0147 |
| −0.0731 | 0.0600 | −0.0152 |
| −0.0729 | 0.0812 | −0.0157 |
| −0.0726 | 0.1023 | −0.0163 |
| −0.0723 | 0.1235 | −0.0168 |
| −0.0720 | 0.1446 | −0.0175 |
| −0.0717 | 0.1658 | −0.0181 |
| −0.0715 | 0.1869 | −0.0188 |
| −0.0712 | 0.2080 | −0.0196 |
| −0.0709 | 0.2291 | −0.0204 |
| −0.0707 | 0.2503 | −0.0212 |
| −0.0704 | 0.2714 | −0.0220 |
| −0.0701 | 0.2925 | −0.0229 |
| −0.0699 | 0.3136 | −0.0238 |
| −0.0696 | 0.3347 | −0.0248 |
| −0.0693 | 0.3558 | −0.0258 |
| −0.0690 | 0.3769 | −0.0269 |
| −0.0688 | 0.3980 | −0.0280 |
| −0.0685 | 0.4190 | −0.0291 |
| −0.0682 | 0.4401 | −0.0303 |
| −0.0679 | 0.4612 | −0.0316 |
| −0.0528 | −0.4915 | −0.0141 |
| −0.0525 | −0.4704 | −0.0135 |
| −0.0522 | −0.4492 | −0.0130 |
| −0.0520 | −0.4280 | −0.0125 |
| −0.0517 | −0.4069 | −0.0121 |
| −0.0515 | −0.3857 | −0.0116 |
| −0.0513 | −0.3645 | −0.0112 |
| −0.0511 | −0.3433 | −0.0108 |
| −0.0510 | −0.3222 | −0.0104 |
| −0.0509 | −0.3010 | −0.0101 |
| −0.0508 | −0.2798 | −0.0098 |
| −0.0508 | −0.2586 | −0.0094 |
| −0.0507 | −0.2374 | −0.0092 |
| −0.0506 | −0.2162 | −0.0089 |
| −0.0506 | −0.1950 | −0.0087 |
| −0.0505 | −0.1738 | −0.0086 |
| −0.0504 | −0.1526 | −0.0085 |
| −0.0502 | −0.1314 | −0.0085 |
| −0.0500 | −0.1102 | −0.0085 |
| −0.0498 | −0.0891 | −0.0086 |
| −0.0496 | −0.0679 | −0.0088 |
| −0.0494 | −0.0467 | −0.0090 |
| −0.0491 | −0.0255 | −0.0093 |
| −0.0489 | −0.0043 | −0.0096 |
| −0.0486 | 0.0169 | −0.0100 |
| −0.0483 | 0.0381 | −0.0104 |
| −0.0480 | 0.0592 | −0.0109 |
| −0.0478 | 0.0804 | −0.0114 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| −0.0475 | 0.1016 | −0.0120 |
| −0.0472 | 0.1227 | −0.0125 |
| −0.0469 | 0.1439 | −0.0132 |
| −0.0466 | 0.1650 | −0.0138 |
| −0.0463 | 0.1862 | −0.0145 |
| −0.0461 | 0.2074 | −0.0153 |
| −0.0458 | 0.2285 | −0.0161 |
| −0.0455 | 0.2496 | −0.0169 |
| −0.0453 | 0.2708 | −0.0177 |
| −0.0450 | 0.2919 | −0.0186 |
| −0.0447 | 0.3130 | −0.0195 |
| −0.0445 | 0.3342 | −0.0205 |
| −0.0442 | 0.3553 | −0.0215 |
| −0.0439 | 0.3764 | −0.0226 |
| −0.0436 | 0.3975 | −0.0237 |
| −0.0433 | 0.4186 | −0.0248 |
| −0.0430 | 0.4397 | −0.0260 |
| −0.0427 | 0.4608 | −0.0273 |
| −0.0282 | −0.4912 | −0.0091 |
| −0.0280 | −0.4700 | −0.0086 |
| −0.0277 | −0.4488 | −0.0080 |
| −0.0274 | −0.4276 | −0.0076 |
| −0.0272 | −0.4064 | −0.0071 |
| −0.0270 | −0.3852 | −0.0067 |
| −0.0268 | −0.3640 | −0.0063 |
| −0.0266 | −0.3428 | −0.0059 |
| −0.0265 | −0.3216 | −0.0055 |
| −0.0263 | −0.3004 | −0.0052 |
| −0.0262 | −0.2792 | −0.0049 |
| −0.0261 | −0.2580 | −0.0046 |
| −0.0261 | −0.2368 | −0.0043 |
| −0.0260 | −0.2155 | −0.0041 |
| −0.0259 | −0.1943 | −0.0040 |
| −0.0258 | −0.1731 | −0.0038 |
| −0.0256 | −0.1519 | −0.0038 |
| −0.0255 | −0.1307 | −0.0038 |
| −0.0253 | −0.1094 | −0.0038 |
| −0.0251 | −0.0882 | −0.0039 |
| −0.0249 | −0.0670 | −0.0041 |
| −0.0246 | −0.0458 | −0.0043 |
| −0.0244 | −0.0246 | −0.0046 |
| −0.0241 | −0.0034 | −0.0049 |
| −0.0239 | 0.0178 | −0.0053 |
| −0.0236 | 0.0390 | −0.0057 |
| −0.0233 | 0.0602 | −0.0062 |
| −0.0230 | 0.0814 | −0.0067 |
| −0.0228 | 0.1026 | −0.0072 |
| −0.0225 | 0.1238 | −0.0078 |
| −0.0222 | 0.1450 | −0.0084 |
| −0.0219 | 0.1662 | −0.0091 |
| −0.0217 | 0.1873 | −0.0098 |
| −0.0214 | 0.2085 | −0.0105 |
| −0.0211 | 0.2297 | −0.0113 |
| −0.0209 | 0.2509 | −0.0121 |
| −0.0206 | 0.2720 | −0.0129 |
| −0.0204 | 0.2932 | −0.0138 |
| −0.0201 | 0.3143 | −0.0147 |
| −0.0198 | 0.3355 | −0.0157 |
| −0.0196 | 0.3566 | −0.0167 |
| −0.0193 | 0.3778 | −0.0178 |
| −0.0190 | 0.3989 | −0.0189 |
| −0.0187 | 0.4200 | −0.0200 |
| −0.0184 | 0.4411 | −0.0212 |
| −0.0049 | −0.5096 | −0.0042 |
| −0.0047 | −0.4884 | −0.0036 |
| −0.0044 | −0.4672 | −0.0030 |
| −0.0042 | −0.4460 | −0.0025 |
| −0.0039 | −0.4247 | −0.0020 |
| −0.0037 | −0.4035 | −0.0015 |
| −0.0035 | −0.3823 | −0.0011 |
| −0.0033 | −0.3611 | −0.0007 |
| −0.0031 | −0.3398 | −0.0003 |
| −0.0029 | −0.3186 | 0.0000 |
| −0.0027 | −0.2974 | 0.0003 |
| −0.0025 | −0.2761 | 0.0005 |
| −0.0024 | −0.2549 | 0.0007 |
| −0.0022 | −0.2336 | 0.0009 |
| −0.0021 | −0.2124 | 0.0011 |
| −0.0019 | −0.1912 | 0.0012 |
| −0.0017 | −0.1699 | 0.0012 |
| −0.0016 | −0.1487 | 0.0013 |
| −0.0014 | −0.1274 | 0.0012 |
| −0.0012 | −0.1062 | 0.0011 |
| −0.0009 | −0.0849 | 0.0010 |
| −0.0007 | −0.0637 | 0.0008 |
| −0.0005 | −0.0425 | 0.0006 |
| −0.0002 | −0.0212 | 0.0003 |
| 0.0000 | 0.0000 | 0.0000 |
| 0.0002 | 0.0212 | −0.0004 |
| 0.0005 | 0.0425 | −0.0008 |
| 0.0007 | 0.0637 | −0.0012 |
| 0.0010 | 0.0849 | −0.0017 |
| 0.0012 | 0.1061 | −0.0022 |
| 0.0015 | 0.1273 | −0.0028 |
| 0.0017 | 0.1486 | −0.0034 |
| 0.0020 | 0.1698 | −0.0040 |
| 0.0022 | 0.1910 | −0.0047 |
| 0.0025 | 0.2122 | −0.0054 |
| 0.0027 | 0.2334 | −0.0062 |
| 0.0030 | 0.2546 | −0.0070 |
| 0.0032 | 0.2758 | −0.0078 |
| 0.0034 | 0.2970 | −0.0087 |
| 0.0037 | 0.3181 | −0.0096 |
| 0.0039 | 0.3393 | −0.0106 |
| 0.0042 | 0.3605 | −0.0116 |
| 0.0044 | 0.3817 | −0.0126 |
| 0.0047 | 0.4028 | −0.0137 |
| 0.0049 | 0.4240 | −0.0148 |
| 0.0052 | 0.4451 | −0.0160 |
| 0.0170 | −0.5107 | 0.0016 |
| 0.0171 | −0.5038 | 0.0019 |
| 0.0172 | −0.4915 | 0.0022 |
| 0.0173 | −0.4826 | 0.0025 |
| 0.0174 | −0.4724 | 0.0028 |
| 0.0175 | −0.4614 | 0.0031 |
| 0.0176 | −0.4533 | 0.0033 |
| 0.0178 | −0.4401 | 0.0036 |
| 0.0178 | −0.4341 | 0.0038 |
| 0.0180 | −0.4189 | 0.0041 |
| 0.0180 | −0.4148 | 0.0042 |
| 0.0182 | −0.3955 | 0.0046 |
| 0.0182 | −0.3976 | 0.0046 |
| 0.0184 | −0.3762 | 0.0050 |
| 0.0184 | −0.3764 | 0.0050 |
| 0.0186 | −0.3568 | 0.0053 |
| 0.0187 | −0.3551 | 0.0053 |
| 0.0188 | −0.3373 | 0.0056 |
| 0.0189 | −0.3338 | 0.0057 |
| 0.0191 | −0.3178 | 0.0058 |
| 0.0192 | −0.3126 | 0.0059 |
| 0.0193 | −0.2983 | 0.0061 |
| 0.0194 | −0.2913 | 0.0061 |
| 0.0196 | −0.2788 | 0.0062 |
| 0.0197 | −0.2701 | 0.0063 |
| 0.0198 | −0.2593 | 0.0063 |
| 0.0200 | −0.2488 | 0.0064 |
| 0.0201 | −0.2398 | 0.0064 |
| 0.0202 | −0.2275 | 0.0065 |
| 0.0203 | −0.2203 | 0.0065 |
| 0.0205 | −0.2063 | 0.0065 |
| 0.0206 | −0.2008 | 0.0065 |
| 0.0208 | −0.1850 | 0.0065 |
| 0.0208 | −0.1813 | 0.0065 |
| 0.0211 | −0.1637 | 0.0064 |
| 0.0211 | −0.1618 | 0.0064 |
| 0.0213 | −0.1423 | 0.0063 |
| 0.0213 | −0.1425 | 0.0063 |
| 0.0216 | −0.1228 | 0.0062 |
| 0.0216 | −0.1212 | 0.0062 |
| 0.0218 | −0.1034 | 0.0061 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.0219 | −0.0999 | 0.0061 |
| 0.0220 | −0.0841 | 0.0060 |
| 0.0221 | −0.0787 | 0.0059 |
| 0.0236 | 0.0698 | 0.0038 |
| 0.0236 | 0.0702 | 0.0038 |
| 0.0237 | 0.0890 | 0.0034 |
| 0.0238 | 0.0914 | 0.0034 |
| 0.0239 | 0.1082 | 0.0030 |
| 0.0240 | 0.1127 | 0.0029 |
| 0.0241 | 0.1274 | 0.0025 |
| 0.0242 | 0.1339 | 0.0023 |
| 0.0243 | 0.1467 | 0.0020 |
| 0.0244 | 0.1552 | 0.0018 |
| 0.0245 | 0.1660 | 0.0014 |
| 0.0246 | 0.1764 | 0.0011 |
| 0.0247 | 0.1853 | 0.0009 |
| 0.0248 | 0.1976 | 0.0005 |
| 0.0249 | 0.2046 | 0.0003 |
| 0.0250 | 0.2189 | −0.0002 |
| 0.0250 | 0.2238 | −0.0004 |
| 0.0252 | 0.2430 | −0.0011 |
| 0.0252 | 0.2401 | −0.0010 |
| 0.0254 | 0.2621 | −0.0018 |
| 0.0254 | 0.2613 | −0.0017 |
| 0.0256 | 0.2812 | −0.0025 |
| 0.0257 | 0.2825 | −0.0026 |
| 0.0258 | 0.3003 | −0.0033 |
| 0.0259 | 0.3038 | −0.0034 |
| 0.0260 | 0.3193 | −0.0041 |
| 0.0261 | 0.3250 | −0.0043 |
| 0.0262 | 0.3383 | −0.0049 |
| 0.0263 | 0.3462 | −0.0053 |
| 0.0264 | 0.3573 | −0.0058 |
| 0.0265 | 0.3674 | −0.0063 |
| 0.0266 | 0.3763 | −0.0067 |
| 0.0267 | 0.3886 | −0.0073 |
| 0.0267 | 0.3953 | −0.0076 |
| 0.0269 | 0.4098 | −0.0083 |
| 0.0269 | 0.4144 | −0.0086 |
| 0.0271 | 0.4310 | −0.0094 |
| 0.0271 | 0.4334 | −0.0096 |
| 0.0329 | −0.5243 | 0.0063 |
| 0.0330 | −0.5052 | 0.0070 |
| 0.0331 | −0.4860 | 0.0076 |
| 0.0333 | −0.4669 | 0.0082 |
| 0.0334 | −0.4477 | 0.0088 |
| 0.0336 | −0.4285 | 0.0093 |
| 0.0338 | −0.4093 | 0.0097 |
| 0.0340 | −0.3900 | 0.0101 |
| 0.0342 | −0.3706 | 0.0105 |
| 0.0344 | −0.3512 | 0.0108 |
| 0.0347 | −0.3317 | 0.0110 |
| 0.0350 | −0.3121 | 0.0112 |
| 0.0353 | −0.2925 | 0.0113 |
| 0.0357 | −0.2729 | 0.0113 |
| 0.0360 | −0.2533 | 0.0113 |
| 0.0364 | −0.2338 | 0.0112 |
| 0.0368 | −0.2142 | 0.0111 |
| 0.0372 | −0.1946 | 0.0110 |
| 0.0375 | −0.1751 | 0.0108 |
| 0.0379 | −0.1555 | 0.0106 |
| 0.0382 | −0.1360 | 0.0105 |
| 0.0386 | −0.1164 | 0.0103 |
| 0.0388 | −0.0970 | 0.0101 |
| 0.0407 | 0.1147 | 0.0071 |
| 0.0408 | 0.1339 | 0.0067 |
| 0.0410 | 0.1532 | 0.0062 |
| 0.0411 | 0.1725 | 0.0057 |
| 0.0413 | 0.1918 | 0.0052 |
| 0.0414 | 0.2111 | 0.0046 |
| 0.0415 | 0.2304 | 0.0040 |
| 0.0417 | 0.2496 | 0.0033 |
| 0.0419 | 0.2687 | 0.0027 |
| 0.0420 | 0.2878 | 0.0019 |
| 0.0422 | 0.3069 | 0.0012 |
| 0.0423 | 0.3259 | 0.0004 |
| 0.0425 | 0.3449 | −0.0004 |
| 0.0426 | 0.3639 | −0.0012 |
| 0.0428 | 0.3829 | −0.0021 |
| 0.0429 | 0.4020 | −0.0030 |
| 0.0430 | 0.4210 | −0.0039 |
| 0.0479 | −0.5190 | 0.0125 |
| 0.0480 | −0.4999 | 0.0133 |
| 0.0481 | −0.4808 | 0.0140 |
| 0.0482 | −0.4617 | 0.0146 |
| 0.0483 | −0.4425 | 0.0152 |
| 0.0484 | −0.4233 | 0.0158 |
| 0.0485 | −0.4040 | 0.0162 |
| 0.0487 | −0.3847 | 0.0166 |
| 0.0489 | −0.3653 | 0.0170 |
| 0.0492 | −0.3458 | 0.0172 |
| 0.0495 | −0.3262 | 0.0174 |
| 0.0499 | −0.3066 | 0.0174 |
| 0.0504 | −0.2869 | 0.0174 |
| 0.0509 | −0.2672 | 0.0172 |
| 0.0514 | −0.2476 | 0.0170 |
| 0.0520 | −0.2279 | 0.0167 |
| 0.0525 | −0.2082 | 0.0164 |
| 0.0531 | −0.1886 | 0.0161 |
| 0.0537 | −0.1689 | 0.0157 |
| 0.0542 | −0.1493 | 0.0153 |
| 0.0547 | −0.1296 | 0.0149 |
| 0.0551 | −0.1100 | 0.0146 |
| 0.0570 | 0.1405 | 0.0113 |
| 0.0571 | 0.1598 | 0.0109 |
| 0.0571 | 0.1791 | 0.0105 |
| 0.0572 | 0.1984 | 0.0100 |
| 0.0573 | 0.2177 | 0.0095 |
| 0.0574 | 0.2369 | 0.0089 |
| 0.0575 | 0.2561 | 0.0084 |
| 0.0576 | 0.2753 | 0.0077 |
| 0.0577 | 0.2944 | 0.0071 |
| 0.0578 | 0.3134 | 0.0064 |
| 0.0579 | 0.3325 | 0.0057 |
| 0.0580 | 0.3515 | 0.0049 |
| 0.0581 | 0.3705 | 0.0041 |
| 0.0581 | 0.3895 | 0.0033 |
| 0.0582 | 0.4086 | 0.0025 |
| 0.0583 | 0.4276 | 0.0016 |
| 0.0622 | −0.4566 | 0.0217 |
| 0.0622 | −0.4758 | 0.0210 |
| 0.0622 | −0.4949 | 0.0202 |
| 0.0622 | −0.4375 | 0.0224 |
| 0.0623 | −0.5139 | 0.0194 |
| 0.0623 | −0.5330 | 0.0185 |
| 0.0623 | −0.4182 | 0.0230 |
| 0.0624 | −0.3990 | 0.0235 |
| 0.0626 | −0.3796 | 0.0239 |
| 0.0628 | −0.3601 | 0.0242 |
| 0.0632 | −0.3406 | 0.0244 |
| 0.0636 | −0.3210 | 0.0245 |
| 0.0641 | −0.3013 | 0.0244 |
| 0.0647 | −0.2815 | 0.0241 |
| 0.0654 | −0.2617 | 0.0238 |
| 0.0661 | −0.2419 | 0.0233 |
| 0.0669 | −0.2221 | 0.0228 |
| 0.0677 | −0.2023 | 0.0222 |
| 0.0685 | −0.1825 | 0.0216 |
| 0.0693 | −0.1627 | 0.0209 |
| 0.0700 | −0.1430 | 0.0203 |
| 0.0707 | −0.1233 | 0.0197 |
| 0.0727 | 0.2049 | 0.0153 |
| 0.0727 | 0.2242 | 0.0148 |
| 0.0727 | 0.1856 | 0.0156 |
| 0.0727 | 0.2435 | 0.0143 |
| 0.0727 | 0.1663 | 0.0160 |
| 0.0727 | 0.2627 | 0.0138 |
| 0.0727 | 0.2818 | 0.0133 |
| 0.0727 | 0.3009 | 0.0127 |
| 0.0728 | 0.3200 | 0.0121 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.0728 | 0.3390 | 0.0114 |
| 0.0728 | 0.3581 | 0.0107 |
| 0.0728 | 0.3771 | 0.0100 |
| 0.0728 | 0.4152 | 0.0085 |
| 0.0728 | 0.3961 | 0.0093 |
| 0.0755 | -0.4326 | 0.0302 |
| 0.0756 | -0.4133 | 0.0308 |
| 0.0756 | -0.4517 | 0.0294 |
| 0.0756 | -0.3940 | 0.0314 |
| 0.0757 | -0.4708 | 0.0286 |
| 0.0758 | -0.3746 | 0.0318 |
| 0.0758 | -0.4899 | 0.0277 |
| 0.0760 | -0.5090 | 0.0268 |
| 0.0760 | -0.3552 | 0.0321 |
| 0.0761 | -0.5280 | 0.0258 |
| 0.0764 | -0.3356 | 0.0322 |
| 0.0769 | -0.3158 | 0.0321 |
| 0.0776 | -0.2960 | 0.0319 |
| 0.0784 | -0.2762 | 0.0314 |
| 0.0793 | -0.2562 | 0.0308 |
| 0.0803 | -0.2363 | 0.0301 |
| 0.0813 | -0.2163 | 0.0292 |
| 0.0824 | -0.1964 | 0.0283 |
| 0.0835 | -0.1765 | 0.0274 |
| 0.0845 | -0.1565 | 0.0264 |
| 0.0855 | -0.1367 | 0.0255 |
| 0.0869 | 0.4218 | 0.0151 |
| 0.0870 | 0.4027 | 0.0157 |
| 0.0871 | 0.3837 | 0.0163 |
| 0.0871 | 0.3647 | 0.0170 |
| 0.0872 | 0.3456 | 0.0175 |
| 0.0873 | 0.3266 | 0.0181 |
| 0.0873 | 0.3075 | 0.0186 |
| 0.0874 | 0.2884 | 0.0191 |
| 0.0874 | 0.2693 | 0.0196 |
| 0.0875 | 0.2501 | 0.0200 |
| 0.0876 | 0.2308 | 0.0204 |
| 0.0877 | 0.2115 | 0.0208 |
| 0.0878 | 0.1922 | 0.0211 |
| 0.0879 | 0.1729 | 0.0213 |
| 0.0883 | -0.4086 | 0.0391 |
| 0.0884 | -0.3893 | 0.0397 |
| 0.0884 | -0.4278 | 0.0384 |
| 0.0885 | -0.3698 | 0.0401 |
| 0.0885 | -0.4470 | 0.0375 |
| 0.0887 | -0.4661 | 0.0366 |
| 0.0888 | -0.3503 | 0.0403 |
| 0.0890 | -0.4851 | 0.0356 |
| 0.0892 | -0.3306 | 0.0404 |
| 0.0892 | -0.5042 | 0.0345 |
| 0.0895 | -0.5232 | 0.0334 |
| 0.0898 | -0.5422 | 0.0323 |
| 0.0898 | -0.3109 | 0.0402 |
| 0.0906 | -0.2910 | 0.0398 |
| 0.0916 | -0.2710 | 0.0391 |
| 0.0928 | -0.2509 | 0.0382 |
| 0.0940 | -0.2308 | 0.0372 |
| 0.0954 | -0.2107 | 0.0360 |
| 0.0968 | -0.1906 | 0.0347 |
| 0.0981 | -0.1706 | 0.0334 |
| 0.0995 | -0.1506 | 0.0322 |
| 0.1007 | -0.1306 | 0.0309 |
| 0.1008 | 0.4092 | 0.0225 |
| 0.1009 | 0.3902 | 0.0230 |
| 0.1010 | -0.3847 | 0.0481 |
| 0.1010 | -0.4040 | 0.0475 |
| 0.1011 | 0.3712 | 0.0235 |
| 0.1011 | -0.3652 | 0.0486 |
| 0.1011 | -0.4233 | 0.0467 |
| 0.1013 | 0.3521 | 0.0240 |
| 0.1014 | -0.4425 | 0.0458 |
| 0.1014 | -0.3457 | 0.0488 |
| 0.1014 | 0.3331 | 0.0244 |
| 0.1016 | 0.3140 | 0.0249 |
| 0.1017 | -0.4616 | 0.0448 |
| 0.1017 | 0.2949 | 0.0253 |
| 0.1019 | -0.3260 | 0.0488 |
| 0.1019 | 0.2757 | 0.0257 |
| 0.1020 | -0.4806 | 0.0437 |
| 0.1021 | 0.2565 | 0.0260 |
| 0.1022 | 0.2373 | 0.0263 |
| 0.1024 | -0.4996 | 0.0425 |
| 0.1024 | 0.2180 | 0.0265 |
| 0.1026 | -0.3061 | 0.0485 |
| 0.1026 | 0.1987 | 0.0267 |
| 0.1027 | -0.5186 | 0.0412 |
| 0.1031 | -0.5376 | 0.0400 |
| 0.1035 | -0.2861 | 0.0480 |
| 0.1046 | -0.2660 | 0.0471 |
| 0.1060 | -0.2459 | 0.0460 |
| 0.1074 | -0.2257 | 0.0447 |
| 0.1090 | -0.2055 | 0.0432 |
| 0.1106 | -0.1853 | 0.0417 |
| 0.1122 | -0.1651 | 0.0401 |
| 0.1138 | -0.1450 | 0.0386 |
| 0.1138 | -0.3802 | 0.0564 |
| 0.1139 | -0.3996 | 0.0557 |
| 0.1139 | -0.3607 | 0.0568 |
| 0.1140 | -0.4188 | 0.0549 |
| 0.1141 | -0.3411 | 0.0571 |
| 0.1143 | -0.4380 | 0.0539 |
| 0.1143 | 0.4155 | 0.0295 |
| 0.1146 | -0.3214 | 0.0571 |
| 0.1146 | 0.3964 | 0.0299 |
| 0.1146 | -0.4571 | 0.0528 |
| 0.1149 | 0.3774 | 0.0303 |
| 0.1150 | -0.4762 | 0.0516 |
| 0.1151 | 0.3583 | 0.0307 |
| 0.1153 | -0.3015 | 0.0568 |
| 0.1154 | 0.3393 | 0.0311 |
| 0.1155 | -0.4952 | 0.0504 |
| 0.1156 | 0.3202 | 0.0314 |
| 0.1159 | 0.3011 | 0.0317 |
| 0.1159 | -0.5143 | 0.0491 |
| 0.1162 | 0.2819 | 0.0320 |
| 0.1162 | -0.2815 | 0.0562 |
| 0.1163 | -0.5333 | 0.0478 |
| 0.1164 | 0.2627 | 0.0322 |
| 0.1167 | -0.5523 | 0.0465 |
| 0.1167 | 0.2434 | 0.0323 |
| 0.1171 | 0.2242 | 0.0324 |
| 0.1173 | -0.2614 | 0.0554 |
| 0.1174 | 0.2049 | 0.0324 |
| 0.1187 | -0.2412 | 0.0542 |
| 0.1202 | -0.2210 | 0.0528 |
| 0.1218 | -0.2007 | 0.0513 |
| 0.1235 | -0.1805 | 0.0497 |
| 0.1251 | -0.1603 | 0.0481 |
| 0.1267 | -0.1402 | 0.0465 |
| 0.1268 | -0.3758 | 0.0642 |
| 0.1268 | -0.3563 | 0.0647 |
| 0.1269 | -0.3952 | 0.0635 |
| 0.1270 | -0.3367 | 0.0650 |
| 0.1271 | -0.4145 | 0.0626 |
| 0.1274 | -0.3170 | 0.0651 |
| 0.1274 | -0.4337 | 0.0616 |
| 0.1277 | -0.4529 | 0.0605 |
| 0.1279 | -0.2971 | 0.0649 |
| 0.1279 | 0.4025 | 0.0371 |
| 0.1281 | -0.4720 | 0.0593 |
| 0.1283 | 0.3834 | 0.0375 |
| 0.1286 | -0.4911 | 0.0581 |
| 0.1286 | 0.3643 | 0.0378 |
| 0.1287 | -0.2771 | 0.0645 |
| 0.1289 | 0.3452 | 0.0381 |
| 0.1290 | -0.5101 | 0.0568 |
| 0.1293 | 0.3261 | 0.0383 |
| 0.1294 | -0.5292 | 0.0555 |
| 0.1296 | 0.3070 | 0.0385 |
| 0.1298 | -0.5482 | 0.0543 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.1298 | −0.2570 | 0.0637 |
| 0.1300 | 0.2878 | 0.0386 |
| 0.1305 | 0.2686 | 0.0386 |
| 0.1310 | 0.2493 | 0.0385 |
| 0.1310 | −0.2368 | 0.0627 |
| 0.1315 | 0.2301 | 0.0384 |
| 0.1322 | 0.2108 | 0.0381 |
| 0.1324 | −0.2166 | 0.0615 |
| 0.1338 | −0.1964 | 0.0601 |
| 0.1353 | −0.1762 | 0.0587 |
| 0.1368 | −0.1561 | 0.0572 |
| 0.1399 | −0.3519 | 0.0722 |
| 0.1399 | −0.3714 | 0.0716 |
| 0.1400 | −0.3323 | 0.0726 |
| 0.1400 | −0.3908 | 0.0708 |
| 0.1402 | −0.3126 | 0.0728 |
| 0.1403 | −0.4101 | 0.0700 |
| 0.1406 | −0.4294 | 0.0690 |
| 0.1407 | −0.2927 | 0.0728 |
| 0.1409 | −0.4486 | 0.0679 |
| 0.1410 | 0.4082 | 0.0444 |
| 0.1413 | −0.2728 | 0.0725 |
| 0.1413 | −0.4677 | 0.0667 |
| 0.1414 | 0.3891 | 0.0448 |
| 0.1417 | −0.4868 | 0.0655 |
| 0.1417 | 0.3700 | 0.0451 |
| 0.1421 | −0.5060 | 0.0643 |
| 0.1421 | 0.3508 | 0.0453 |
| 0.1421 | −0.2527 | 0.0720 |
| 0.1425 | −0.5251 | 0.0631 |
| 0.1425 | 0.3317 | 0.0454 |
| 0.1428 | −0.5442 | 0.0618 |
| 0.1430 | 0.3126 | 0.0455 |
| 0.1431 | −0.5633 | 0.0606 |
| 0.1431 | −0.2326 | 0.0712 |
| 0.1436 | 0.2934 | 0.0454 |
| 0.1442 | −0.2124 | 0.0702 |
| 0.1442 | 0.2742 | 0.0452 |
| 0.1450 | 0.2550 | 0.0448 |
| 0.1454 | −0.1923 | 0.0692 |
| 0.1459 | 0.2358 | 0.0443 |
| 0.1467 | −0.1721 | 0.0680 |
| 0.1479 | −0.1520 | 0.0668 |
| 0.1532 | −0.3471 | 0.0792 |
| 0.1533 | −0.3275 | 0.0798 |
| 0.1533 | −0.3666 | 0.0786 |
| 0.1534 | −0.3078 | 0.0801 |
| 0.1535 | −0.3860 | 0.0778 |
| 0.1536 | −0.2880 | 0.0803 |
| 0.1538 | −0.4053 | 0.0769 |
| 0.1540 | −0.4246 | 0.0759 |
| 0.1540 | −0.2680 | 0.0802 |
| 0.1543 | 0.3948 | 0.0520 |
| 0.1544 | −0.4438 | 0.0749 |
| 0.1546 | −0.2480 | 0.0800 |
| 0.1547 | −0.4630 | 0.0738 |
| 0.1547 | 0.3756 | 0.0523 |
| 0.1551 | −0.4821 | 0.0727 |
| 0.1552 | 0.3565 | 0.0525 |
| 0.1553 | −0.2280 | 0.0796 |
| 0.1554 | −0.5013 | 0.0715 |
| 0.1557 | 0.3374 | 0.0525 |
| 0.1557 | −0.5204 | 0.0704 |
| 0.1560 | −0.5396 | 0.0692 |
| 0.1561 | −0.2079 | 0.0790 |
| 0.1562 | −0.5587 | 0.0680 |
| 0.1563 | 0.3183 | 0.0524 |
| 0.1570 | −0.1878 | 0.0783 |
| 0.1570 | 0.2991 | 0.0522 |
| 0.1579 | −0.1677 | 0.0775 |
| 0.1579 | 0.2800 | 0.0517 |
| 0.1588 | −0.1476 | 0.0767 |
| 0.1589 | 0.2609 | 0.0510 |
| 0.1602 | 0.2418 | 0.0501 |
| 0.1671 | −0.3023 | 0.0870 |
| 0.1671 | −0.3220 | 0.0865 |
| 0.1671 | −0.2826 | 0.0874 |
| 0.1672 | −0.3416 | 0.0859 |
| 0.1673 | −0.2627 | 0.0876 |
| 0.1673 | −0.3611 | 0.0852 |
| 0.1674 | 0.4010 | 0.0590 |
| 0.1675 | −0.3805 | 0.0844 |
| 0.1676 | −0.2428 | 0.0877 |
| 0.1678 | −0.3999 | 0.0835 |
| 0.1678 | 0.3818 | 0.0593 |
| 0.1679 | −0.2229 | 0.0876 |
| 0.1680 | −0.4192 | 0.0826 |
| 0.1683 | 0.3627 | 0.0595 |
| 0.1683 | −0.4384 | 0.0816 |
| 0.1684 | −0.2029 | 0.0875 |
| 0.1686 | −0.4577 | 0.0805 |
| 0.1689 | −0.1829 | 0.0872 |
| 0.1689 | 0.3436 | 0.0594 |
| 0.1689 | −0.4769 | 0.0795 |
| 0.1692 | −0.4961 | 0.0784 |
| 0.1694 | −0.1629 | 0.0868 |
| 0.1694 | −0.5153 | 0.0773 |
| 0.1696 | −0.5345 | 0.0763 |
| 0.1696 | 0.3245 | 0.0592 |
| 0.1698 | −0.5537 | 0.0752 |
| 0.1699 | −0.1430 | 0.0864 |
| 0.1701 | −0.5729 | 0.0740 |
| 0.1705 | 0.3054 | 0.0587 |
| 0.1717 | 0.2863 | 0.0580 |
| 0.1730 | 0.2673 | 0.0570 |
| 0.1746 | 0.2483 | 0.0556 |
| 0.1812 | −0.2374 | 0.0949 |
| 0.1812 | −0.2572 | 0.0945 |
| 0.1812 | −0.2176 | 0.0952 |
| 0.1813 | −0.2770 | 0.0941 |
| 0.1813 | −0.1977 | 0.0955 |
| 0.1814 | 0.3883 | 0.0660 |
| 0.1814 | −0.2967 | 0.0935 |
| 0.1814 | −0.1779 | 0.0956 |
| 0.1816 | −0.1580 | 0.0957 |
| 0.1816 | −0.3164 | 0.0929 |
| 0.1817 | −0.1381 | 0.0957 |
| 0.1817 | −0.3360 | 0.0921 |
| 0.1819 | 0.3691 | 0.0661 |
| 0.1820 | −0.3555 | 0.0914 |
| 0.1822 | −0.3749 | 0.0905 |
| 0.1824 | −0.3943 | 0.0897 |
| 0.1826 | 0.3500 | 0.0660 |
| 0.1827 | −0.4137 | 0.0888 |
| 0.1829 | −0.4330 | 0.0878 |
| 0.1831 | −0.4523 | 0.0869 |
| 0.1834 | −0.4716 | 0.0859 |
| 0.1834 | 0.3309 | 0.0657 |
| 0.1836 | −0.4909 | 0.0849 |
| 0.1837 | −0.5102 | 0.0839 |
| 0.1839 | −0.5295 | 0.0829 |
| 0.1840 | −0.5487 | 0.0819 |
| 0.1842 | −0.5679 | 0.0808 |
| 0.1845 | 0.3118 | 0.0650 |
| 0.1858 | 0.2927 | 0.0640 |
| 0.1875 | 0.2737 | 0.0627 |
| 0.1895 | 0.2547 | 0.0609 |
| 0.1950 | −0.1528 | 0.1037 |
| 0.1952 | −0.1726 | 0.1032 |
| 0.1954 | −0.1924 | 0.1027 |
| 0.1956 | 0.3947 | 0.0723 |
| 0.1957 | −0.2122 | 0.1021 |
| 0.1959 | −0.2319 | 0.1015 |
| 0.1961 | 0.3755 | 0.0724 |
| 0.1962 | −0.2517 | 0.1008 |
| 0.1965 | −0.2714 | 0.1001 |
| 0.1967 | −0.2911 | 0.0994 |
| 0.1969 | 0.3563 | 0.0722 |
| 0.1970 | −0.3108 | 0.0987 |
| 0.1973 | −0.3304 | 0.0979 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.1975 | −0.3499 | 0.0971 |
| 0.1977 | −0.3694 | 0.0962 |
| 0.1979 | 0.3372 | 0.0717 |
| 0.1980 | −0.3888 | 0.0954 |
| 0.1982 | −0.4082 | 0.0945 |
| 0.1984 | −0.4276 | 0.0936 |
| 0.1986 | −0.4469 | 0.0927 |
| 0.1987 | −0.4663 | 0.0918 |
| 0.1989 | −0.4856 | 0.0909 |
| 0.1990 | −0.5050 | 0.0900 |
| 0.1991 | 0.3180 | 0.0709 |
| 0.1991 | −0.5243 | 0.0890 |
| 0.1993 | −0.5436 | 0.0880 |
| 0.1995 | −0.5629 | 0.0869 |
| 0.1997 | −0.5820 | 0.0857 |
| 0.2007 | 0.2990 | 0.0696 |
| 0.2026 | 0.2799 | 0.0680 |
| 0.2049 | 0.2610 | 0.0658 |
| 0.2101 | −0.1473 | 0.1106 |
| 0.2105 | −0.1671 | 0.1098 |
| 0.2110 | −0.1868 | 0.1090 |
| 0.2115 | 0.3818 | 0.0779 |
| 0.2115 | −0.2065 | 0.1082 |
| 0.2120 | −0.2262 | 0.1073 |
| 0.2123 | 0.3626 | 0.0776 |
| 0.2124 | −0.2459 | 0.1064 |
| 0.2128 | −0.2657 | 0.1056 |
| 0.2132 | −0.2854 | 0.1047 |
| 0.2134 | 0.3435 | 0.0770 |
| 0.2135 | −0.3050 | 0.1039 |
| 0.2138 | −0.3246 | 0.1030 |
| 0.2141 | −0.3441 | 0.1022 |
| 0.2143 | −0.3636 | 0.1014 |
| 0.2146 | −0.3831 | 0.1006 |
| 0.2148 | −0.4026 | 0.0997 |
| 0.2148 | 0.3243 | 0.0760 |
| 0.2149 | −0.4220 | 0.0989 |
| 0.2151 | −0.4414 | 0.0981 |
| 0.2152 | −0.4608 | 0.0972 |
| 0.2153 | −0.4802 | 0.0963 |
| 0.2154 | −0.4995 | 0.0954 |
| 0.2155 | −0.5189 | 0.0945 |
| 0.2157 | −0.5382 | 0.0935 |
| 0.2159 | −0.5575 | 0.0924 |
| 0.2162 | −0.5767 | 0.0911 |
| 0.2166 | 0.3052 | 0.0746 |
| 0.2187 | 0.2862 | 0.0727 |
| 0.2213 | 0.2673 | 0.0702 |
| 0.2274 | −0.1611 | 0.1153 |
| 0.2280 | −0.1808 | 0.1143 |
| 0.2287 | −0.2005 | 0.1133 |
| 0.2290 | 0.3691 | 0.0823 |
| 0.2293 | −0.2202 | 0.1123 |
| 0.2299 | −0.2399 | 0.1113 |
| 0.2302 | 0.3499 | 0.0816 |
| 0.2304 | −0.2596 | 0.1103 |
| 0.2308 | −0.2793 | 0.1094 |
| 0.2312 | −0.2990 | 0.1085 |
| 0.2315 | −0.3186 | 0.1077 |
| 0.2317 | 0.3308 | 0.0804 |
| 0.2318 | −0.3382 | 0.1068 |
| 0.2320 | −0.3577 | 0.1060 |
| 0.2322 | −0.3772 | 0.1052 |
| 0.2324 | −0.3967 | 0.1044 |
| 0.2325 | −0.4161 | 0.1036 |
| 0.2326 | −0.4356 | 0.1028 |
| 0.2328 | −0.4550 | 0.1019 |
| 0.2329 | −0.4744 | 0.1011 |
| 0.2330 | −0.4938 | 0.1002 |
| 0.2331 | −0.5132 | 0.0992 |
| 0.2333 | −0.5325 | 0.0982 |
| 0.2336 | −0.5518 | 0.0970 |
| 0.2336 | 0.3117 | 0.0788 |
| 0.2339 | −0.5710 | 0.0957 |
| 0.2345 | −0.5901 | 0.0941 |
| 0.2360 | 0.2927 | 0.0767 |
| 0.2459 | −0.1548 | 0.1197 |
| 0.2466 | −0.1745 | 0.1186 |
| 0.2470 | 0.3757 | 0.0861 |
| 0.2473 | −0.1943 | 0.1175 |
| 0.2480 | −0.2140 | 0.1164 |
| 0.2482 | 0.3565 | 0.0852 |
| 0.2486 | −0.2337 | 0.1154 |
| 0.2491 | −0.2535 | 0.1144 |
| 0.2496 | −0.2732 | 0.1134 |
| 0.2499 | 0.3373 | 0.0840 |
| 0.2500 | −0.2929 | 0.1125 |
| 0.2503 | −0.3125 | 0.1117 |
| 0.2505 | −0.3322 | 0.1109 |
| 0.2508 | −0.3517 | 0.1101 |
| 0.2509 | −0.3713 | 0.1093 |
| 0.2511 | −0.3908 | 0.1085 |
| 0.2512 | −0.4103 | 0.1077 |
| 0.2513 | −0.4298 | 0.1069 |
| 0.2515 | −0.4492 | 0.1061 |
| 0.2516 | −0.4687 | 0.1052 |
| 0.2517 | −0.4881 | 0.1043 |
| 0.2519 | 0.3182 | 0.0823 |
| 0.2519 | −0.5075 | 0.1033 |
| 0.2521 | −0.5268 | 0.1022 |
| 0.2524 | −0.5461 | 0.1009 |
| 0.2529 | −0.5653 | 0.0995 |
| 0.2535 | −0.5844 | 0.0979 |
| 0.2543 | 0.2991 | 0.0800 |
| 0.2543 | −0.6035 | 0.0960 |
| 0.2665 | −0.1685 | 0.1221 |
| 0.2672 | −0.1883 | 0.1210 |
| 0.2675 | 0.3628 | 0.0882 |
| 0.2679 | −0.2081 | 0.1198 |
| 0.2685 | −0.2279 | 0.1188 |
| 0.2690 | −0.2477 | 0.1178 |
| 0.2691 | 0.3436 | 0.0868 |
| 0.2694 | −0.2675 | 0.1168 |
| 0.2698 | −0.2872 | 0.1160 |
| 0.2701 | −0.3069 | 0.1151 |
| 0.2703 | −0.3266 | 0.1143 |
| 0.2705 | −0.3462 | 0.1136 |
| 0.2707 | −0.3658 | 0.1128 |
| 0.2708 | −0.3853 | 0.1120 |
| 0.2709 | −0.4048 | 0.1113 |
| 0.2711 | −0.4244 | 0.1104 |
| 0.2711 | 0.3243 | 0.0851 |
| 0.2712 | −0.4438 | 0.1096 |
| 0.2714 | −0.4633 | 0.1087 |
| 0.2715 | −0.4827 | 0.1077 |
| 0.2718 | −0.5021 | 0.1066 |
| 0.2720 | −0.5215 | 0.1054 |
| 0.2724 | −0.5408 | 0.1041 |
| 0.2730 | −0.5600 | 0.1026 |
| 0.2735 | 0.3051 | 0.0828 |
| 0.2736 | −0.5792 | 0.1008 |
| 0.2745 | −0.5983 | 0.0988 |
| 0.2877 | 0.3685 | 0.0904 |
| 0.2884 | −0.1830 | 0.1236 |
| 0.2890 | −0.2029 | 0.1225 |
| 0.2893 | 0.3491 | 0.0891 |
| 0.2895 | −0.2228 | 0.1215 |
| 0.2900 | −0.2426 | 0.1205 |
| 0.2904 | −0.2625 | 0.1196 |
| 0.2907 | −0.2823 | 0.1188 |
| 0.2909 | −0.3020 | 0.1180 |
| 0.2911 | −0.3217 | 0.1172 |
| 0.2913 | −0.3414 | 0.1165 |
| 0.2913 | 0.3297 | 0.0873 |
| 0.2914 | −0.3610 | 0.1157 |
| 0.2916 | −0.3806 | 0.1150 |
| 0.2917 | −0.4001 | 0.1142 |
| 0.2918 | −0.4196 | 0.1133 |
| 0.2920 | −0.4392 | 0.1124 |
| 0.2922 | −0.4586 | 0.1115 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.2924 | −0.4781 | 0.1104 |
| 0.2927 | −0.4975 | 0.1093 |
| 0.2930 | −0.5169 | 0.1080 |
| 0.2935 | −0.5362 | 0.1066 |
| 0.2936 | 0.3103 | 0.0850 |
| 0.2941 | −0.5555 | 0.1049 |
| 0.2948 | −0.5747 | 0.1031 |
| 0.2957 | −0.5938 | 0.1010 |
| 0.2968 | −0.6129 | 0.0986 |
| 0.3104 | 0.3537 | 0.0907 |
| 0.3105 | −0.1787 | 0.1255 |
| 0.3110 | −0.1987 | 0.1245 |
| 0.3115 | −0.2186 | 0.1236 |
| 0.3119 | −0.2385 | 0.1227 |
| 0.3122 | −0.2584 | 0.1218 |
| 0.3123 | 0.3341 | 0.0889 |
| 0.3124 | −0.2783 | 0.1211 |
| 0.3126 | −0.2981 | 0.1203 |
| 0.3128 | −0.3178 | 0.1195 |
| 0.3130 | −0.3375 | 0.1188 |
| 0.3131 | −0.3572 | 0.1180 |
| 0.3132 | −0.3768 | 0.1173 |
| 0.3134 | −0.3964 | 0.1164 |
| 0.3135 | −0.4159 | 0.1155 |
| 0.3137 | −0.4354 | 0.1146 |
| 0.3139 | −0.4550 | 0.1136 |
| 0.3142 | −0.4744 | 0.1124 |
| 0.3145 | 0.3145 | 0.0867 |
| 0.3145 | −0.4939 | 0.1112 |
| 0.3149 | −0.5133 | 0.1098 |
| 0.3154 | −0.5326 | 0.1083 |
| 0.3160 | −0.5520 | 0.1066 |
| 0.3168 | −0.5712 | 0.1046 |
| 0.3177 | −0.5904 | 0.1025 |
| 0.3187 | −0.6096 | 0.1001 |
| 0.3339 | −0.1957 | 0.1258 |
| 0.3339 | 0.3374 | 0.0902 |
| 0.3342 | −0.2157 | 0.1250 |
| 0.3345 | −0.2357 | 0.1242 |
| 0.3347 | −0.2557 | 0.1235 |
| 0.3349 | −0.2756 | 0.1227 |
| 0.3351 | −0.2954 | 0.1220 |
| 0.3352 | −0.3152 | 0.1213 |
| 0.3353 | −0.3349 | 0.1205 |
| 0.3355 | −0.3546 | 0.1197 |
| 0.3356 | −0.3742 | 0.1189 |
| 0.3358 | −0.3938 | 0.1180 |
| 0.3359 | 0.3176 | 0.0881 |
| 0.3360 | −0.4134 | 0.1171 |
| 0.3362 | −0.4330 | 0.1161 |
| 0.3364 | −0.4525 | 0.1149 |
| 0.3367 | −0.4720 | 0.1137 |
| 0.3371 | −0.4915 | 0.1124 |
| 0.3375 | −0.5109 | 0.1109 |
| 0.3381 | −0.5303 | 0.1093 |
| 0.3387 | −0.5497 | 0.1075 |
| 0.3394 | −0.5690 | 0.1055 |
| 0.3403 | −0.5883 | 0.1033 |
| 0.3413 | −0.6076 | 0.1009 |
| 0.3424 | −0.6268 | 0.0982 |
| 0.3560 | 0.3393 | 0.0911 |
| 0.3575 | −0.2143 | 0.1258 |
| 0.3577 | −0.2343 | 0.1252 |
| 0.3577 | 0.3194 | 0.0892 |
| 0.3578 | −0.2543 | 0.1245 |
| 0.3579 | −0.2742 | 0.1238 |
| 0.3581 | −0.2941 | 0.1231 |
| 0.3582 | −0.3139 | 0.1224 |
| 0.3583 | −0.3337 | 0.1216 |
| 0.3585 | −0.3534 | 0.1208 |
| 0.3586 | −0.3730 | 0.1199 |
| 0.3588 | −0.3927 | 0.1189 |
| 0.3590 | −0.4123 | 0.1179 |
| 0.3593 | −0.4318 | 0.1168 |
| 0.3595 | −0.4514 | 0.1156 |
| 0.3599 | −0.4709 | 0.1143 |
| 0.3602 | −0.4905 | 0.1129 |
| 0.3607 | −0.5099 | 0.1113 |
| 0.3612 | −0.5294 | 0.1096 |
| 0.3618 | −0.5488 | 0.1078 |
| 0.3625 | −0.5682 | 0.1058 |
| 0.3633 | −0.5875 | 0.1036 |
| 0.3642 | −0.6069 | 0.1012 |
| 0.3652 | −0.6262 | 0.0986 |
| 0.3783 | 0.3398 | 0.0917 |
| 0.3798 | 0.3198 | 0.0900 |
| 0.3811 | −0.2144 | 0.1262 |
| 0.3812 | −0.2344 | 0.1256 |
| 0.3813 | −0.2544 | 0.1250 |
| 0.3814 | −0.2744 | 0.1243 |
| 0.3815 | −0.2943 | 0.1236 |
| 0.3816 | −0.3141 | 0.1229 |
| 0.3817 | −0.3339 | 0.1221 |
| 0.3819 | −0.3536 | 0.1212 |
| 0.3820 | −0.3733 | 0.1202 |
| 0.3822 | −0.3929 | 0.1192 |
| 0.3825 | −0.4126 | 0.1181 |
| 0.3827 | −0.4322 | 0.1169 |
| 0.3830 | −0.4518 | 0.1156 |
| 0.3834 | −0.4713 | 0.1142 |
| 0.3838 | −0.4909 | 0.1127 |
| 0.3842 | −0.5104 | 0.1111 |
| 0.3847 | −0.5299 | 0.1094 |
| 0.3852 | −0.5493 | 0.1075 |
| 0.3858 | −0.5687 | 0.1055 |
| 0.3865 | −0.5882 | 0.1034 |
| 0.3872 | −0.6076 | 0.1011 |
| 0.3881 | −0.6270 | 0.0986 |
| 0.3890 | −0.6465 | 0.0960 |
| 0.4019 | 0.3189 | 0.0908 |
| 0.4048 | −0.2360 | 0.1255 |
| 0.4048 | −0.2560 | 0.1250 |
| 0.4048 | −0.2760 | 0.1243 |
| 0.4049 | −0.2959 | 0.1236 |
| 0.4050 | −0.3157 | 0.1228 |
| 0.4052 | −0.3355 | 0.1219 |
| 0.4054 | −0.3553 | 0.1209 |
| 0.4056 | −0.3750 | 0.1199 |
| 0.4058 | −0.3946 | 0.1187 |
| 0.4061 | −0.4143 | 0.1175 |
| 0.4063 | −0.4339 | 0.1162 |
| 0.4066 | −0.4535 | 0.1148 |
| 0.4070 | −0.4731 | 0.1134 |
| 0.4073 | −0.4927 | 0.1118 |
| 0.4077 | −0.5122 | 0.1102 |
| 0.4081 | −0.5317 | 0.1085 |
| 0.4086 | −0.5512 | 0.1067 |
| 0.4091 | −0.5707 | 0.1048 |
| 0.4096 | −0.5902 | 0.1028 |
| 0.4102 | −0.6096 | 0.1006 |
| 0.4109 | −0.6291 | 0.0984 |
| 0.4116 | −0.6486 | 0.0959 |
| 0.4240 | 0.3167 | 0.0915 |
| 0.4282 | −0.2590 | 0.1245 |
| 0.4282 | −0.2389 | 0.1250 |
| 0.4282 | −0.2789 | 0.1239 |
| 0.4283 | −0.2989 | 0.1231 |
| 0.4284 | −0.3187 | 0.1222 |
| 0.4286 | −0.3385 | 0.1212 |
| 0.4288 | −0.3583 | 0.1201 |
| 0.4290 | −0.3780 | 0.1189 |
| 0.4293 | −0.3977 | 0.1176 |
| 0.4296 | −0.4174 | 0.1163 |
| 0.4299 | −0.4370 | 0.1149 |
| 0.4302 | −0.4567 | 0.1134 |
| 0.4305 | −0.4763 | 0.1119 |
| 0.4308 | −0.4959 | 0.1104 |
| 0.4311 | −0.5154 | 0.1088 |
| 0.4315 | −0.5350 | 0.1072 |
| 0.4318 | −0.5545 | 0.1055 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.4322 | −0.5740 | 0.1038 |
| 0.4325 | −0.5935 | 0.1019 |
| 0.4330 | −0.6130 | 0.1000 |
| 0.4334 | −0.6325 | 0.0980 |
| 0.4339 | −0.6521 | 0.0958 |
| 0.4513 | −0.2632 | 0.1238 |
| 0.4514 | −0.2832 | 0.1231 |
| 0.4515 | −0.3032 | 0.1222 |
| 0.4516 | −0.3231 | 0.1212 |
| 0.4519 | −0.3429 | 0.1200 |
| 0.4521 | −0.3627 | 0.1188 |
| 0.4524 | −0.3824 | 0.1174 |
| 0.4527 | −0.4021 | 0.1160 |
| 0.4530 | −0.4218 | 0.1145 |
| 0.4533 | −0.4415 | 0.1130 |
| 0.4536 | −0.4611 | 0.1115 |
| 0.4539 | −0.4808 | 0.1100 |
| 0.4541 | −0.5004 | 0.1085 |
| 0.4544 | −0.5199 | 0.1070 |
| 0.4546 | −0.5395 | 0.1056 |
| 0.4548 | −0.5590 | 0.1041 |
| 0.4550 | −0.5785 | 0.1026 |
| 0.4552 | −0.5980 | 0.1010 |
| 0.4554 | −0.6175 | 0.0994 |
| 0.4556 | −0.6371 | 0.0977 |
| 0.4559 | −0.6566 | 0.0959 |
| 0.4743 | −0.2688 | 0.1229 |
| 0.4743 | −0.2888 | 0.1221 |
| 0.4745 | −0.3088 | 0.1210 |
| 0.4747 | −0.3287 | 0.1198 |
| 0.4750 | −0.3485 | 0.1185 |
| 0.4753 | −0.3683 | 0.1170 |
| 0.4756 | −0.3881 | 0.1155 |
| 0.4759 | −0.4078 | 0.1139 |
| 0.4763 | −0.4275 | 0.1123 |
| 0.4766 | −0.4472 | 0.1107 |
| 0.4768 | −0.4669 | 0.1091 |
| 0.4771 | −0.4865 | 0.1076 |
| 0.4772 | −0.5061 | 0.1062 |
| 0.4774 | −0.5257 | 0.1049 |
| 0.4774 | −0.5452 | 0.1037 |
| 0.4775 | −0.5647 | 0.1025 |
| 0.4775 | −0.5842 | 0.1013 |
| 0.4775 | −0.6037 | 0.1001 |
| 0.4775 | −0.6232 | 0.0989 |
| 0.4775 | −0.6428 | 0.0976 |
| 0.4776 | −0.6624 | 0.0962 |
| 0.4969 | −0.2756 | 0.1218 |
| 0.4970 | −0.2956 | 0.1208 |
| 0.4972 | −0.3156 | 0.1196 |
| 0.4975 | −0.3355 | 0.1182 |
| 0.4978 | −0.3554 | 0.1166 |
| 0.4982 | −0.3752 | 0.1149 |
| 0.4985 | −0.3950 | 0.1132 |
| 0.4988 | −0.6692 | 0.0970 |
| 0.4989 | −0.4148 | 0.1114 |
| 0.4990 | −0.6496 | 0.0979 |
| 0.4992 | −0.6301 | 0.0987 |
| 0.4993 | −0.4345 | 0.1096 |
| 0.4994 | −0.6106 | 0.0994 |
| 0.4996 | −0.4542 | 0.1079 |
| 0.4996 | −0.5911 | 0.1002 |
| 0.4998 | −0.5716 | 0.1009 |
| 0.4998 | −0.4738 | 0.1064 |
| 0.4999 | −0.5521 | 0.1018 |
| 0.5000 | −0.4935 | 0.1049 |
| 0.5000 | −0.5326 | 0.1027 |
| 0.5000 | −0.5130 | 0.1037 |
| 0.5194 | −0.3035 | 0.1195 |
| 0.5196 | −0.3235 | 0.1180 |
| 0.5198 | −0.6770 | 0.0980 |
| 0.5199 | −0.3435 | 0.1164 |
| 0.5202 | −0.6575 | 0.0984 |
| 0.5203 | −0.3634 | 0.1145 |
| 0.5206 | −0.6379 | 0.0987 |
| 0.5207 | −0.3833 | 0.1126 |
| 0.5210 | −0.6185 | 0.0989 |
| 0.5212 | −0.4031 | 0.1106 |
| 0.5214 | −0.5990 | 0.0991 |
| 0.5216 | −0.4229 | 0.1086 |
| 0.5218 | −0.5796 | 0.0994 |
| 0.5219 | −0.4426 | 0.1067 |
| 0.5221 | −0.5601 | 0.0997 |
| 0.5222 | −0.4623 | 0.1049 |
| 0.5223 | −0.5406 | 0.1003 |
| 0.5224 | −0.4819 | 0.1034 |
| 0.5225 | −0.5211 | 0.1010 |
| 0.5225 | −0.5015 | 0.1020 |
| 0.5404 | −0.6858 | 0.0992 |
| 0.5410 | −0.6663 | 0.0991 |
| 0.5414 | −0.3125 | 0.1179 |
| 0.5416 | −0.6468 | 0.0988 |
| 0.5417 | −0.3326 | 0.1163 |
| 0.5421 | −0.3526 | 0.1143 |
| 0.5422 | −0.6274 | 0.0984 |
| 0.5425 | −0.3725 | 0.1122 |
| 0.5428 | −0.6079 | 0.0981 |
| 0.5430 | −0.3924 | 0.1100 |
| 0.5433 | −0.5885 | 0.0978 |
| 0.5434 | −0.4122 | 0.1078 |
| 0.5438 | −0.5691 | 0.0977 |
| 0.5439 | −0.4320 | 0.1056 |
| 0.5442 | −0.4518 | 0.1035 |
| 0.5442 | −0.5497 | 0.0978 |
| 0.5445 | −0.4715 | 0.1017 |
| 0.5445 | −0.5302 | 0.0982 |
| 0.5447 | −0.4911 | 0.1002 |
| 0.5447 | −0.5107 | 0.0990 |
| 0.5608 | −0.6956 | 0.1005 |
| 0.5615 | −0.6761 | 0.0998 |
| 0.5623 | −0.6567 | 0.0990 |
| 0.5630 | −0.6372 | 0.0981 |
| 0.5632 | −0.3226 | 0.1163 |
| 0.5635 | −0.3427 | 0.1144 |
| 0.5638 | −0.6179 | 0.0972 |
| 0.5639 | −0.3627 | 0.1121 |
| 0.5644 | −0.3827 | 0.1098 |
| 0.5645 | −0.5985 | 0.0963 |
| 0.5648 | −0.4026 | 0.1073 |
| 0.5651 | −0.5791 | 0.0957 |
| 0.5653 | −0.4224 | 0.1048 |
| 0.5657 | −0.5597 | 0.0954 |
| 0.5657 | −0.4422 | 0.1024 |
| 0.5660 | −0.4619 | 0.1003 |
| 0.5661 | −0.5403 | 0.0954 |
| 0.5663 | −0.4816 | 0.0984 |
| 0.5663 | −0.5208 | 0.0959 |
| 0.5664 | −0.5012 | 0.0969 |
| 0.5819 | −0.6869 | 0.1006 |
| 0.5827 | −0.6675 | 0.0992 |
| 0.5836 | −0.6481 | 0.0977 |
| 0.5844 | −0.6287 | 0.0962 |
| 0.5847 | −0.3338 | 0.1145 |
| 0.5850 | −0.3538 | 0.1123 |
| 0.5852 | −0.6093 | 0.0949 |
| 0.5854 | −0.3738 | 0.1098 |
| 0.5858 | −0.3938 | 0.1071 |
| 0.5859 | −0.5900 | 0.0937 |
| 0.5862 | −0.4137 | 0.1044 |
| 0.5865 | −0.5706 | 0.0929 |
| 0.5866 | −0.4335 | 0.1017 |
| 0.5870 | −0.4533 | 0.0992 |
| 0.5870 | −0.5512 | 0.0925 |
| 0.5873 | −0.4730 | 0.0969 |
| 0.5873 | −0.5317 | 0.0927 |
| 0.5874 | −0.4926 | 0.0950 |
| 0.5875 | −0.5122 | 0.0936 |
| 0.6021 | −0.6987 | 0.1013 |
| 0.6029 | −0.6792 | 0.0994 |
| 0.6037 | −0.6597 | 0.0973 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.6046 | −0.6403 | 0.0953 |
| 0.6054 | −0.6210 | 0.0933 |
| 0.6060 | −0.3659 | 0.1100 |
| 0.6061 | −0.6016 | 0.0917 |
| 0.6063 | −0.3858 | 0.1073 |
| 0.6066 | −0.4057 | 0.1043 |
| 0.6067 | −0.5822 | 0.0904 |
| 0.6070 | −0.4256 | 0.1014 |
| 0.6072 | −0.5628 | 0.0896 |
| 0.6073 | −0.4454 | 0.0985 |
| 0.6076 | −0.4651 | 0.0958 |
| 0.6076 | −0.5434 | 0.0895 |
| 0.6078 | −0.4847 | 0.0935 |
| 0.6078 | −0.5239 | 0.0902 |
| 0.6079 | −0.5043 | 0.0916 |
| 0.6221 | −0.7114 | 0.1017 |
| 0.6229 | −0.6918 | 0.0993 |
| 0.6236 | −0.6722 | 0.0968 |
| 0.6243 | −0.6527 | 0.0942 |
| 0.6250 | −0.6333 | 0.0917 |
| 0.6257 | −0.6138 | 0.0896 |
| 0.6262 | −0.5944 | 0.0879 |
| 0.6264 | −0.3786 | 0.1075 |
| 0.6266 | −0.3985 | 0.1045 |
| 0.6267 | −0.5749 | 0.0867 |
| 0.6268 | −0.4183 | 0.1014 |
| 0.6270 | −0.4381 | 0.0982 |
| 0.6271 | −0.5555 | 0.0864 |
| 0.6272 | −0.4578 | 0.0952 |
| 0.6273 | −0.5360 | 0.0868 |
| 0.6274 | −0.4774 | 0.0924 |
| 0.6274 | −0.5165 | 0.0881 |
| 0.6274 | −0.4970 | 0.0900 |
| 0.6426 | −0.7052 | 0.0990 |
| 0.6431 | −0.6855 | 0.0960 |
| 0.6436 | −0.6658 | 0.0930 |
| 0.6441 | −0.6461 | 0.0901 |
| 0.6446 | −0.6265 | 0.0875 |
| 0.6450 | −0.6070 | 0.0853 |
| 0.6454 | −0.5875 | 0.0839 |
| 0.6457 | −0.5680 | 0.0832 |
| 0.6460 | −0.5485 | 0.0835 |
| 0.6461 | −0.5290 | 0.0846 |
| 0.6462 | −0.5096 | 0.0864 |
| 0.6462 | −0.3920 | 0.1048 |
| 0.6463 | −0.4118 | 0.1016 |
| 0.6463 | −0.4314 | 0.0982 |
| 0.6463 | −0.4901 | 0.0889 |
| 0.6463 | −0.4510 | 0.0949 |
| 0.6463 | −0.4706 | 0.0917 |
| 0.6523 | 0.2634 | 0.1102 |
| 0.6620 | −0.7194 | 0.0984 |
| 0.6622 | −0.6994 | 0.0950 |
| 0.6624 | −0.6794 | 0.0916 |
| 0.6626 | −0.6595 | 0.0883 |
| 0.6628 | −0.6397 | 0.0853 |
| 0.6631 | −0.6199 | 0.0828 |
| 0.6633 | −0.6003 | 0.0810 |
| 0.6635 | −0.5807 | 0.0801 |
| 0.6637 | −0.5612 | 0.0802 |
| 0.6639 | −0.5417 | 0.0812 |
| 0.6641 | −0.5224 | 0.0830 |
| 0.6643 | −0.5030 | 0.0854 |
| 0.6645 | −0.4837 | 0.0883 |
| 0.6647 | −0.4643 | 0.0915 |
| 0.6649 | −0.4449 | 0.0949 |
| 0.6651 | −0.4254 | 0.0984 |
| 0.6653 | −0.4058 | 0.1018 |
| 0.6723 | 0.2488 | 0.1115 |
| 0.6804 | −0.6133 | 0.0783 |
| 0.6804 | −0.6332 | 0.0803 |
| 0.6804 | −0.5936 | 0.0771 |
| 0.6805 | −0.6532 | 0.0831 |
| 0.6806 | −0.5740 | 0.0770 |
| 0.6806 | −0.6734 | 0.0864 |
| 0.6808 | −0.6936 | 0.0900 |
| 0.6808 | −0.5546 | 0.0779 |
| 0.6809 | −0.7139 | 0.0938 |
| 0.6811 | −0.5353 | 0.0795 |
| 0.6814 | −0.5161 | 0.0819 |
| 0.6818 | −0.4969 | 0.0848 |
| 0.6823 | −0.4777 | 0.0881 |
| 0.6827 | −0.4585 | 0.0915 |
| 0.6832 | −0.4393 | 0.0951 |
| 0.6836 | −0.4200 | 0.0986 |
| 0.6919 | 0.2528 | 0.1077 |
| 0.6968 | −0.6067 | 0.0743 |
| 0.6968 | −0.5871 | 0.0740 |
| 0.6969 | −0.6266 | 0.0756 |
| 0.6970 | −0.5676 | 0.0747 |
| 0.6972 | −0.6468 | 0.0779 |
| 0.6974 | −0.5484 | 0.0763 |
| 0.6976 | −0.6671 | 0.0809 |
| 0.6978 | −0.5293 | 0.0785 |
| 0.6981 | −0.6876 | 0.0844 |
| 0.6984 | −0.5103 | 0.0813 |
| 0.6986 | −0.7082 | 0.0883 |
| 0.6990 | −0.4913 | 0.0846 |
| 0.6992 | −0.7290 | 0.0922 |
| 0.6997 | −0.4724 | 0.0881 |
| 0.7004 | −0.4533 | 0.0917 |
| 0.7110 | 0.2369 | 0.1079 |
| 0.7126 | −0.6005 | 0.0712 |
| 0.7127 | −0.6202 | 0.0716 |
| 0.7128 | −0.5810 | 0.0717 |
| 0.7130 | −0.6403 | 0.0732 |
| 0.7131 | −0.5618 | 0.0731 |
| 0.7135 | −0.6607 | 0.0756 |
| 0.7137 | −0.5428 | 0.0753 |
| 0.7142 | −0.6814 | 0.0787 |
| 0.7144 | −0.5239 | 0.0780 |
| 0.7150 | −0.7023 | 0.0824 |
| 0.7152 | −0.5051 | 0.0811 |
| 0.7159 | −0.7233 | 0.0864 |
| 0.7160 | −0.4863 | 0.0845 |
| 0.7169 | −0.4676 | 0.0881 |
| 0.7281 | −0.6144 | 0.0686 |
| 0.7283 | −0.5948 | 0.0690 |
| 0.7283 | −0.6343 | 0.0692 |
| 0.7285 | 0.2405 | 0.1023 |
| 0.7286 | −0.5756 | 0.0703 |
| 0.7288 | −0.6546 | 0.0709 |
| 0.7292 | −0.5566 | 0.0722 |
| 0.7294 | 0.2204 | 0.1078 |
| 0.7295 | −0.6752 | 0.0734 |
| 0.7299 | −0.5379 | 0.0748 |
| 0.7305 | −0.6962 | 0.0767 |
| 0.7308 | −0.5192 | 0.0778 |
| 0.7316 | −0.7174 | 0.0804 |
| 0.7318 | −0.5006 | 0.0811 |
| 0.7328 | −0.7388 | 0.0844 |
| 0.7328 | −0.4820 | 0.0846 |
| 0.7435 | −0.6289 | 0.0664 |
| 0.7435 | −0.6093 | 0.0666 |
| 0.7438 | −0.6489 | 0.0671 |
| 0.7439 | −0.5900 | 0.0677 |
| 0.7444 | −0.5710 | 0.0694 |
| 0.7444 | −0.6694 | 0.0689 |
| 0.7451 | −0.5523 | 0.0718 |
| 0.7453 | −0.6903 | 0.0715 |
| 0.7459 | 0.2241 | 0.1017 |
| 0.7461 | −0.5337 | 0.0746 |
| 0.7464 | −0.7115 | 0.0747 |
| 0.7471 | 0.2036 | 0.1072 |
| 0.7471 | −0.5151 | 0.0777 |
| 0.7477 | −0.7329 | 0.0784 |
| 0.7482 | −0.4967 | 0.0811 |
| 0.7587 | −0.6242 | 0.0645 |
| 0.7587 | −0.6440 | 0.0644 |
| 0.7589 | −0.6049 | 0.0653 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.7591 | −0.6641 | 0.0653 |
| 0.7594 | −0.5859 | 0.0669 |
| 0.7598 | −0.6848 | 0.0671 |
| 0.7601 | −0.5671 | 0.0690 |
| 0.7608 | −0.7058 | 0.0697 |
| 0.7610 | −0.5485 | 0.0716 |
| 0.7612 | 0.2280 | 0.0952 |
| 0.7620 | −0.5300 | 0.0745 |
| 0.7621 | −0.7272 | 0.0728 |
| 0.7626 | 0.2074 | 0.1010 |
| 0.7631 | −0.5116 | 0.0777 |
| 0.7635 | −0.7489 | 0.0765 |
| 0.7639 | 0.1867 | 0.1064 |
| 0.7736 | −0.6397 | 0.0626 |
| 0.7738 | −0.6596 | 0.0627 |
| 0.7738 | −0.6203 | 0.0632 |
| 0.7742 | −0.6012 | 0.0645 |
| 0.7742 | −0.6799 | 0.0636 |
| 0.7748 | −0.5823 | 0.0664 |
| 0.7750 | −0.7006 | 0.0655 |
| 0.7757 | −0.5637 | 0.0687 |
| 0.7761 | −0.7218 | 0.0680 |
| 0.7766 | −0.5452 | 0.0714 |
| 0.7772 | 0.2114 | 0.0945 |
| 0.7774 | −0.7433 | 0.0711 |
| 0.7777 | −0.5268 | 0.0744 |
| 0.7787 | 0.1905 | 0.1001 |
| 0.7801 | 0.1696 | 0.1053 |
| 0.7884 | −0.6557 | 0.0609 |
| 0.7885 | −0.6362 | 0.0614 |
| 0.7886 | −0.6757 | 0.0612 |
| 0.7888 | −0.6169 | 0.0624 |
| 0.7891 | −0.6961 | 0.0622 |
| 0.7893 | −0.5980 | 0.0640 |
| 0.7900 | −0.7169 | 0.0640 |
| 0.7901 | −0.5792 | 0.0661 |
| 0.7909 | −0.5607 | 0.0685 |
| 0.7911 | −0.7382 | 0.0665 |
| 0.7911 | 0.2155 | 0.0881 |
| 0.7920 | −0.5422 | 0.0713 |
| 0.7927 | 0.1946 | 0.0936 |
| 0.7942 | 0.1735 | 0.0991 |
| 0.7956 | 0.1525 | 0.1041 |
| 0.8030 | −0.6525 | 0.0597 |
| 0.8030 | −0.6722 | 0.0594 |
| 0.8032 | −0.6332 | 0.0605 |
| 0.8033 | −0.6923 | 0.0598 |
| 0.8037 | −0.6141 | 0.0618 |
| 0.8039 | −0.7128 | 0.0609 |
| 0.8043 | −0.5952 | 0.0636 |
| 0.8045 | 0.2196 | 0.0821 |
| 0.8047 | −0.7337 | 0.0627 |
| 0.8050 | −0.5765 | 0.0658 |
| 0.8058 | −0.7550 | 0.0651 |
| 0.8060 | −0.5580 | 0.0683 |
| 0.8060 | 0.1987 | 0.0875 |
| 0.8076 | 0.1776 | 0.0928 |
| 0.8091 | 0.1565 | 0.0980 |
| 0.8174 | −0.6694 | 0.0582 |
| 0.8175 | −0.6892 | 0.0581 |
| 0.8175 | −0.6499 | 0.0587 |
| 0.8178 | −0.7094 | 0.0586 |
| 0.8178 | −0.6307 | 0.0598 |
| 0.8183 | −0.6117 | 0.0613 |
| 0.8184 | −0.7300 | 0.0598 |
| 0.8189 | −0.5928 | 0.0633 |
| 0.8191 | 0.2026 | 0.0818 |
| 0.8192 | −0.7509 | 0.0615 |
| 0.8197 | −0.5742 | 0.0655 |
| 0.8206 | 0.1816 | 0.0869 |
| 0.8207 | −0.5557 | 0.0681 |
| 0.8220 | 0.1605 | 0.0920 |
| 0.8234 | 0.1394 | 0.0969 |
| 0.8314 | −0.6866 | 0.0568 |
| 0.8315 | −0.6669 | 0.0572 |
| 0.8316 | −0.7065 | 0.0569 |
| 0.8317 | −0.6476 | 0.0580 |
| 0.8320 | −0.7268 | 0.0576 |
| 0.8320 | −0.6284 | 0.0592 |
| 0.8320 | 0.2062 | 0.0769 |
| 0.8325 | −0.7474 | 0.0588 |
| 0.8326 | −0.6095 | 0.0609 |
| 0.8332 | −0.5907 | 0.0629 |
| 0.8333 | 0.1853 | 0.0816 |
| 0.8341 | −0.5720 | 0.0653 |
| 0.8346 | 0.1643 | 0.0865 |
| 0.8360 | 0.1433 | 0.0912 |
| 0.8372 | 0.1223 | 0.0958 |
| 0.8449 | 0.2094 | 0.0727 |
| 0.8451 | −0.6843 | 0.0558 |
| 0.8451 | −0.7040 | 0.0556 |
| 0.8452 | −0.6647 | 0.0563 |
| 0.8453 | −0.7241 | 0.0559 |
| 0.8454 | −0.6454 | 0.0573 |
| 0.8457 | −0.7445 | 0.0566 |
| 0.8459 | −0.6263 | 0.0587 |
| 0.8460 | 0.1887 | 0.0770 |
| 0.8463 | −0.7651 | 0.0579 |
| 0.8464 | −0.6074 | 0.0605 |
| 0.8471 | −0.5887 | 0.0627 |
| 0.8471 | 0.1678 | 0.0815 |
| 0.8483 | 0.1469 | 0.0860 |
| 0.8495 | 0.1260 | 0.0905 |
| 0.8506 | 0.1051 | 0.0947 |
| 0.8583 | −0.7018 | 0.0545 |
| 0.8583 | −0.6821 | 0.0548 |
| 0.8585 | −0.7217 | 0.0545 |
| 0.8585 | −0.6626 | 0.0555 |
| 0.8586 | 0.1916 | 0.0732 |
| 0.8587 | −0.7419 | 0.0550 |
| 0.8588 | −0.6434 | 0.0567 |
| 0.8591 | −0.7623 | 0.0558 |
| 0.8593 | −0.6243 | 0.0582 |
| 0.8595 | 0.1709 | 0.0772 |
| 0.8599 | −0.6055 | 0.0602 |
| 0.8606 | 0.1502 | 0.0814 |
| 0.8616 | 0.1294 | 0.0856 |
| 0.8627 | 0.1085 | 0.0897 |
| 0.8636 | 0.0877 | 0.0936 |
| 0.8710 | 0.1942 | 0.0700 |
| 0.8712 | −0.6996 | 0.0534 |
| 0.8713 | −0.7195 | 0.0533 |
| 0.8713 | −0.6800 | 0.0539 |
| 0.8715 | −0.7395 | 0.0535 |
| 0.8715 | −0.6606 | 0.0548 |
| 0.8718 | −0.7598 | 0.0541 |
| 0.8719 | 0.1737 | 0.0736 |
| 0.8719 | −0.6415 | 0.0561 |
| 0.8724 | −0.6225 | 0.0579 |
| 0.8727 | 0.1531 | 0.0775 |
| 0.8737 | 0.1324 | 0.0814 |
| 0.8746 | 0.1117 | 0.0853 |
| 0.8755 | 0.0909 | 0.0890 |
| 0.8763 | 0.0702 | 0.0926 |
| 0.8834 | 0.1966 | 0.0673 |
| 0.8838 | −0.7173 | 0.0521 |
| 0.8838 | −0.6976 | 0.0524 |
| 0.8839 | −0.7373 | 0.0521 |
| 0.8839 | −0.6781 | 0.0530 |
| 0.8841 | 0.1762 | 0.0706 |
| 0.8841 | −0.7575 | 0.0525 |
| 0.8842 | −0.6588 | 0.0542 |
| 0.8845 | −0.7779 | 0.0533 |
| 0.8847 | −0.6397 | 0.0558 |
| 0.8848 | 0.1557 | 0.0741 |
| 0.8853 | −0.6209 | 0.0579 |
| 0.8856 | 0.1351 | 0.0777 |
| 0.8864 | 0.1145 | 0.0814 |
| 0.8872 | 0.0939 | 0.0849 |
| 0.8880 | 0.0732 | 0.0883 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.8887 | 0.0526 | 0.0915 |
| 0.8960 | −0.7153 | 0.0509 |
| 0.8960 | −0.7352 | 0.0508 |
| 0.8960 | −0.6956 | 0.0514 |
| 0.8961 | 0.1784 | 0.0681 |
| 0.8962 | −0.7553 | 0.0511 |
| 0.8963 | −0.6762 | 0.0523 |
| 0.8965 | −0.7756 | 0.0516 |
| 0.8967 | −0.6570 | 0.0538 |
| 0.8967 | 0.1580 | 0.0713 |
| 0.8972 | −0.6381 | 0.0557 |
| 0.8974 | 0.1376 | 0.0746 |
| 0.8981 | 0.1171 | 0.0780 |
| 0.8988 | 0.0965 | 0.0813 |
| 0.8995 | 0.0760 | 0.0846 |
| 0.9001 | 0.0555 | 0.0877 |
| 0.9007 | 0.0350 | 0.0905 |
| 0.9079 | −0.7331 | 0.0496 |
| 0.9079 | −0.7133 | 0.0499 |
| 0.9080 | 0.1805 | 0.0660 |
| 0.9080 | −0.7531 | 0.0496 |
| 0.9081 | −0.6938 | 0.0506 |
| 0.9083 | −0.7734 | 0.0500 |
| 0.9084 | −0.6745 | 0.0519 |
| 0.9085 | 0.1602 | 0.0689 |
| 0.9089 | −0.6555 | 0.0537 |
| 0.9091 | 0.1398 | 0.0720 |
| 0.9097 | 0.1194 | 0.0751 |
| 0.9103 | 0.0989 | 0.0782 |
| 0.9109 | 0.0785 | 0.0813 |
| 0.9115 | 0.0580 | 0.0843 |
| 0.9120 | 0.0376 | 0.0870 |
| 0.9125 | 0.0172 | 0.0895 |
| 0.9195 | −0.7312 | 0.0484 |
| 0.9196 | −0.7511 | 0.0483 |
| 0.9196 | 0.1824 | 0.0639 |
| 0.9196 | −0.7115 | 0.0490 |
| 0.9198 | −0.7712 | 0.0485 |
| 0.9199 | −0.6922 | 0.0501 |
| 0.9201 | 0.1621 | 0.0668 |
| 0.9204 | −0.6731 | 0.0519 |
| 0.9206 | 0.1418 | 0.0697 |
| 0.9212 | 0.1214 | 0.0726 |
| 0.9217 | 0.1010 | 0.0756 |
| 0.9222 | 0.0807 | 0.0785 |
| 0.9228 | 0.0603 | 0.0813 |
| 0.9232 | 0.0399 | 0.0839 |
| 0.9237 | 0.0196 | 0.0864 |
| 0.9240 | −0.0007 | 0.0885 |
| 0.9309 | −0.7492 | 0.0471 |
| 0.9310 | −0.7295 | 0.0475 |
| 0.9310 | −0.7692 | 0.0470 |
| 0.9310 | 0.1842 | 0.0619 |
| 0.9312 | −0.7100 | 0.0485 |
| 0.9312 | −0.7895 | 0.0474 |
| 0.9314 | 0.1640 | 0.0647 |
| 0.9316 | −0.6909 | 0.0501 |
| 0.9319 | 0.1437 | 0.0675 |
| 0.9324 | 0.1233 | 0.0704 |
| 0.9329 | 0.1030 | 0.0732 |
| 0.9334 | 0.0826 | 0.0760 |
| 0.9339 | 0.0623 | 0.0787 |
| 0.9343 | 0.0420 | 0.0812 |
| 0.9347 | 0.0217 | 0.0836 |
| 0.9350 | 0.0015 | 0.0857 |
| 0.9353 | −0.0187 | 0.0876 |
| 0.9420 | −0.7674 | 0.0458 |
| 0.9420 | −0.7476 | 0.0461 |
| 0.9422 | −0.7875 | 0.0458 |
| 0.9422 | −0.7280 | 0.0470 |
| 0.9425 | 0.1657 | 0.0626 |
| 0.9426 | −0.7088 | 0.0485 |
| 0.9430 | 0.1454 | 0.0654 |
| 0.9434 | 0.1251 | 0.0682 |
| 0.9439 | 0.1047 | 0.0711 |
| 0.9444 | 0.0844 | 0.0738 |
| 0.9448 | 0.0640 | 0.0764 |
| 0.9452 | 0.0438 | 0.0789 |
| 0.9456 | 0.0235 | 0.0812 |
| 0.9459 | 0.0033 | 0.0832 |
| 0.9462 | −0.0168 | 0.0850 |
| 0.9530 | −0.7659 | 0.0448 |
| 0.9530 | −0.7858 | 0.0445 |
| 0.9531 | −0.7462 | 0.0455 |
| 0.9534 | 0.1674 | 0.0606 |
| 0.9534 | −0.7270 | 0.0470 |
| 0.9538 | 0.1471 | 0.0633 |
| 0.9540 | −0.7082 | 0.0491 |
| 0.9542 | 0.1268 | 0.0661 |
| 0.9547 | 0.1064 | 0.0689 |
| 0.9552 | 0.0860 | 0.0717 |
| 0.9556 | 0.0657 | 0.0743 |
| 0.9560 | 0.0454 | 0.0768 |
| 0.9563 | 0.0251 | 0.0790 |
| 0.9566 | 0.0050 | 0.0810 |
| 0.9569 | −0.0151 | 0.0828 |
| 0.9570 | −0.0351 | 0.0844 |
| 0.9637 | −0.7843 | 0.0435 |
| 0.9638 | −0.7646 | 0.0442 |
| 0.9640 | 0.1690 | 0.0586 |
| 0.9641 | −0.7453 | 0.0455 |
| 0.9644 | 0.1487 | 0.0612 |
| 0.9646 | −0.7264 | 0.0476 |
| 0.9648 | 0.1284 | 0.0639 |
| 0.9653 | 0.1080 | 0.0668 |
| 0.9658 | 0.0876 | 0.0696 |
| 0.9662 | 0.0672 | 0.0723 |
| 0.9666 | 0.0468 | 0.0748 |
| 0.9669 | 0.0266 | 0.0771 |
| 0.9672 | 0.0064 | 0.0791 |
| 0.9674 | −0.0137 | 0.0809 |
| 0.9676 | −0.0336 | 0.0824 |
| 0.9677 | −0.0535 | 0.0836 |
| 0.9742 | −0.8028 | 0.0423 |
| 0.9743 | −0.7831 | 0.0430 |
| 0.9745 | 0.1704 | 0.0568 |
| 0.9746 | −0.7637 | 0.0442 |
| 0.9748 | 0.1503 | 0.0592 |
| 0.9751 | −0.7448 | 0.0462 |
| 0.9752 | 0.1300 | 0.0618 |
| 0.9756 | 0.1096 | 0.0646 |
| 0.9761 | 0.0891 | 0.0674 |
| 0.9766 | 0.0687 | 0.0702 |
| 0.9770 | 0.0483 | 0.0728 |
| 0.9774 | 0.0280 | 0.0752 |
| 0.9777 | 0.0077 | 0.0773 |
| 0.9779 | −0.0123 | 0.0791 |
| 0.9780 | −0.0323 | 0.0806 |
| 0.9781 | −0.0522 | 0.0819 |
| 0.9782 | −0.0720 | 0.0829 |
| 0.9846 | −0.8016 | 0.0418 |
| 0.9849 | −0.7822 | 0.0430 |
| 0.9851 | 0.1517 | 0.0573 |
| 0.9853 | −0.7633 | 0.0450 |
| 0.9854 | 0.1315 | 0.0598 |
| 0.9858 | 0.1111 | 0.0624 |
| 0.9863 | 0.0907 | 0.0652 |
| 0.9867 | 0.0702 | 0.0681 |
| 0.9872 | 0.0497 | 0.0708 |
| 0.9876 | 0.0293 | 0.0733 |
| 0.9879 | 0.0090 | 0.0755 |
| 0.9882 | −0.0111 | 0.0774 |
| 0.9883 | −0.0312 | 0.0790 |
| 0.9884 | −0.0511 | 0.0803 |
| 0.9884 | −0.0906 | 0.0821 |
| 0.9885 | −0.0709 | 0.0814 |
| 0.9950 | −0.8009 | 0.0419 |
| 0.9952 | 0.1530 | 0.0558 |
| 0.9955 | −0.7819 | 0.0438 |
| 0.9955 | 0.1329 | 0.0579 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 0.9958 | 0.1126 | 0.0604 |
| 0.9962 | 0.0922 | 0.0631 |
| 0.9967 | 0.0717 | 0.0658 |
| 0.9971 | 0.0512 | 0.0686 |
| 0.9976 | 0.0307 | 0.0712 |
| 0.9980 | 0.0103 | 0.0736 |
| 0.9983 | −0.0099 | 0.0757 |
| 0.9985 | −0.0301 | 0.0774 |
| 0.9985 | −0.1092 | 0.0813 |
| 0.9986 | −0.0500 | 0.0788 |
| 0.9986 | −0.0896 | 0.0807 |
| 0.9986 | −0.0699 | 0.0799 |
| 1.0053 | 0.1541 | 0.0547 |
| 1.0054 | −0.8007 | 0.0426 |
| 1.0054 | 0.1341 | 0.0565 |
| 1.0057 | 0.1139 | 0.0586 |
| 1.0061 | 0.0936 | 0.0611 |
| 1.0065 | 0.0731 | 0.0637 |
| 1.0069 | 0.0526 | 0.0664 |
| 1.0074 | 0.0321 | 0.0691 |
| 1.0078 | 0.0116 | 0.0716 |
| 1.0081 | −0.0088 | 0.0739 |
| 1.0084 | −0.0290 | 0.0758 |
| 1.0084 | −0.1280 | 0.0805 |
| 1.0085 | −0.0491 | 0.0773 |
| 1.0086 | −0.1084 | 0.0801 |
| 1.0086 | −0.0690 | 0.0785 |
| 1.0086 | −0.0887 | 0.0794 |
| 1.0154 | 0.1351 | 0.0554 |
| 1.0154 | 0.1549 | 0.0542 |
| 1.0155 | 0.1150 | 0.0572 |
| 1.0158 | 0.0948 | 0.0593 |
| 1.0161 | 0.0744 | 0.0617 |
| 1.0165 | 0.0539 | 0.0643 |
| 1.0170 | 0.0334 | 0.0670 |
| 1.0174 | 0.0129 | 0.0695 |
| 1.0178 | −0.0076 | 0.0719 |
| 1.0181 | −0.0280 | 0.0740 |
| 1.0182 | −0.1468 | 0.0796 |
| 1.0183 | −0.0481 | 0.0758 |
| 1.0183 | −0.1273 | 0.0794 |
| 1.0184 | −0.0682 | 0.0771 |
| 1.0184 | −0.1077 | 0.0789 |
| 1.0185 | −0.0880 | 0.0782 |
| 1.0252 | 0.1358 | 0.0549 |
| 1.0253 | 0.1159 | 0.0562 |
| 1.0254 | 0.0958 | 0.0580 |
| 1.0254 | 0.1554 | 0.0543 |
| 1.0257 | 0.0755 | 0.0601 |
| 1.0260 | 0.0551 | 0.0624 |
| 1.0264 | 0.0346 | 0.0649 |
| 1.0268 | 0.0141 | 0.0675 |
| 1.0272 | −0.0065 | 0.0699 |
| 1.0276 | −0.0269 | 0.0722 |
| 1.0277 | −0.1657 | 0.0787 |
| 1.0278 | −0.0472 | 0.0741 |
| 1.0279 | −0.1463 | 0.0786 |
| 1.0280 | −0.0674 | 0.0757 |
| 1.0280 | −0.1268 | 0.0783 |
| 1.0281 | −0.0873 | 0.0769 |
| 1.0281 | −0.1071 | 0.0777 |
| 1.0350 | 0.1165 | 0.0558 |
| 1.0350 | 0.0965 | 0.0570 |
| 1.0351 | 0.1361 | 0.0550 |
| 1.0351 | 0.0764 | 0.0588 |
| 1.0354 | 0.0561 | 0.0608 |
| 1.0357 | 0.0357 | 0.0631 |
| 1.0361 | 0.0152 | 0.0655 |
| 1.0365 | −0.0053 | 0.0679 |
| 1.0369 | −0.0259 | 0.0702 |
| 1.0371 | −0.1847 | 0.0777 |
| 1.0372 | −0.0463 | 0.0723 |
| 1.0373 | −0.1653 | 0.0778 |
| 1.0374 | −0.0666 | 0.0741 |
| 1.0375 | −0.1459 | 0.0776 |
| 1.0376 | −0.0867 | 0.0755 |
| 1.0376 | −0.1263 | 0.0772 |
| 1.0376 | −0.1066 | 0.0765 |
| 1.0445 | 0.0971 | 0.0566 |
| 1.0445 | 0.0771 | 0.0579 |
| 1.0446 | 0.1168 | 0.0558 |
| 1.0447 | 0.0570 | 0.0596 |
| 1.0449 | 0.0367 | 0.0616 |
| 1.0450 | 0.1363 | 0.0557 |
| 1.0453 | 0.0162 | 0.0637 |
| 1.0456 | −0.0043 | 0.0660 |
| 1.0460 | −0.0248 | 0.0683 |
| 1.0463 | −0.2037 | 0.0768 |
| 1.0463 | −0.0453 | 0.0704 |
| 1.0466 | −0.1844 | 0.0770 |
| 1.0466 | −0.0657 | 0.0724 |
| 1.0468 | −0.1650 | 0.0769 |
| 1.0468 | −0.0859 | 0.0740 |
| 1.0469 | −0.1455 | 0.0767 |
| 1.0470 | −0.1060 | 0.0752 |
| 1.0470 | −0.1258 | 0.0761 |
| 1.0540 | 0.0776 | 0.0575 |
| 1.0540 | 0.0577 | 0.0587 |
| 1.0541 | 0.0974 | 0.0567 |
| 1.0541 | 0.0375 | 0.0604 |
| 1.0543 | 0.1169 | 0.0565 |
| 1.0544 | 0.0171 | 0.0623 |
| 1.0547 | −0.0033 | 0.0643 |
| 1.0548 | 0.1361 | 0.0569 |
| 1.0550 | −0.0238 | 0.0665 |
| 1.0554 | −0.0443 | 0.0686 |
| 1.0554 | −0.2227 | 0.0758 |
| 1.0557 | −0.0647 | 0.0706 |
| 1.0557 | −0.2035 | 0.0761 |
| 1.0559 | −0.1841 | 0.0762 |
| 1.0559 | −0.0851 | 0.0723 |
| 1.0561 | −0.1647 | 0.0760 |
| 1.0561 | −0.1053 | 0.0738 |
| 1.0562 | −0.1451 | 0.0756 |
| 1.0562 | −0.1253 | 0.0749 |
| 1.0633 | 0.0580 | 0.0584 |
| 1.0633 | 0.0380 | 0.0596 |
| 1.0634 | 0.0778 | 0.0576 |
| 1.0635 | 0.0178 | 0.0611 |
| 1.0636 | 0.0974 | 0.0573 |
| 1.0637 | −0.0025 | 0.0629 |
| 1.0640 | −0.0229 | 0.0649 |
| 1.0641 | 0.1166 | 0.0576 |
| 1.0643 | −0.0434 | 0.0669 |
| 1.0644 | −0.2418 | 0.0748 |
| 1.0646 | −0.0638 | 0.0688 |
| 1.0647 | −0.2226 | 0.0751 |
| 1.0648 | 0.1355 | 0.0587 |
| 1.0649 | −0.0842 | 0.0706 |
| 1.0649 | −0.2033 | 0.0753 |
| 1.0651 | −0.1045 | 0.0722 |
| 1.0651 | −0.1839 | 0.0753 |
| 1.0652 | −0.1643 | 0.0750 |
| 1.0652 | −0.1247 | 0.0735 |
| 1.0653 | −0.1446 | 0.0744 |
| 1.0725 | 0.0383 | 0.0592 |
| 1.0725 | 0.0183 | 0.0604 |
| 1.0726 | 0.0582 | 0.0584 |
| 1.0727 | −0.0019 | 0.0619 |
| 1.0728 | 0.0777 | 0.0581 |
| 1.0729 | −0.0222 | 0.0636 |
| 1.0731 | −0.0426 | 0.0654 |
| 1.0732 | −0.2609 | 0.0737 |
| 1.0732 | 0.0970 | 0.0583 |
| 1.0734 | −0.0630 | 0.0672 |
| 1.0735 | −0.2417 | 0.0742 |
| 1.0736 | −0.0834 | 0.0690 |
| 1.0737 | −0.2225 | 0.0745 |
| 1.0738 | 0.1160 | 0.0592 |
| 1.0739 | −0.1038 | 0.0706 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 1.0740 | −0.2032 | 0.0746 |
| 1.0741 | −0.1240 | 0.0720 |
| 1.0741 | −0.1837 | 0.0744 |
| 1.0742 | −0.1441 | 0.0732 |
| 1.0742 | −0.1640 | 0.0739 |
| 1.0747 | 0.1346 | 0.0608 |
| 1.0815 | 0.0186 | 0.0600 |
| 1.0816 | −0.0015 | 0.0612 |
| 1.0816 | 0.0384 | 0.0593 |
| 1.0817 | −0.0217 | 0.0625 |
| 1.0818 | 0.0581 | 0.0589 |
| 1.0819 | −0.0419 | 0.0641 |
| 1.0819 | −0.2801 | 0.0727 |
| 1.0821 | −0.0623 | 0.0658 |
| 1.0822 | −0.2610 | 0.0732 |
| 1.0822 | 0.0774 | 0.0591 |
| 1.0823 | −0.0827 | 0.0674 |
| 1.0825 | −0.2418 | 0.0736 |
| 1.0826 | −0.1031 | 0.0690 |
| 1.0827 | −0.2225 | 0.0737 |
| 1.0828 | −0.1234 | 0.0705 |
| 1.0828 | 0.0964 | 0.0598 |
| 1.0829 | −0.2030 | 0.0737 |
| 1.0829 | −0.1436 | 0.0718 |
| 1.0830 | −0.1834 | 0.0734 |
| 1.0830 | −0.1636 | 0.0727 |
| 1.0835 | 0.1151 | 0.0612 |
| 1.0845 | 0.1335 | 0.0630 |
| 1.0904 | −0.0013 | 0.0608 |
| 1.0904 | −0.2994 | 0.0716 |
| 1.0904 | −0.0213 | 0.0619 |
| 1.0905 | 0.0186 | 0.0601 |
| 1.0906 | −0.0415 | 0.0631 |
| 1.0907 | 0.0383 | 0.0597 |
| 1.0907 | −0.0618 | 0.0646 |
| 1.0908 | −0.2803 | 0.0722 |
| 1.0909 | −0.0821 | 0.0661 |
| 1.0910 | −0.2611 | 0.0726 |
| 1.0910 | 0.0577 | 0.0597 |
| 1.0911 | −0.1024 | 0.0676 |
| 1.0913 | −0.2419 | 0.0729 |
| 1.0913 | −0.1228 | 0.0690 |
| 1.0915 | −0.2225 | 0.0729 |
| 1.0915 | −0.1430 | 0.0703 |
| 1.0916 | 0.0768 | 0.0603 |
| 1.0916 | −0.2029 | 0.0727 |
| 1.0916 | −0.1632 | 0.0714 |
| 1.0917 | −0.1831 | 0.0722 |
| 1.0923 | 0.0956 | 0.0615 |
| 1.0931 | 0.1140 | 0.0631 |
| 1.0941 | 0.1322 | 0.0651 |
| 1.0989 | −0.3187 | 0.0705 |
| 1.0992 | −0.2996 | 0.0711 |
| 1.0992 | −0.0212 | 0.0615 |
| 1.0992 | −0.0412 | 0.0625 |
| 1.0993 | −0.0013 | 0.0608 |
| 1.0993 | −0.0614 | 0.0637 |
| 1.0995 | −0.0816 | 0.0649 |
| 1.0995 | 0.0184 | 0.0604 |
| 1.0995 | −0.2805 | 0.0716 |
| 1.0996 | −0.1019 | 0.0663 |
| 1.0998 | −0.2613 | 0.0720 |
| 1.0998 | 0.0379 | 0.0604 |
| 1.0998 | −0.1222 | 0.0676 |
| 1.1000 | −0.1425 | 0.0689 |
| 1.1000 | −0.2419 | 0.0721 |
| 1.1001 | −0.1627 | 0.0700 |
| 1.1001 | −0.2224 | 0.0720 |
| 1.1002 | −0.1828 | 0.0710 |
| 1.1002 | −0.2027 | 0.0716 |
| 1.1003 | 0.0571 | 0.0609 |
| 1.1009 | 0.0759 | 0.0619 |
| 1.1017 | 0.0945 | 0.0633 |
| 1.1026 | 0.1128 | 0.0650 |
| 1.1036 | 0.1310 | 0.0669 |
| 1.1069 | −0.3570 | 0.0687 |
| 1.1072 | −0.3379 | 0.0694 |
| 1.1076 | −0.3189 | 0.0701 |
| 1.1079 | −0.2998 | 0.0706 |
| 1.1079 | −0.0413 | 0.0621 |
| 1.1079 | −0.0613 | 0.0630 |
| 1.1080 | −0.0214 | 0.0614 |
| 1.1080 | −0.0814 | 0.0641 |
| 1.1081 | −0.1016 | 0.0652 |
| 1.1082 | −0.2806 | 0.0710 |
| 1.1082 | −0.0016 | 0.0610 |
| 1.1082 | −0.1218 | 0.0664 |
| 1.1084 | −0.2613 | 0.0712 |
| 1.1084 | −0.1420 | 0.0676 |
| 1.1085 | 0.0179 | 0.0610 |
| 1.1085 | −0.1622 | 0.0687 |
| 1.1085 | −0.2418 | 0.0712 |
| 1.1086 | −0.1823 | 0.0697 |
| 1.1086 | −0.2222 | 0.0710 |
| 1.1087 | −0.2023 | 0.0704 |
| 1.1089 | 0.0371 | 0.0614 |
| 1.1095 | 0.0561 | 0.0622 |
| 1.1102 | 0.0748 | 0.0633 |
| 1.1110 | 0.0934 | 0.0648 |
| 1.1119 | 0.1117 | 0.0664 |
| 1.1128 | 0.1300 | 0.0682 |
| 1.1153 | −0.3759 | 0.0676 |
| 1.1157 | −0.3569 | 0.0683 |
| 1.1160 | −0.3378 | 0.0690 |
| 1.1163 | −0.3187 | 0.0695 |
| 1.1166 | −0.2995 | 0.0700 |
| 1.1167 | −0.0811 | 0.0634 |
| 1.1167 | −0.0611 | 0.0626 |
| 1.1167 | −0.1011 | 0.0644 |
| 1.1167 | −0.0412 | 0.0620 |
| 1.1168 | −0.1212 | 0.0654 |
| 1.1168 | −0.2802 | 0.0703 |
| 1.1169 | −0.1414 | 0.0664 |
| 1.1169 | −0.0215 | 0.0616 |
| 1.1170 | −0.1615 | 0.0674 |
| 1.1170 | −0.2608 | 0.0704 |
| 1.1171 | −0.1816 | 0.0684 |
| 1.1171 | −0.2412 | 0.0702 |
| 1.1172 | −0.2016 | 0.0692 |
| 1.1172 | −0.2215 | 0.0698 |
| 1.1172 | −0.0019 | 0.0615 |
| 1.1176 | 0.0175 | 0.0618 |
| 1.1181 | 0.0366 | 0.0624 |
| 1.1188 | 0.0555 | 0.0634 |
| 1.1195 | 0.0742 | 0.0646 |
| 1.1203 | 0.0928 | 0.0660 |
| 1.1211 | 0.1113 | 0.0674 |
| 1.1220 | 0.1299 | 0.0689 |
| 1.1239 | −0.3942 | 0.0664 |
| 1.1243 | −0.3751 | 0.0671 |
| 1.1246 | −0.3560 | 0.0678 |
| 1.1249 | −0.3369 | 0.0684 |
| 1.1252 | −0.3178 | 0.0689 |
| 1.1254 | −0.2985 | 0.0693 |
| 1.1255 | −0.1001 | 0.0637 |
| 1.1256 | −0.0801 | 0.0630 |
| 1.1256 | −0.1201 | 0.0646 |
| 1.1256 | −0.1401 | 0.0654 |
| 1.1256 | −0.2791 | 0.0694 |
| 1.1256 | −0.0603 | 0.0624 |
| 1.1257 | −0.1601 | 0.0663 |
| 1.1258 | −0.2596 | 0.0694 |
| 1.1258 | −0.1802 | 0.0672 |
| 1.1258 | −0.0405 | 0.0621 |
| 1.1258 | −0.2002 | 0.0680 |
| 1.1258 | −0.2399 | 0.0691 |
| 1.1258 | −0.2201 | 0.0686 |
| 1.1261 | −0.0209 | 0.0620 |
| 1.1264 | −0.0014 | 0.0621 |
| 1.1269 | 0.0178 | 0.0626 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 1.1275 | 0.0368 | 0.0634 |
| 1.1281 | 0.0557 | 0.0644 |
| 1.1289 | 0.0745 | 0.0655 |
| 1.1296 | 0.0932 | 0.0667 |
| 1.1304 | 0.1119 | 0.0679 |
| 1.1325 | −0.4124 | 0.0652 |
| 1.1328 | −0.3933 | 0.0660 |
| 1.1331 | −0.3742 | 0.0667 |
| 1.1334 | −0.3551 | 0.0673 |
| 1.1337 | −0.3359 | 0.0678 |
| 1.1340 | −0.3167 | 0.0682 |
| 1.1342 | −0.2973 | 0.0684 |
| 1.1343 | −0.2779 | 0.0685 |
| 1.1344 | −0.1389 | 0.0646 |
| 1.1344 | −0.1189 | 0.0639 |
| 1.1344 | −0.1588 | 0.0653 |
| 1.1344 | −0.0990 | 0.0633 |
| 1.1344 | −0.1788 | 0.0661 |
| 1.1344 | −0.2582 | 0.0683 |
| 1.1345 | −0.1987 | 0.0668 |
| 1.1345 | −0.2385 | 0.0679 |
| 1.1345 | −0.2186 | 0.0674 |
| 1.1345 | −0.0792 | 0.0628 |
| 1.1346 | −0.0594 | 0.0624 |
| 1.1349 | −0.0397 | 0.0623 |
| 1.1352 | −0.0202 | 0.0624 |
| 1.1356 | −0.0009 | 0.0628 |
| 1.1362 | 0.0183 | 0.0634 |
| 1.1368 | 0.0373 | 0.0642 |
| 1.1374 | 0.0562 | 0.0651 |
| 1.1380 | 0.0751 | 0.0660 |
| 1.1387 | 0.0940 | 0.0669 |
| 1.1394 | 0.1129 | 0.0678 |
| 1.1408 | −0.4493 | 0.0633 |
| 1.1411 | −0.4301 | 0.0641 |
| 1.1415 | −0.4110 | 0.0648 |
| 1.1418 | −0.3919 | 0.0655 |
| 1.1421 | −0.3728 | 0.0661 |
| 1.1424 | −0.3536 | 0.0667 |
| 1.1426 | −0.3344 | 0.0671 |
| 1.1428 | −0.3151 | 0.0674 |
| 1.1430 | −0.2956 | 0.0675 |
| 1.1431 | −0.2760 | 0.0674 |
| 1.1432 | −0.2564 | 0.0672 |
| 1.1432 | −0.2366 | 0.0668 |
| 1.1432 | −0.1771 | 0.0651 |
| 1.1432 | −0.1970 | 0.0657 |
| 1.1432 | −0.1572 | 0.0645 |
| 1.1432 | −0.2168 | 0.0663 |
| 1.1433 | −0.1374 | 0.0639 |
| 1.1433 | −0.1175 | 0.0634 |
| 1.1434 | −0.0977 | 0.0630 |
| 1.1436 | −0.0779 | 0.0627 |
| 1.1438 | −0.0583 | 0.0625 |
| 1.1441 | −0.0387 | 0.0626 |
| 1.1445 | −0.0192 | 0.0629 |
| 1.1450 | 0.0001 | 0.0633 |
| 1.1455 | 0.0192 | 0.0639 |
| 1.1461 | 0.0384 | 0.0646 |
| 1.1466 | 0.0574 | 0.0653 |
| 1.1472 | 0.0765 | 0.0661 |
| 1.1478 | 0.0956 | 0.0667 |
| 1.1484 | 0.1148 | 0.0673 |
| 1.1500 | −0.4658 | 0.0622 |
| 1.1503 | −0.4466 | 0.0629 |
| 1.1506 | −0.4275 | 0.0636 |
| 1.1509 | −0.4083 | 0.0643 |
| 1.1512 | −0.3892 | 0.0649 |
| 1.1515 | −0.3700 | 0.0655 |
| 1.1517 | −0.3507 | 0.0659 |
| 1.1519 | −0.3314 | 0.0662 |
| 1.1521 | −0.3120 | 0.0664 |
| 1.1522 | −0.2925 | 0.0664 |
| 1.1523 | −0.2729 | 0.0663 |
| 1.1524 | −0.2532 | 0.0660 |
| 1.1524 | −0.2335 | 0.0657 |
| 1.1525 | −0.2138 | 0.0652 |
| 1.1525 | −0.1940 | 0.0648 |
| 1.1525 | −0.1742 | 0.0643 |
| 1.1526 | −0.1544 | 0.0638 |
| 1.1526 | −0.1346 | 0.0634 |
| 1.1528 | −0.1149 | 0.0630 |
| 1.1529 | −0.0951 | 0.0627 |
| 1.1531 | −0.0754 | 0.0626 |
| 1.1534 | −0.0558 | 0.0626 |
| 1.1538 | −0.0362 | 0.0628 |
| 1.1542 | −0.0168 | 0.0632 |
| 1.1547 | 0.0025 | 0.0636 |
| 1.1552 | 0.0218 | 0.0641 |
| 1.1557 | 0.0410 | 0.0647 |
| 1.1562 | 0.0603 | 0.0652 |
| 1.1568 | 0.0795 | 0.0657 |
| 1.1568 | −0.8556 | 0.0493 |
| 1.1573 | 0.0988 | 0.0661 |
| 1.1578 | 0.1182 | 0.0664 |
| 1.1589 | −0.5013 | 0.0603 |
| 1.1592 | −0.4820 | 0.0610 |
| 1.1594 | −0.4628 | 0.0617 |
| 1.1597 | −0.4436 | 0.0624 |
| 1.1600 | −0.4244 | 0.0631 |
| 1.1603 | −0.4053 | 0.0637 |
| 1.1606 | −0.3861 | 0.0643 |
| 1.1608 | −0.3668 | 0.0647 |
| 1.1610 | −0.3475 | 0.0650 |
| 1.1612 | −0.3281 | 0.0653 |
| 1.1614 | −0.3086 | 0.0653 |
| 1.1615 | −0.2891 | 0.0653 |
| 1.1616 | −0.2694 | 0.0651 |
| 1.1616 | −0.2498 | 0.0649 |
| 1.1617 | −0.2301 | 0.0646 |
| 1.1617 | −0.2103 | 0.0642 |
| 1.1618 | −0.1906 | 0.0639 |
| 1.1619 | −0.1708 | 0.0635 |
| 1.1620 | −0.1511 | 0.0632 |
| 1.1621 | −0.1313 | 0.0629 |
| 1.1623 | −0.1116 | 0.0627 |
| 1.1625 | −0.0919 | 0.0625 |
| 1.1628 | −0.0722 | 0.0626 |
| 1.1631 | −0.0527 | 0.0627 |
| 1.1635 | −0.0332 | 0.0629 |
| 1.1639 | −0.0138 | 0.0633 |
| 1.1644 | 0.0055 | 0.0637 |
| 1.1648 | 0.0248 | 0.0641 |
| 1.1653 | 0.0441 | 0.0644 |
| 1.1656 | −0.8528 | 0.0481 |
| 1.1658 | 0.0634 | 0.0648 |
| 1.1662 | 0.0827 | 0.0651 |
| 1.1667 | 0.1021 | 0.0652 |
| 1.1677 | −0.5183 | 0.0591 |
| 1.1679 | −0.4990 | 0.0598 |
| 1.1682 | −0.4797 | 0.0605 |
| 1.1685 | −0.4606 | 0.0612 |
| 1.1687 | −0.4414 | 0.0619 |
| 1.1690 | −0.4222 | 0.0625 |
| 1.1693 | −0.4030 | 0.0630 |
| 1.1695 | −0.3838 | 0.0635 |
| 1.1697 | −0.3645 | 0.0639 |
| 1.1699 | −0.3451 | 0.0641 |
| 1.1701 | −0.3256 | 0.0643 |
| 1.1702 | −0.3061 | 0.0643 |
| 1.1703 | −0.2865 | 0.0642 |
| 1.1704 | −0.2668 | 0.0641 |
| 1.1705 | −0.2471 | 0.0639 |
| 1.1706 | −0.2275 | 0.0637 |
| 1.1707 | −0.2077 | 0.0634 |
| 1.1708 | −0.1880 | 0.0631 |
| 1.1709 | −0.1683 | 0.0629 |
| 1.1710 | −0.1485 | 0.0627 |
| 1.1712 | −0.1288 | 0.0625 |
| 1.1714 | −0.1091 | 0.0624 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 1.1717 | −0.0894 | 0.0624 |
| 1.1720 | −0.0698 | 0.0625 |
| 1.1723 | −0.0503 | 0.0627 |
| 1.1727 | −0.0309 | 0.0629 |
| 1.1731 | −0.0116 | 0.0632 |
| 1.1735 | 0.0078 | 0.0635 |
| 1.1739 | −0.8504 | 0.0467 |
| 1.1740 | 0.0271 | 0.0638 |
| 1.1744 | 0.0464 | 0.0640 |
| 1.1748 | 0.0658 | 0.0641 |
| 1.1752 | 0.0852 | 0.0642 |
| 1.1756 | 0.1047 | 0.0641 |
| 1.1759 | −0.5553 | 0.0572 |
| 1.1761 | −0.5359 | 0.0579 |
| 1.1764 | −0.5166 | 0.0586 |
| 1.1766 | −0.4974 | 0.0593 |
| 1.1769 | −0.4781 | 0.0600 |
| 1.1772 | −0.4590 | 0.0607 |
| 1.1774 | −0.4398 | 0.0613 |
| 1.1777 | −0.4206 | 0.0618 |
| 1.1779 | −0.4013 | 0.0623 |
| 1.1781 | −0.3820 | 0.0627 |
| 1.1783 | −0.3626 | 0.0630 |
| 1.1785 | −0.3432 | 0.0632 |
| 1.1786 | −0.3236 | 0.0633 |
| 1.1788 | −0.3041 | 0.0633 |
| 1.1789 | −0.2845 | 0.0633 |
| 1.1790 | −0.2649 | 0.0632 |
| 1.1791 | −0.2452 | 0.0630 |
| 1.1792 | −0.2256 | 0.0629 |
| 1.1793 | −0.2059 | 0.0627 |
| 1.1795 | −0.1862 | 0.0625 |
| 1.1796 | −0.1665 | 0.0624 |
| 1.1798 | −0.1467 | 0.0623 |
| 1.1800 | −0.1270 | 0.0622 |
| 1.1803 | −0.1074 | 0.0622 |
| 1.1806 | −0.0877 | 0.0623 |
| 1.1809 | −0.0682 | 0.0624 |
| 1.1812 | −0.0487 | 0.0626 |
| 1.1816 | −0.0293 | 0.0628 |
| 1.1820 | −0.0099 | 0.0630 |
| 1.1823 | −0.8475 | 0.0454 |
| 1.1823 | 0.0095 | 0.0631 |
| 1.1827 | 0.0289 | 0.0632 |
| 1.1831 | 0.0484 | 0.0633 |
| 1.1834 | 0.0679 | 0.0633 |
| 1.1838 | 0.0874 | 0.0632 |
| 1.1840 | 0.1069 | 0.0629 |
| 1.1844 | −0.5727 | 0.0560 |
| 1.1846 | −0.5533 | 0.0567 |
| 1.1849 | −0.5340 | 0.0574 |
| 1.1851 | −0.5147 | 0.0581 |
| 1.1854 | −0.4955 | 0.0588 |
| 1.1856 | −0.4763 | 0.0594 |
| 1.1859 | −0.4570 | 0.0600 |
| 1.1861 | −0.4378 | 0.0606 |
| 1.1863 | −0.4186 | 0.0610 |
| 1.1865 | −0.3992 | 0.0614 |
| 1.1867 | −0.3799 | 0.0618 |
| 1.1869 | −0.3604 | 0.0620 |
| 1.1871 | −0.3410 | 0.0622 |
| 1.1872 | −0.3215 | 0.0623 |
| 1.1874 | −0.3019 | 0.0624 |
| 1.1875 | −0.2824 | 0.0624 |
| 1.1876 | −0.2628 | 0.0624 |
| 1.1878 | −0.2432 | 0.0623 |
| 1.1879 | −0.2235 | 0.0622 |
| 1.1881 | −0.2039 | 0.0621 |
| 1.1882 | −0.1842 | 0.0621 |
| 1.1884 | −0.1645 | 0.0620 |
| 1.1886 | −0.1448 | 0.0620 |
| 1.1889 | −0.1251 | 0.0620 |
| 1.1891 | −0.1054 | 0.0620 |
| 1.1894 | −0.0858 | 0.0621 |
| 1.1897 | −0.0662 | 0.0622 |
| 1.1901 | −0.0467 | 0.0623 |
| 1.1904 | −0.0272 | 0.0624 |
| 1.1907 | −0.8638 | 0.0430 |
| 1.1907 | −0.0078 | 0.0624 |
| 1.1908 | −0.8442 | 0.0441 |
| 1.1911 | 0.0117 | 0.0625 |
| 1.1914 | 0.0312 | 0.0624 |
| 1.1917 | 0.0508 | 0.0624 |
| 1.1920 | 0.0704 | 0.0622 |
| 1.1923 | 0.0899 | 0.0619 |
| 1.1925 | 0.1094 | 0.0615 |
| 1.1929 | −0.5898 | 0.0547 |
| 1.1932 | −0.5704 | 0.0554 |
| 1.1934 | −0.5511 | 0.0562 |
| 1.1936 | −0.5318 | 0.0569 |
| 1.1939 | −0.5125 | 0.0575 |
| 1.1941 | −0.4933 | 0.0581 |
| 1.1943 | −0.4740 | 0.0587 |
| 1.1946 | −0.4548 | 0.0593 |
| 1.1948 | −0.4355 | 0.0598 |
| 1.1950 | −0.4162 | 0.0602 |
| 1.1952 | −0.3969 | 0.0606 |
| 1.1954 | −0.3775 | 0.0609 |
| 1.1956 | −0.3580 | 0.0611 |
| 1.1957 | −0.3386 | 0.0613 |
| 1.1959 | −0.3191 | 0.0615 |
| 1.1960 | −0.2996 | 0.0616 |
| 1.1962 | −0.2800 | 0.0616 |
| 1.1964 | −0.2605 | 0.0616 |
| 1.1965 | −0.2409 | 0.0616 |
| 1.1967 | −0.2212 | 0.0616 |
| 1.1969 | −0.2016 | 0.0616 |
| 1.1971 | −0.1819 | 0.0616 |
| 1.1973 | −0.1622 | 0.0616 |
| 1.1975 | −0.1425 | 0.0616 |
| 1.1977 | −0.1228 | 0.0616 |
| 1.1980 | −0.1031 | 0.0617 |
| 1.1983 | −0.0835 | 0.0617 |
| 1.1986 | −0.0639 | 0.0617 |
| 1.1989 | −0.0443 | 0.0618 |
| 1.1992 | −0.0248 | 0.0618 |
| 1.1992 | −0.8604 | 0.0419 |
| 1.1994 | −0.8409 | 0.0430 |
| 1.1995 | −0.0052 | 0.0617 |
| 1.1995 | −0.8213 | 0.0440 |
| 1.1998 | 0.0144 | 0.0616 |
| 1.2001 | 0.0340 | 0.0615 |
| 1.2003 | 0.0536 | 0.0612 |
| 1.2006 | 0.0732 | 0.0609 |
| 1.2008 | 0.0927 | 0.0606 |
| 1.2013 | −0.6261 | 0.0526 |
| 1.2015 | −0.6066 | 0.0534 |
| 1.2017 | −0.5872 | 0.0542 |
| 1.2020 | −0.5678 | 0.0549 |
| 1.2022 | −0.5485 | 0.0556 |
| 1.2024 | −0.5292 | 0.0562 |
| 1.2026 | −0.5100 | 0.0569 |
| 1.2029 | −0.4907 | 0.0575 |
| 1.2031 | −0.4715 | 0.0580 |
| 1.2033 | −0.4522 | 0.0585 |
| 1.2035 | −0.4329 | 0.0590 |
| 1.2037 | −0.4135 | 0.0594 |
| 1.2039 | −0.3942 | 0.0597 |
| 1.2041 | −0.3748 | 0.0600 |
| 1.2043 | −0.3553 | 0.0603 |
| 1.2045 | −0.3359 | 0.0605 |
| 1.2046 | −0.3164 | 0.0607 |
| 1.2048 | −0.2969 | 0.0608 |
| 1.2050 | −0.2774 | 0.0609 |
| 1.2052 | −0.2578 | 0.0610 |
| 1.2053 | −0.2382 | 0.0610 |
| 1.2055 | −0.2186 | 0.0611 |
| 1.2057 | −0.1989 | 0.0611 |
| 1.2059 | −0.1792 | 0.0611 |
| 1.2062 | −0.1595 | 0.0612 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 1.2064 | −0.1398 | 0.0612 |
| 1.2066 | −0.1201 | 0.0612 |
| 1.2069 | −0.1004 | 0.0612 |
| 1.2072 | −0.0808 | 0.0612 |
| 1.2074 | −0.0611 | 0.0611 |
| 1.2077 | −0.0415 | 0.0611 |
| 1.2079 | −0.8569 | 0.0409 |
| 1.2080 | −0.0219 | 0.0610 |
| 1.2080 | −0.8374 | 0.0420 |
| 1.2082 | −0.0023 | 0.0608 |
| 1.2082 | −0.8179 | 0.0431 |
| 1.2085 | 0.0174 | 0.0606 |
| 1.2087 | 0.0371 | 0.0603 |
| 1.2090 | 0.0567 | 0.0600 |
| 1.2092 | 0.0762 | 0.0596 |
| 1.2094 | 0.0955 | 0.0592 |
| 1.2099 | −0.6425 | 0.0513 |
| 1.2102 | −0.6231 | 0.0521 |
| 1.2104 | −0.6036 | 0.0528 |
| 1.2106 | −0.5843 | 0.0536 |
| 1.2108 | −0.5650 | 0.0543 |
| 1.2110 | −0.5457 | 0.0549 |
| 1.2112 | −0.5264 | 0.0556 |
| 1.2114 | −0.5071 | 0.0562 |
| 1.2117 | −0.4879 | 0.0567 |
| 1.2119 | −0.4686 | 0.0573 |
| 1.2121 | −0.4493 | 0.0577 |
| 1.2123 | −0.4299 | 0.0582 |
| 1.2125 | −0.4106 | 0.0586 |
| 1.2127 | −0.3912 | 0.0589 |
| 1.2129 | −0.3718 | 0.0592 |
| 1.2131 | −0.3524 | 0.0595 |
| 1.2132 | −0.3330 | 0.0598 |
| 1.2134 | −0.3135 | 0.0600 |
| 1.2136 | −0.2940 | 0.0601 |
| 1.2138 | −0.2745 | 0.0603 |
| 1.2140 | −0.2549 | 0.0604 |
| 1.2142 | −0.2353 | 0.0605 |
| 1.2144 | −0.2156 | 0.0605 |
| 1.2146 | −0.1959 | 0.0606 |
| 1.2148 | −0.1762 | 0.0606 |
| 1.2151 | −0.1564 | 0.0606 |
| 1.2153 | −0.1367 | 0.0606 |
| 1.2155 | −0.1170 | 0.0606 |
| 1.2158 | −0.0973 | 0.0606 |
| 1.2160 | −0.0776 | 0.0605 |
| 1.2162 | −0.0580 | 0.0604 |
| 1.2164 | −0.8727 | 0.0390 |
| 1.2165 | −0.0383 | 0.0602 |
| 1.2166 | −0.8533 | 0.0401 |
| 1.2167 | −0.0186 | 0.0600 |
| 1.2168 | −0.8339 | 0.0413 |
| 1.2170 | 0.0011 | 0.0598 |
| 1.2170 | −0.8145 | 0.0423 |
| 1.2172 | 0.0208 | 0.0595 |
| 1.2174 | 0.0404 | 0.0592 |
| 1.2176 | 0.0599 | 0.0588 |
| 1.2178 | 0.0792 | 0.0584 |
| 1.2180 | 0.0987 | 0.0579 |
| 1.2186 | −0.6587 | 0.0499 |
| 1.2188 | −0.6392 | 0.0507 |
| 1.2190 | −0.6198 | 0.0515 |
| 1.2192 | −0.6005 | 0.0522 |
| 1.2194 | −0.5811 | 0.0530 |
| 1.2196 | −0.5618 | 0.0536 |
| 1.2198 | −0.5426 | 0.0543 |
| 1.2200 | −0.5233 | 0.0549 |
| 1.2203 | −0.5040 | 0.0555 |
| 1.2205 | −0.4847 | 0.0560 |
| 1.2207 | −0.4654 | 0.0565 |
| 1.2209 | −0.4461 | 0.0570 |
| 1.2211 | −0.4267 | 0.0574 |
| 1.2213 | −0.4074 | 0.0578 |
| 1.2215 | −0.3880 | 0.0582 |
| 1.2217 | −0.3686 | 0.0585 |
| 1.2219 | −0.3492 | 0.0588 |
| 1.2221 | −0.3298 | 0.0591 |
| 1.2223 | −0.3103 | 0.0593 |
| 1.2225 | −0.2908 | 0.0595 |
| 1.2227 | −0.2713 | 0.0596 |
| 1.2229 | −0.2517 | 0.0598 |
| 1.2231 | −0.2320 | 0.0599 |
| 1.2233 | −0.2123 | 0.0600 |
| 1.2235 | −0.1926 | 0.0600 |
| 1.2237 | −0.1728 | 0.0600 |
| 1.2240 | −0.1531 | 0.0600 |
| 1.2242 | −0.1333 | 0.0600 |
| 1.2244 | −0.1136 | 0.0599 |
| 1.2246 | −0.0939 | 0.0598 |
| 1.2248 | −0.0742 | 0.0597 |
| 1.2251 | −0.0545 | 0.0595 |
| 1.2252 | −0.8690 | 0.0383 |
| 1.2253 | −0.0348 | 0.0593 |
| 1.2254 | −0.8496 | 0.0395 |
| 1.2255 | −0.0151 | 0.0591 |
| 1.2256 | −0.8302 | 0.0406 |
| 1.2257 | 0.0046 | 0.0588 |
| 1.2258 | −0.8109 | 0.0417 |
| 1.2259 | 0.0243 | 0.0585 |
| 1.2261 | 0.0438 | 0.0581 |
| 1.2263 | 0.0631 | 0.0577 |
| 1.2265 | 0.0825 | 0.0573 |
| 1.2270 | −0.6941 | 0.0476 |
| 1.2272 | −0.6746 | 0.0485 |
| 1.2274 | −0.6552 | 0.0493 |
| 1.2276 | −0.6357 | 0.0501 |
| 1.2279 | −0.6164 | 0.0509 |
| 1.2281 | −0.5970 | 0.0516 |
| 1.2283 | −0.5777 | 0.0523 |
| 1.2285 | −0.5585 | 0.0530 |
| 1.2287 | −0.5392 | 0.0536 |
| 1.2289 | −0.5199 | 0.0542 |
| 1.2291 | −0.5006 | 0.0548 |
| 1.2293 | −0.4813 | 0.0553 |
| 1.2295 | −0.4620 | 0.0558 |
| 1.2297 | −0.4427 | 0.0563 |
| 1.2299 | −0.4233 | 0.0567 |
| 1.2301 | −0.4040 | 0.0571 |
| 1.2303 | −0.3846 | 0.0575 |
| 1.2305 | −0.3652 | 0.0578 |
| 1.2307 | −0.3458 | 0.0581 |
| 1.2309 | −0.3263 | 0.0584 |
| 1.2311 | −0.3068 | 0.0586 |
| 1.2313 | −0.2873 | 0.0588 |
| 1.2316 | −0.2677 | 0.0590 |
| 1.2318 | −0.2481 | 0.0591 |
| 1.2320 | −0.2284 | 0.0592 |
| 1.2322 | −0.2086 | 0.0593 |
| 1.2324 | −0.1889 | 0.0593 |
| 1.2326 | −0.1691 | 0.0593 |
| 1.2328 | −0.1494 | 0.0593 |
| 1.2330 | −0.1296 | 0.0592 |
| 1.2332 | −0.1099 | 0.0591 |
| 1.2334 | −0.0902 | 0.0590 |
| 1.2337 | −0.0705 | 0.0588 |
| 1.2339 | −0.0508 | 0.0586 |
| 1.2340 | −0.8652 | 0.0378 |
| 1.2341 | −0.0310 | 0.0584 |
| 1.2342 | −0.8458 | 0.0389 |
| 1.2343 | −0.0113 | 0.0581 |
| 1.2344 | −0.8264 | 0.0400 |
| 1.2345 | 0.0083 | 0.0578 |
| 1.2346 | −0.8071 | 0.0411 |
| 1.2347 | 0.0278 | 0.0575 |
| 1.2348 | −0.7877 | 0.0422 |
| 1.2349 | 0.0471 | 0.0571 |
| 1.2351 | 0.0666 | 0.0567 |
| 1.2353 | 0.0862 | 0.0563 |
| 1.2355 | −0.7293 | 0.0452 |
| 1.2357 | −0.7098 | 0.0461 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 1.2359 | −0.6903 | 0.0470 |
| 1.2361 | −0.6708 | 0.0479 |
| 1.2363 | −0.6514 | 0.0487 |
| 1.2365 | −0.6320 | 0.0495 |
| 1.2367 | −0.6127 | 0.0503 |
| 1.2369 | −0.5934 | 0.0510 |
| 1.2371 | −0.5742 | 0.0517 |
| 1.2373 | −0.5549 | 0.0523 |
| 1.2375 | −0.5356 | 0.0530 |
| 1.2377 | −0.5163 | 0.0535 |
| 1.2379 | −0.4970 | 0.0541 |
| 1.2381 | −0.4777 | 0.0546 |
| 1.2383 | −0.4584 | 0.0551 |
| 1.2385 | −0.4390 | 0.0556 |
| 1.2388 | −0.4197 | 0.0560 |
| 1.2390 | −0.4003 | 0.0564 |
| 1.2392 | −0.3809 | 0.0568 |
| 1.2394 | −0.3615 | 0.0571 |
| 1.2396 | −0.3421 | 0.0574 |
| 1.2398 | −0.3226 | 0.0577 |
| 1.2400 | −0.3031 | 0.0579 |
| 1.2402 | −0.2835 | 0.0581 |
| 1.2404 | −0.2638 | 0.0583 |
| 1.2406 | −0.2441 | 0.0584 |
| 1.2408 | −0.2244 | 0.0585 |
| 1.2410 | −0.2046 | 0.0585 |
| 1.2412 | −0.1849 | 0.0586 |
| 1.2415 | −0.1651 | 0.0586 |
| 1.2417 | −0.1454 | 0.0585 |
| 1.2419 | −0.1257 | 0.0584 |
| 1.2421 | −0.1060 | 0.0583 |
| 1.2423 | −0.0863 | 0.0582 |
| 1.2425 | −0.0665 | 0.0580 |
| 1.2427 | −0.0468 | 0.0578 |
| 1.2429 | −0.8611 | 0.0372 |
| 1.2429 | −0.0271 | 0.0576 |
| 1.2431 | −0.8418 | 0.0384 |
| 1.2431 | −0.0074 | 0.0573 |
| 1.2433 | −0.8224 | 0.0395 |
| 1.2433 | 0.0121 | 0.0570 |
| 1.2435 | −0.8030 | 0.0406 |
| 1.2435 | 0.0313 | 0.0566 |
| 1.2437 | −0.7836 | 0.0417 |
| 1.2438 | 0.0508 | 0.0563 |
| 1.2439 | −0.7642 | 0.0427 |
| 1.2440 | 0.0704 | 0.0558 |
| 1.2441 | −0.7447 | 0.0437 |
| 1.2442 | 0.0899 | 0.0554 |
| 1.2443 | −0.7252 | 0.0446 |
| 1.2445 | −0.7057 | 0.0456 |
| 1.2447 | −0.6862 | 0.0464 |
| 1.2449 | −0.6668 | 0.0473 |
| 1.2451 | −0.6475 | 0.0481 |
| 1.2453 | −0.6281 | 0.0489 |
| 1.2456 | −0.6089 | 0.0497 |
| 1.2458 | −0.5896 | 0.0504 |
| 1.2460 | −0.5703 | 0.0510 |
| 1.2462 | −0.5511 | 0.0517 |
| 1.2464 | −0.5318 | 0.0523 |
| 1.2466 | −0.5125 | 0.0529 |
| 1.2468 | −0.4932 | 0.0535 |
| 1.2470 | −0.4739 | 0.0540 |
| 1.2472 | −0.4545 | 0.0545 |
| 1.2474 | −0.4352 | 0.0549 |
| 1.2476 | −0.4158 | 0.0553 |
| 1.2478 | −0.3964 | 0.0557 |
| 1.2480 | −0.3770 | 0.0561 |
| 1.2482 | −0.3576 | 0.0564 |
| 1.2484 | −0.3381 | 0.0567 |
| 1.2486 | −0.3186 | 0.0569 |
| 1.2488 | −0.2990 | 0.0572 |
| 1.2491 | −0.2794 | 0.0574 |
| 1.2493 | −0.2597 | 0.0575 |
| 1.2495 | −0.2399 | 0.0576 |
| 1.2497 | −0.2202 | 0.0577 |
| 1.2499 | −0.2004 | 0.0578 |
| 1.2501 | −0.1807 | 0.0578 |
| 1.2503 | −0.1610 | 0.0578 |
| 1.2505 | −0.1412 | 0.0577 |
| 1.2507 | −0.1215 | 0.0577 |
| 1.2509 | −0.1018 | 0.0576 |
| 1.2511 | −0.0821 | 0.0574 |
| 1.2514 | −0.0624 | 0.0572 |
| 1.2515 | −0.8763 | 0.0356 |
| 1.2516 | −0.0427 | 0.0570 |
| 1.2517 | −0.8569 | 0.0367 |
| 1.2518 | −0.0230 | 0.0567 |
| 1.2519 | −0.8376 | 0.0379 |
| 1.2520 | −0.0035 | 0.0565 |
| 1.2521 | −0.8182 | 0.0390 |
| 1.2522 | 0.0158 | 0.0561 |
| 1.2523 | −0.7988 | 0.0401 |
| 1.2524 | 0.0352 | 0.0558 |
| 1.2525 | −0.7793 | 0.0411 |
| 1.2526 | 0.0548 | 0.0554 |
| 1.2527 | −0.7598 | 0.0421 |
| 1.2528 | 0.0744 | 0.0550 |
| 1.2530 | −0.7403 | 0.0431 |
| 1.2532 | −0.7208 | 0.0441 |
| 1.2534 | −0.7014 | 0.0450 |
| 1.2536 | −0.6820 | 0.0459 |
| 1.2538 | −0.6627 | 0.0467 |
| 1.2540 | −0.6433 | 0.0475 |
| 1.2542 | −0.6241 | 0.0483 |
| 1.2544 | −0.6048 | 0.0490 |
| 1.2546 | −0.5856 | 0.0497 |
| 1.2548 | −0.5663 | 0.0504 |
| 1.2550 | −0.5470 | 0.0511 |
| 1.2552 | −0.5277 | 0.0517 |
| 1.2554 | −0.5084 | 0.0523 |
| 1.2556 | −0.4891 | 0.0528 |
| 1.2558 | −0.4698 | 0.0533 |
| 1.2560 | −0.4504 | 0.0538 |
| 1.2562 | −0.4311 | 0.0542 |
| 1.2564 | −0.4117 | 0.0547 |
| 1.2567 | −0.3923 | 0.0550 |
| 1.2569 | −0.3729 | 0.0554 |
| 1.2571 | −0.3534 | 0.0557 |
| 1.2573 | −0.3339 | 0.0560 |
| 1.2575 | −0.3143 | 0.0562 |
| 1.2577 | −0.2947 | 0.0565 |
| 1.2579 | −0.2750 | 0.0566 |
| 1.2581 | −0.2552 | 0.0568 |
| 1.2583 | −0.2355 | 0.0569 |
| 1.2585 | −0.2157 | 0.0570 |
| 1.2587 | −0.1960 | 0.0570 |
| 1.2589 | −0.1763 | 0.0570 |
| 1.2592 | −0.1566 | 0.0570 |
| 1.2594 | −0.1369 | 0.0570 |
| 1.2596 | −0.1171 | 0.0569 |
| 1.2598 | −0.0974 | 0.0568 |
| 1.2600 | −0.0777 | 0.0566 |
| 1.2602 | −0.0580 | 0.0564 |
| 1.2603 | −0.8718 | 0.0351 |
| 1.2604 | −0.0383 | 0.0562 |
| 1.2605 | −0.8525 | 0.0362 |
| 1.2606 | −0.0189 | 0.0559 |
| 1.2608 | −0.8331 | 0.0374 |
| 1.2608 | 0.0004 | 0.0556 |
| 1.2610 | −0.8137 | 0.0385 |
| 1.2610 | 0.0198 | 0.0553 |
| 1.2612 | −0.7942 | 0.0396 |
| 1.2612 | 0.0394 | 0.0550 |
| 1.2614 | −0.7747 | 0.0406 |
| 1.2614 | 0.0590 | 0.0546 |
| 1.2616 | −0.7552 | 0.0416 |
| 1.2617 | 0.0785 | 0.0541 |
| 1.2618 | −0.7358 | 0.0426 |
| 1.2620 | −0.7163 | 0.0435 |
| 1.2622 | −0.6969 | 0.0444 |

TABLE 6-continued

Normalized Platform (ID) Coordinates (Blades)
Tolerance: ±0.05" (±1.27 mm)

| $X_P/B_{Xroot}$ | $Y_P/\tau_{root}$ | $S_P$ |
|---|---|---|
| 1.2624 | −0.6776 | 0.0453 |
| 1.2626 | −0.6583 | 0.0461 |
| 1.2628 | −0.6390 | 0.0469 |
| 1.2630 | −0.6198 | 0.0477 |
| 1.2632 | −0.6005 | 0.0484 |
| 1.2634 | −0.5813 | 0.0491 |
| 1.2636 | −0.5620 | 0.0498 |
| 1.2638 | −0.5427 | 0.0504 |
| 1.2640 | −0.5234 | 0.0510 |
| 1.2643 | −0.5041 | 0.0516 |
| 1.2645 | −0.4848 | 0.0522 |
| 1.2647 | −0.4654 | 0.0527 |
| 1.2649 | −0.4461 | 0.0531 |
| 1.2651 | −0.4267 | 0.0536 |
| 1.2653 | −0.4073 | 0.0540 |
| 1.2655 | −0.3879 | 0.0544 |
| 1.2657 | −0.3684 | 0.0547 |
| 1.2659 | −0.3489 | 0.0550 |
| 1.2661 | −0.3293 | 0.0553 |
| 1.2663 | −0.3097 | 0.0555 |
| 1.2665 | −0.2900 | 0.0557 |
| 1.2667 | −0.2703 | 0.0559 |
| 1.2669 | −0.2505 | 0.0561 |
| 1.2672 | −0.2308 | 0.0562 |
| 1.2674 | −0.2111 | 0.0562 |
| 1.2676 | −0.1914 | 0.0563 |
| 1.2678 | −0.1716 | 0.0563 |
| 1.2680 | −0.1519 | 0.0563 |
| 1.2682 | −0.1322 | 0.0562 |
| 1.2684 | −0.1125 | 0.0561 |
| 1.2686 | −0.0928 | 0.0560 |
| 1.2688 | −0.0731 | 0.0558 |
| 1.2690 | −0.8864 | 0.0334 |
| 1.2690 | −0.0535 | 0.0556 |
| 1.2692 | −0.8671 | 0.0346 |
| 1.2692 | −0.0340 | 0.0554 |
| 1.2694 | −0.8477 | 0.0358 |
| 1.2695 | −0.0147 | 0.0551 |
| 1.2696 | −0.8283 | 0.0369 |
| 1.2697 | 0.0047 | 0.0548 |
| 1.2698 | −0.8089 | 0.0380 |
| 1.2699 | 0.0243 | 0.0545 |
| 1.2700 | −0.7894 | 0.0391 |
| 1.2701 | 0.0439 | 0.0541 |
| 1.2702 | −0.7699 | 0.0401 |
| 1.2703 | 0.0634 | 0.0537 |
| 1.2704 | −0.7504 | 0.0411 |
| 1.2705 | 0.0829 | 0.0533 |
| 1.2706 | −0.7310 | 0.0421 |
| 1.2708 | −0.7116 | 0.0430 |
| 1.2710 | −0.6923 | 0.0439 |
| 1.2712 | −0.6730 | 0.0447 |
| 1.2714 | −0.6537 | 0.0456 |
| 1.2716 | −0.6345 | 0.0464 |
| 1.2718 | −0.6153 | 0.0471 |
| 1.2720 | −0.5960 | 0.0478 |
| 1.2722 | −0.5768 | 0.0485 |
| 1.2724 | −0.5575 | 0.0492 |
| 1.2727 | −0.5382 | 0.0498 |
| 1.2729 | −0.5189 | 0.0504 |
| 1.2731 | −0.4995 | 0.0510 |
| 1.2733 | −0.4802 | 0.0515 |
| 1.2735 | −0.4609 | 0.0520 |
| 1.2737 | −0.4415 | 0.0525 |
| 1.2739 | −0.4221 | 0.0529 |
| 1.2741 | −0.4027 | 0.0533 |
| 1.2743 | −0.3832 | 0.0537 |
| 1.2745 | −0.3637 | 0.0540 |
| 1.2747 | −0.3441 | 0.0543 |
| 1.2749 | −0.3245 | 0.0546 |
| 1.2751 | −0.3048 | 0.0548 |
| 1.2753 | −0.2851 | 0.0550 |
| 1.2756 | −0.2654 | 0.0552 |
| 1.2758 | −0.2456 | 0.0553 |
| 1.2760 | −0.2259 | 0.0554 |
| 1.2762 | −0.2062 | 0.0555 |
| 1.2764 | −0.1865 | 0.0555 |
| 1.2766 | −0.1668 | 0.0555 |
| 1.2768 | −0.1471 | 0.0555 |
| 1.2770 | −0.1274 | 0.0554 |
| 1.2772 | −0.1076 | 0.0553 |
| 1.2774 | −0.0880 | 0.0552 |
| 1.2776 | −0.0683 | 0.0550 |
| 1.2777 | −0.8815 | 0.0329 |
| 1.2779 | −0.0488 | 0.0548 |
| 1.2779 | −0.8621 | 0.0341 |
| 1.2781 | −0.0295 | 0.0545 |
| 1.2781 | −0.8427 | 0.0353 |
| 1.2783 | −0.0101 | 0.0543 |
| 1.2784 | −0.8233 | 0.0364 |
| 1.2785 | 0.0095 | 0.0540 |
| 1.2786 | −0.8038 | 0.0375 |
| 1.2787 | 0.0291 | 0.0536 |
| 1.2788 | −0.7843 | 0.0386 |
| 1.2789 | 0.0486 | 0.0532 |
| 1.2790 | −0.7649 | 0.0396 |
| 1.2791 | 0.0680 | 0.0528 |
| 1.2792 | −0.7454 | 0.0406 |
| 1.2794 | −0.7261 | 0.0415 |
| 1.2796 | −0.7067 | 0.0425 |
| 1.2798 | −0.6874 | 0.0433 |
| 1.2800 | −0.6682 | 0.0442 |
| — | — | — |
| — | — | — |

While the invention is described with reference to exemplary embodiments, it will be understood by those skilled in the art that various changes may be made and equivalents may be substituted without departing from the spirit and scope of the invention, and modifications may be made to adapt particular situations or materials to the teachings of the invention without departing from the essential scope thereof. The invention is thus not limited to the particular embodiments disclosed herein, but includes all embodiments falling within the scope of the appended claims.

The invention claimed is:

1. An airfoil comprising:
   an external surface formed in substantial conformance with a plurality of cross sections of the airfoil, each of the cross sections having an axial chord and an offset at a corresponding fractional span as set forth in Table 2 herein;
   wherein each of the cross sections is described by a set of Cartesian coordinates defined at the corresponding fractional span as set forth in Table 4 herein.

2. The airfoil of claim 1, wherein each of the cross sections comprises a chord length defined by scaling the axial chord to a root chord of the airfoil, a height defined by scaling the fractional span to a span height of the airfoil, and a displacement defined by scaling the offset to the root chord and a root pitch of the airfoil.

3. The airfoil of claim 2, wherein each of the cross sections comprises a set of airfoil coordinates describing the external surface, the airfoil coordinates being determined by scaling the set of Cartesian coordinates to the chord length and adding the displacement.

4. The airfoil of claim 2, wherein each of the cross sections comprises a radial height determined by adding a root radius of the airfoil to the height of the cross section, and wherein the root radius is between 4.0 inches and 8.0 inches (or between 102 mm and 203 mm).

5. The airfoil of claim 2, wherein the span height is between 1.0 inches and 2.0 inches (or between 25.4 mm and 50.8 mm).

6. The airfoil of claim 5, wherein the span height is about 1.56±0.05 inches (or about 39.6±1.3 mm) and the root radius is about 6.70±0.10 inches (or about 170.2±2.5 mm).

7. The airfoil of claim 3, wherein the span height is between 0.5 inches and 2.5 inches (or between 12.7 mm and 63.5 mm), wherein the root chord is between 0.375 inches and 1.5 inches (or between 9.5 mm and 38.1 mm), and wherein the root pitch is between 0.5 inches and 2.0 inches (or between 12.7 mm and 50.8 mm).

8. The airfoil of claim 7, wherein the span height is about 1.56±0.05 inches (or about 39.6±1.3 mm), wherein the root chord is about 0.74±0.05 inches (or about 18.8±1.3 mm), and wherein the root pitch is about 0.96±0.05 inches (or about 24.4±1.3 mm).

9. The airfoil of claim 1, further comprising a platform attached to the airfoil at a root section.

10. The airfoil of claim 9, wherein the platform is defined in conformance with platform coordinates as set forth in Table 6 herein.

11. A blade comprising:
   an airfoil formed in substantial conformance with a plurality of cross sections defining an external surface of the blade; and
   a platform attached to a root section of the airfoil;
   wherein each of the cross sections has an axial chord and an offset at a corresponding fractional span as set forth in Table 2 herein; and
   wherein each of the cross sections is described by a set of Cartesian coordinates defined at the corresponding fractional span as set forth in Table 4 herein.

12. The blade of claim 11, wherein the platform is formed in substantial conformance with platform coordinates as set forth in Table 6 herein.

13. The blade of claim 11, wherein each of the cross sections comprises a set of airfoil coordinates defined on the external surface of the blade by scaling the set of Cartesian coordinates to the chord length and adding the displacement.

14. The blade of claim 13, wherein each of the cross sections comprises a height defined by scaling the fractional span to a span height between 1.0 inches and 2.0 inches (or between 25.4 mm and 50.8 mm).

15. The blade of claim 14, wherein each of the cross sections comprises:
   a chord length defined by scaling the axial chord to a root chord between 0.5 inches and 1.0 inches (or between 12.7 mm and 25.4 mm); and
   a displacement defined by scaling the offset to the root chord and a root pitch between 0.5 inches and 1.5 inches (or between 12.7 mm and 38.1 mm).

16. A turbine assembly comprising:
   a plurality of rotor airfoils arranged circumferentially about a turbine axis, each of the rotor airfoils being formed in substantial conformance with a plurality of blade sections, each of the blade sections having an axial chord and an offset at a corresponding fractional span as set forth in Table 2 herein;
   wherein each of the blade sections is described by a set of Cartesian coordinates defined at the corresponding fractional span as set forth in Table 4 herein.

17. The turbine assembly of claim 16, further comprising a plurality of stator airfoils arranged circumferentially about the turbine axis, each of the stator airfoils being formed in substantial conformance with a plurality of vane sections, each of the vane sections having an axial chord and an offset at a corresponding fractional span as set forth in Table 1 herein, wherein each of the vane sections is described by a set of Cartesian coordinates defined at the corresponding fractional span as set forth in Table 3 herein.

18. The turbine assembly of claim 17, wherein each of the rotor airfoils and each of the stator airfoils has a span height between 1.0 inches and 2.0 inches (or between 25.4 mm and 50.8 mm).

19. The turbine assembly of claim 18, further comprising a plurality of platforms coupled to the plurality of blade airfoils to form an inner diameter flowpath about the turbine axis in substantial conformance with platform coordinates as set forth in Table 6 herein.

20. The turbine assembly of claim 19, wherein the plurality of blade airfoils consists of forty-four blade airfoils and the plurality of stator airfoils consists of forty-four vane airfoils.

* * * * *